United States Patent
Gedmark et al.

(10) Patent No.: US 11,677,460 B2
(45) Date of Patent: *Jun. 13, 2023

(54) BEAM SUPER SURGE METHODS AND APPARATUS FOR SMALL GEOSTATIONARY (GEO) COMMUNICATION SATELLITES

(71) Applicant: Astranis Space Technologies Corp., San Francisco, CA (US)

(72) Inventors: John Gedmark, San Francisco, CA (US); Siamak Ebadi, San Francisco, CA (US); Ryan McLinko, San Francisco, CA (US); Steve Joseph, San Francisco, CA (US); Robert Kummerer, San Francisco, CA (US); Adam Bily, Oakland, CA (US); Kagan Topalli, Burlingame, CA (US)

(73) Assignee: Astranis Space Technologies Corp., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/520,602

(22) Filed: Nov. 5, 2021

(65) Prior Publication Data

US 2022/0060251 A1 Feb. 24, 2022

Related U.S. Application Data

(63) Continuation of application No. 16/914,423, filed on Jun. 28, 2020, now Pat. No. 11,171,718.
(Continued)

(51) Int. Cl.
*H04B 7/185* (2006.01)
*H04B 7/19* (2006.01)
(Continued)

(52) U.S. Cl.
CPC ......... *H04B 7/18515* (2013.01); *H01Q 1/288* (2013.01); *H01Q 3/30* (2013.01);
(Continued)

(58) Field of Classification Search
CPC ......... H04B 7/185–2041; H01Q 1/288; H01Q 3/30; H01Q 19/10
See application file for complete search history.

(56) References Cited

U.S. PATENT DOCUMENTS 5,929,808 A 7/1999 Hassan et al.
7,030,824 B1 4/2006 Taft
(Continued)

FOREIGN PATENT DOCUMENTS

WO 2018/190794 A1 10/2018

OTHER PUBLICATIONS

International Search Report in International Application No. PCT/US2020/040033, dated Sep. 22, 2020.

*Primary Examiner* — Raymond S Dean
(74) *Attorney, Agent, or Firm* — Cognition IP, P.C.; Edward Steakley

(57) ABSTRACT

Disclosed embodiments relate satellites using a Software-Defined Radio ("SDR") system. In one example, a geostationary (GEO) satellite includes an antenna system including multiple antennas, each configured to provide a spot beam having an adjustable throughput for a terrestrial coverage area while the antenna is in an active state and the satellite is in orbit above the Earth, a front-end subsystem communicatively coupled to the antenna system having an input side including an input filter and an analog-to-digital converter, and an output side including an output filter and a digital-to-analog converter, and a software defined radio ("SDR") communicatively coupled to the antenna system via the front-end subsystem. The SDR, in response to a surge
(Continued)

modification request, modifies a throughput of each active antenna by increasing or decreasing a share of a satellite power budget allotted to the antenna by deactivating or activating a previously active or previously inactive antenna, respectively.

20 Claims, 63 Drawing Sheets

Related U.S. Application Data

(60) Provisional application No. 62/868,328, filed on Jun. 28, 2019.

(51) Int. Cl.
*H01Q 1/28* (2006.01)
*H01Q 3/30* (2006.01)
*H01Q 19/10* (2006.01)
*H04B 7/204* (2006.01)

(52) U.S. Cl.
CPC ......... *H01Q 19/10* (2013.01); *H04B 7/18513* (2013.01); *H04B 7/18528* (2013.01); *H04B 7/19* (2013.01); *H04B 7/2041* (2013.01)

(56) References Cited

U.S. PATENT DOCUMENTS

| | | | |
|---|---|---|---|
| 10,111,109 | B2 | 10/2018 | Hreha |
| 10,291,315 | B1 | 5/2019 | Tong |
| 11,171,718 | B2 * | 11/2021 | Gedmark ........... H04B 7/18528 |
| 2001/0036826 | A1 | 11/2001 | Norin |
| 2003/0032391 | A1 | 2/2003 | Schweinhart |
| 2004/0097192 | A1 | 5/2004 | Schiff |
| 2004/0192197 | A1 | 9/2004 | Capots et al. |
| 2005/0197060 | A1 | 9/2005 | Hedinger |
| 2006/0012538 | A1 | 1/2006 | Waltman |
| 2006/0240767 | A1 | 10/2006 | Jacomb-Hood |
| 2009/0054007 | A1 | 2/2009 | Kawabe |
| 2010/0052987 | A1 | 3/2010 | Weinstein |
| 2012/0020280 | A1 | 1/2012 | Jansson et al. |
| 2013/0070666 | A1 | 3/2013 | Miller |
| 2015/0215030 | A1 | 7/2015 | Moore |
| 2017/0353960 | A1 | 12/2017 | Heninwolf |
| 2018/0083672 | A1 | 3/2018 | Alexander |
| 2018/0341024 | A1 | 11/2018 | Shetty et al. |
| 2019/0058672 | A1 | 2/2019 | Scott |

* cited by examiner

FIG. 8

| Use Cases \ Features | Frequency Flexibility and Efficiency | | | | Antenna Flexibility | | | | | | Signal Quality Enhancements | | | Flexible Network and Architecture | | | | | | | | |
|---|---|---|---|---|---|---|---|---|---|---|---|---|---|---|---|---|---|---|---|---|---|---|
| | Flexible Carrier Frequency | Flexible Bandwidth | Flexible Channelization and Routing | Millimeter-Wave and Optical Gateway Transceivers | Flexible Carrier Frequency | Flexible Beam Shapes | Beam Hopping | Larger Aperture Antennas | Low-Element Phased Arrays | High-Element Phased Arrays | Noise Removal | Compressed Gateway Spectrum | Equalization | Flexible Network Topology | Frequent Body Repointing | Frequent Orbital Relocation | Intersatellite Linking | Mesh Networking across Satellites | Rx- and Tx- + Only Micro GEOs | Fast Build and Delivery to Orbit | Gateway Aggregation | Small Capacity for Low Cost |
| Test a New Market | X | X |  |  | X |  |  |  |  |  |  |  |  | X | X | X |  |  |  | X |  | X |
| Filling Gaps in Existing Coverage | X | X | X | X | X |  |  |  | X | X |  |  |  |  |  |  |  |  |  | X |  | X |
| Rapid Response to New and Changing Markets | X | X | X |  | X | X |  |  | X | X |  |  |  | X |  | X |  |  |  |  |  | X |
| Bridge traditional GEO Capacity | X | X | X | X | X | X |  |  | X | X |  |  |  | X |  | X | X |  |  | X |  | X |
| On-Orbit Redundancy and Response to Failures | X | X | X |  |  | X |  |  |  |  |  |  |  | X |  | X |  |  |  |  |  | X |
| Bring into Use (BIU) | X |  |  |  |  |  |  |  |  |  |  |  |  |  | X | X |  |  |  | X |  |  |
| Lower Cost per Mbps |  | X | X | X |  | X | X | X | X | X | X | X | X | X | X | X | X | X |  |  | X | X |
| Phased-in Capacity |  | X | X | X | X | X | X | X | X | X | X | X | X | X | X | X | X | X | X | X | X | X |
| Augmenting Existing Capacity |  |  |  |  |  |  |  |  |  |  |  |  |  |  |  |  |  |  | X |  |  | X |
| Serving Time-Varying Coverage | X | X |  |  | X | X |  |  |  |  |  |  |  | X |  | X | X | X |  |  |  | X |
| Dedicated Satellite to End Customer |  |  |  |  |  |  |  |  |  |  |  |  |  |  |  |  | X |  |  |  |  | X |

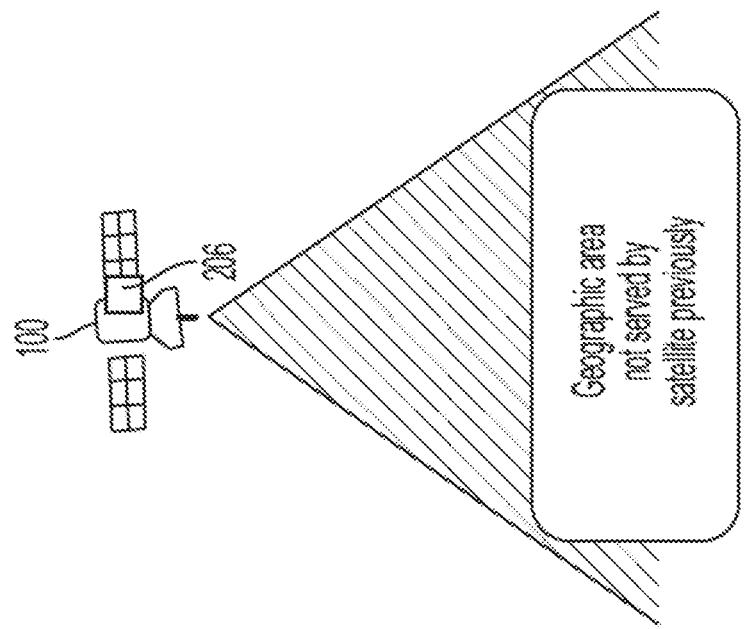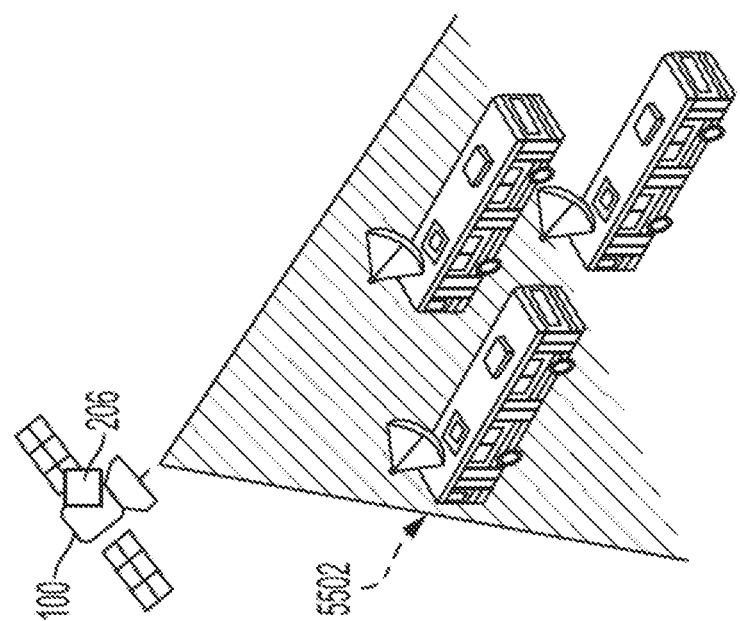
FIG. 55

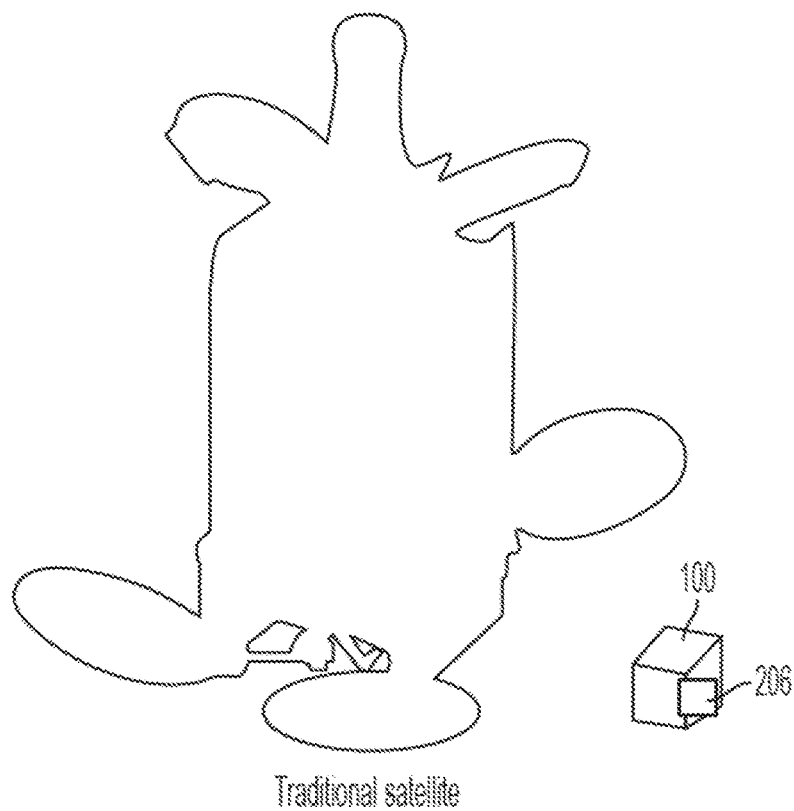
FIG. 61
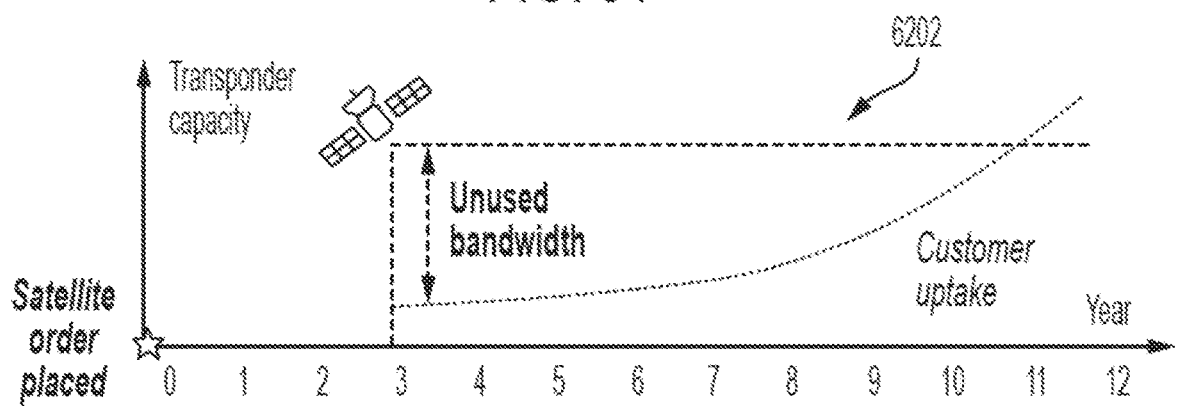
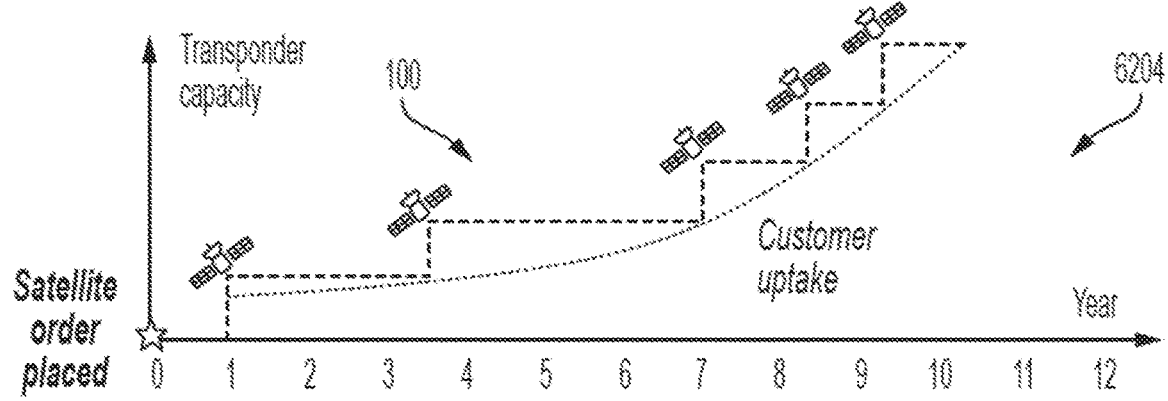
FIG. 62

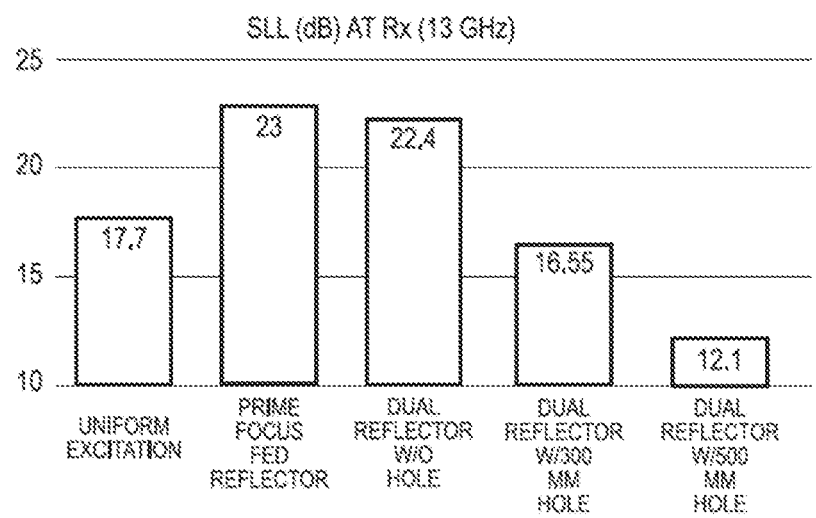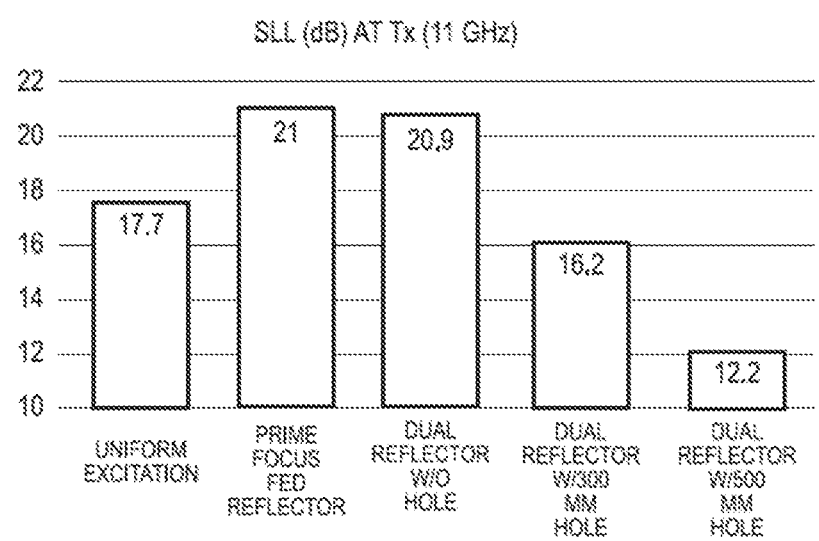
FIG. 68B

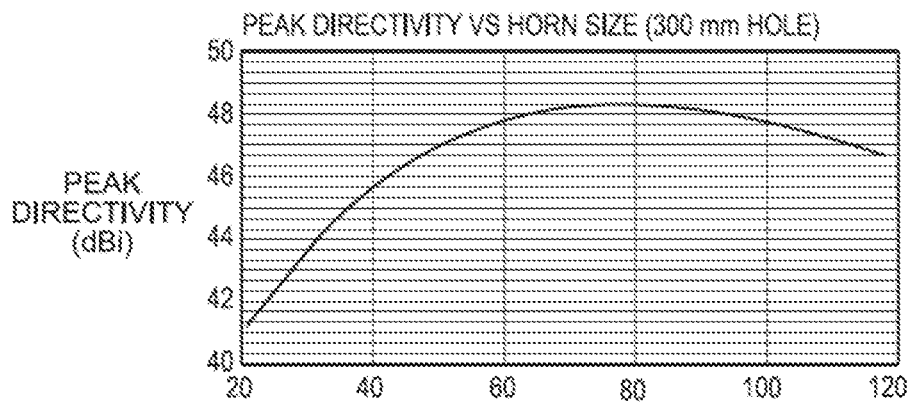

- CASE A
    - IDEAL TX HORN IS 80mm DIAMETER (MAX DIR.)
    - MINIMUM SPACING USING OPTIMUM HORN DIAMETER IS 80mm
    - THE RESULTS IN IMPRACTICAL BEAM SPERATION
- CASE B
    - IDEAL TX SPACING IS 40mm (TOUCHING BEAMS)
    - DECREASED HORN DIAMETER (40mm) TO ACHIEVE PRACTICAL BEAM SEPARATION
    - 2dB LOSS IN DIRECTIVITY
- CASE C
    - IDEAL HORN DIAMETER + IDEAL HORN SPERATION
    - INTERSECTING HORNS (IMPOSSIBLE)
    - FEASIBLE WITH PROPOSED FEED ARRAY

FIG. 69A

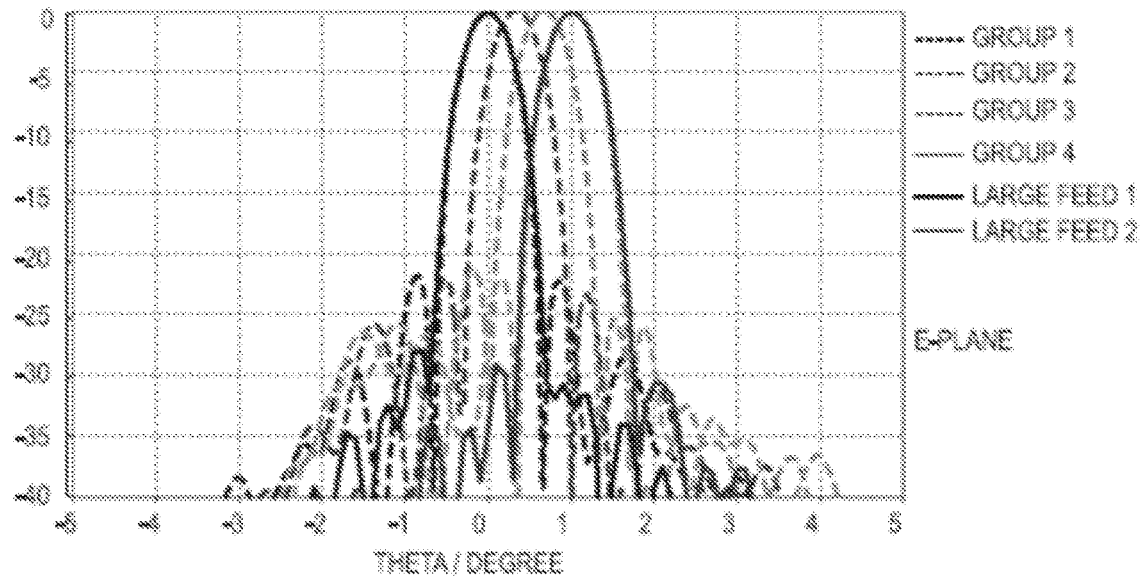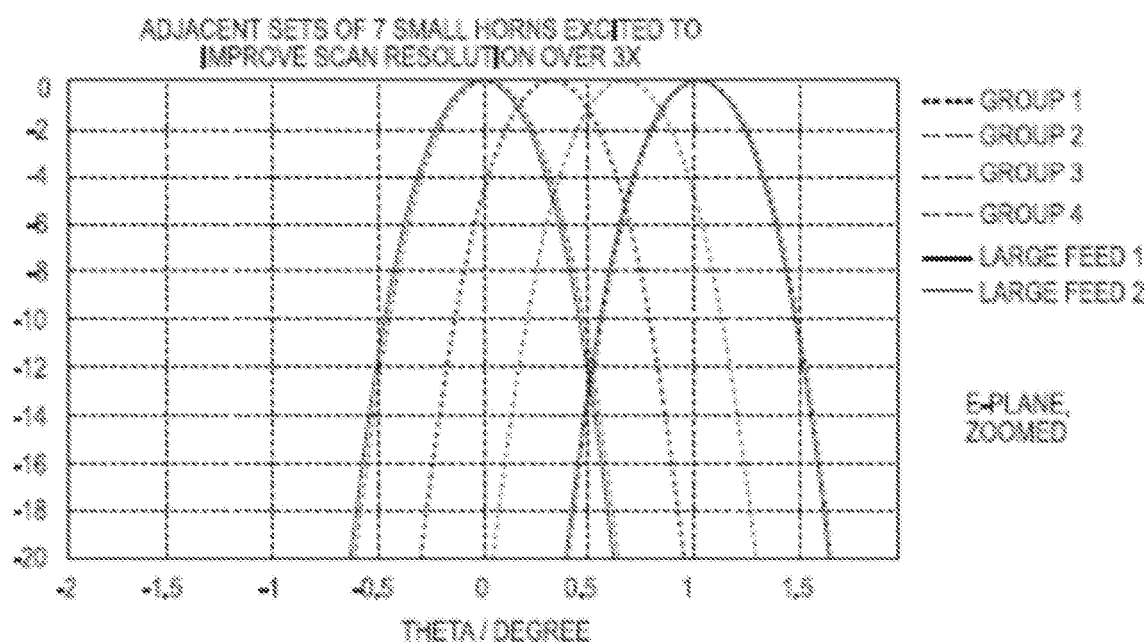
FIG. 71B

OPTION 1: DIGITAL
o 37-PORT SDR SELECTIVELY DRIVES ANY SET OF UP TO 24 PORTS
o FULL BEAM SWITCHING FLEXIBILITY
o 37 KU-BAND CONVERTERS
o HIGHER SWaP SDR
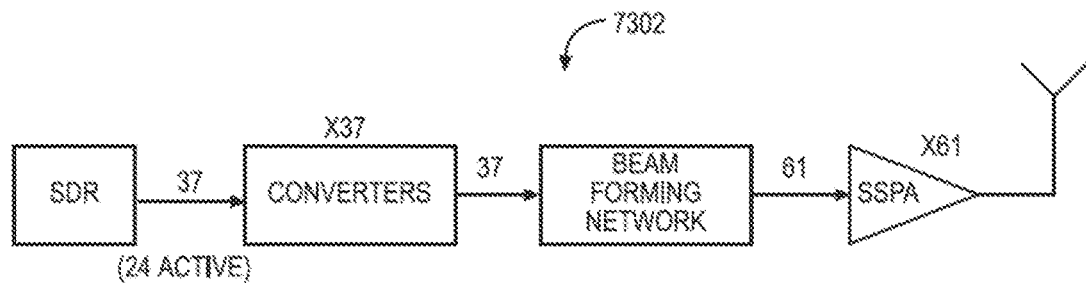
OPTION 2: ANALOG
o RF SWITCHING NETWORK
o PARTIAL BEAM SWITCHING FLEXIBILITY
o FEWER (24) KU-BAND CONVERTERS
o REDUCED SWaP SDR
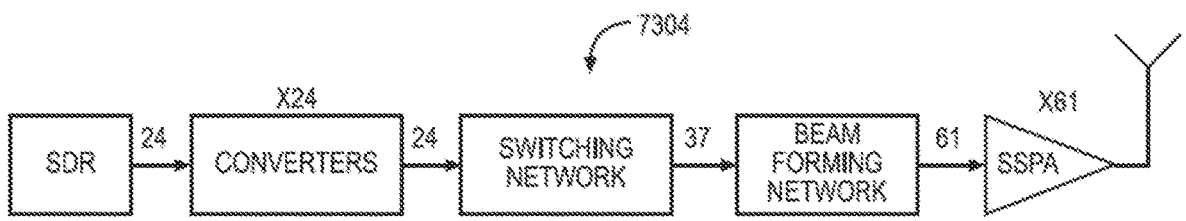
FIG. 73

BEAM SUPER SURGE METHODS AND APPARATUS FOR SMALL GEOSTATIONARY (GEO) COMMUNICATION SATELLITES

CROSS-REFERENCE TO RELATED APPLICATIONS

This application is a continuation of U.S. application Ser. No. 16/914,423, filed Jun. 28, 2020, which claims the benefit of priority of U.S. Provisional Application No. 62/868,328 filed on Jun. 28, 2019, which are hereby incorporated by reference in their entirety and should be considered a part of this specification.

BACKGROUND

Current commercial communication satellites are relatively large, expensive, and static in their operation. For example, many commercial satellites designed to provide voice and data communications weigh in excess of 15,000 pounds and cost over $300 million to develop, in addition to the $100+ million to launch into orbit. For all the expense and weight, known commercial satellites generally only provide fixed services that are designed and provisioned years before the satellite is even launched. For example, current commercial communication satellites are custom-built, meaning they are designed with carrier frequencies, beamwidths, modulation protocols, and a network topology specified by an operator. Oftentimes, it takes over five years to develop and launch commercial satellites as a result of this customization.

To recoup the significant development costs, commercial satellites are relatively large and designed to provide anywhere from 50 to 100 spot beams. With such a large capacity, it may take an operator over a decade to fully lease a commercial satellite. During this time, the unused capacity creates significant inefficiencies and increases the effective cost per Mb transmitted. The large size and multiple licensees of commercial satellites also make them difficult or impossible to reposition or repoint. Further, it is generally not economically practical for an operator to launch a second satellite to cover gaps in coverage or augment coverage in growing markets. Moreover, it is generally not practical for an operator to have on-orbit redundant commercial satellites given their significant expense. Large, expensive, inflexible commercial communication satellites are accordingly only deployed to cover areas that have large populations or entities willing to pay a significant amount for satellite coverage.

SUMMARY

The present disclosure describes a payload system that provides communication flexibility or adjustability for small GEO communication satellites that use a Software-Defined Radio ("SDR") system. The example communication satellite (illustrated in FIGS. 1 to 7) is configured to provide communication coverage between user terminals and one or more gateway stations. The flexibility of the payload system enables the communication satellite to change communication parameters post-deployment to adapt to changing conditions, end-user needs, or system requirements. The flexibility also enables the communication satellite to provide communication coverage for specified areas for defined periods of time, thereby providing an option for shared satellite coverage on-demand.

The example GEO communications satellite is configured to receive over-the-air updates that can change operational parameters and provide system flexibility. For instance, the GEO communications satellite disclosed herein may be configured to provide a flexible carrier frequency, flexible beamwidth, flexible channelization and routing, flexible beam shapes, beam hopping, and flexible network topology via over-the-air updates. The example GEO communications satellite may adjust signal amplitude and/or phase using low-element phased arrays and/or high-element phased arrays for forming beam shapes and beam hopping. In contrast, known commercial GEO satellites are static by design and do not permit or are incapable of adjustments in carrier frequency, beamwidth, channelization/routing, beam shapes, beam hopping, and/or network topology.

In addition, the example GEO communications satellite disclosed herein may be configured to communicate with gateway stations at higher frequencies compared to user links over, for example, millimeter-wave and/or optical links to provide more bandwidth for users. The GEO communications satellite disclosed herein may be configured with large flexible aperture antennas, thereby improving data rates compared to known satellite systems that generally have smaller (but more numerous) antennas. In some embodiments, the example GEO communications satellite may have a single large flexible aperture and be provided in a network with other similar satellites with their own large flexible apertures. This provides a data rate advantage over known commercial satellites that are limited to a number of small apertures giving physical spacing limitations.

The SDR system on the example GEO communications satellite enables noise removal, use of a compressed gateway spectrum, and equalization to improve data throughput and overall system efficiency. Known commercial systems typically do not have these features since they do not possess digital signal processing capabilities. These improvements result in increased system capacity and a lower cost of data transmission.

In some embodiments, the example GEO communications satellite is configured to operate with similar satellites to provide interlaced beams. Further, the satellites may use intersatellite linking to form mesh networks. The intersatellite linking also enables certain satellites to be provisioned as transmission-only or reception-only, and/or provide for gateway aggregation.

The example GEO communications satellite is configured to have a smaller size compared to commercial satellites. For example, the GEO communications satellite disclosed herein may have a size that is ⅒ the size of a communication satellite. This small size enables the GEO communications satellite to be frequently repointed and/or relocated over its life, with less fuel being required to perform the maneuvers. The smaller size and flexibility of the GEO communications satellite enables it to be developed quickly (usually within 18 months from commissioning) and delivered to orbit within a shared rocket payload. By comparison, known commercial satellites may require five years for development to accommodate all the customization required for a dedicated rocket launch, which can take time scheduling. In another application, the example GEO communications satellite disclosed herein can provide a small capacity for a low cost that permits many uses that are not practical for commercial satellite systems.

Chart 800 of FIG. 8 shows how the above-discussed features of the example GEO communications satellite can be employed over one or more uses, which are described further in connection with FIGS. 55 to 65. Any one feature may enable any one of the corresponding uses. Additionally, it should be appreciated that any version of the example GEO communications satellite disclosed herein may be deployed with any number of features based on mission specifications.

The example GEO communications satellite disclosed herein has a lower cost per Mb/s compared to traditional satellites (see FIG. 61), which enables it to be used in more economically sensitive locations and/or missions. In addition, the example GEO communications satellite enables an operator to test new markets (See FIG. 55) by deploying a small satellite to test a hypothesis or business case without having to invest hundreds of millions of dollars in a large commercial satellite. The above features also enable operators to be responsive to changing ground or aero conditions (see FIG. 57) by providing rapidly deployable systems and provide for bring-into-use (BIU) applications (see FIG. 60) when new frequency spectrums become available. The example GEO communications satellite may provide an economical means to provide relatively small but important amounts of coverage by filling gaps in existing coverage (see FIG. 56), bridging traditional GEO capacity (see FIG. 58), phasing-in capacity over time based on demand (see FIG. 62), and/or augmenting existing coverage (see FIG. 63).

The example GEO communications satellite also may be provided as a redundant system or spare (see FIG. 59). This redundancy enables the example GEO communications satellite to provide an almost real-time response to fill in for satellites that go offline or experience failures. Moreover, the example GEO communications satellite may be configured to repoint or reposition itself to provide time-varying coverage (see FIG. 64). For example, the example GEO communications satellite may repoint to follow primetime bandwidth usage through different time zones, provide seasonal coverage based on demand from users or customers, or provide capacity in response to terrestrial outages during and after natural disasters. Additionally, the example GEO communications satellite may be dedicated entirely to a single end customer (See FIG. 65). The small cost of the GEO communications satellite makes it economically feasible for a single customer to have a satellite that is provisioned exactly for their requirements and pointed exactly where coverage is needed.

The following disclosure begins with a description of the examp55455le communications satellite, including a description of the SDR, antennas, and passive components. The disclosure then discusses satellite features that are made possible by the disclosed satellite system. The disclosure concludes by discussing novel uses of the example GEO communications satellite that are enabled by one or more combinations of the disclosed system features.

The example payload system disclosed herein includes an SDR that is communicatively coupled to one or more antennas via a front-end subsystem. The SDR includes a processor, which may comprise any FPGA, GPU, CPU, ASIC, etc. The example payload system described herein includes an antenna system, front-end passive components, an adjustable transmitter and receiver, a master reference oscillator, and the SDR. In some embodiments, the payload system may include one or more filters, low-noise amplifiers ("LNAs"), down-converters, and analog-to-digital converters ("ADCs") on a receiver side, and one or more filters, RF power amplifiers (e.g., traveling-wave tube amplifiers ("TWTAs")), up-converters, and digital-to-analog converters ("DACs") on the transmitter side. At least some of the amplifiers, filters, and/or converters of the front-end system are adjustable components that permit parameter changes after deployment. In addition, the SDR includes adjustable parameters that provide further post-deployment flexibility to the communication system. Moreover, the front-end subsystem may be modular, enabling certain customization/provisioning per customer requirements with minimal tuning of the SDR for compatibility. Altogether, the example SDR and front-end subsystem are configured to enable a flexible carrier frequency, flexible bandwidth, flexible channelization and routing, adjustable RF transmitted and received polarization, compatibility with millimeter-wave and optical gateway transceivers, flexible beam shapes, beam hopping, interlaced beams, use of large flexible aperture antennas, use of low-element/high-element phased arrays, noise removal and equalization, flexibility for a compressed gateway spectrum, flexibility for different network topologies, capability for frequent body repointing and/or orbital relocation, and/or intersatellite linking for mesh networking, Rx and Tx dedicated systems, and gateway aggregation, any of which may be updated or provisioned post-deployment in over-the-air updates. The above-features of the example communication satellite system enables new markets to be tested, gaps in existing satellite coverage to be filled, rapid response to new and changing markets, bridging traditional GEO-satellite capacity, on-orbit redundancy and response to failures, phased-in capacity, augmentation of existing capacity, time-varying coverage service, dedication to a particular customer, fast development and deployment for bring-into-use ("BIU") circumstances, and lower costs per Mbps.

In an example embodiment, a payload system for a communications satellite includes an SDR configured to provide communication services. The SDR includes a processor configured to provide at least one of gain control, channelization, beamforming, and channel routing for at least one user slice or beam for a plurality of user terminals and at least one gateway slice or beam for a gateway station. The example payload system includes a front-end subsystem including an input side and an output side for each slice. Each input side includes an input filter, a down-converter, and an analog-to-digital converter, and each output side includes an output filter, an up-converter, and a digital-to-analog converter. The payload system further includes a plurality of antennas communicatively coupled to the front-end system.

The example down-converter and the up-converter of each slice are adjustable to enable a receive frequency and transmit frequency to be tunable. In addition, the processor is configured to provide an adjustable bandwidth for each of the slices. The processor may also be configured to separate signals received from at least some of the slices into a plurality of narrowband channels, change a frequency and beam assignment for at least some of the channels based on a desired network topology for at least one of the slices, and combine the narrowband channels for the at least one slice. The processor may further provide for flexible beam shapes by routing a single received signal out to a desired number of the output slices, where the processor adjusts a phase and/or amplitude of a signal provided to each of the desired output slices to change a shape of a coverage area. Additionally or alternatively, the processor is configured to provide for flexible beam hopping by routing a single received signal out to a desired number of the output slices, where the processor adjusts a phase of a signal provided to each of the desired output slices to move a peak of a coverage area. Moreover, the processor is configured to provide for noise removal by demodulating and decoding a received signal into a digital stream before encoding and modulating for transmission. Also, the processor may be configured to provide for signal equalization by equalizing a transmission signal before noise is added and/or configured to provide for gateway spectrum compression by demodulating and decoding a received signal into a binary stream before encoding and modulating for transmission.

The advantages discussed herein may be found in one, or some, and perhaps not all of the embodiments disclosed herein. Additional features and advantages are described herein and will be apparent from the following Detailed Description and the figures.

BRIEF DESCRIPTION OF THE FIGURES

FIG. 8 shows a diagram of an example chart that shows a relation between features of the example communications satellite, including the SDR of FIG. 2 and corresponding uses cases supported by the features, according to example embodiments of the present disclosure.

FIGS. 55 to 65 show diagrams related to unique uses of the example GEO communications satellite of FIG. 1 that cannot be economically performed by conventional satellites, according to example embodiments of the present disclosure.

FIGS. 66A to 77 show diagrams related to a beam super surge configuration, according to example embodiments of the present disclosure.

DETAILED DESCRIPTION

The present disclosure relates in general to a flexible payload system for small communication satellites. The example payload system includes an SDR and a front-end system. The SDR includes a processor, such as a field-programmable gate array ("FPGA") that implements traditional communication hardware components, such as mixers, filters, amplifiers, modulators/demodulators, detectors, etc. as software. The SDR may also include analog components for signal filtering, amplification, up-conversion, and/or down-conversion. The example SDR may be configured to provide for modulation and demodulation of any waveform, decoding and encoding of any waveform, channelization and routing, equalization, distortion compensation for channel effects, and RF Front End impairments. It should be appreciated that the processor of the SDR is not limited to an FPGA and may include any ASIC, GPU, CPU, microcontroller, microprocessor, etc.

Reference is made herein to specific hardware configurations of an example communications satellite. Reference is also made herein to capabilities of an SDR. It should be appreciated that the example GEO communications satellite is not limited to the hardware configurations disclosed herein and may include alternative configurations and/or components configured to perform the same operation or provide the same result. Further, some of the hardware configurations may instead be implemented internally by a processor of the SDR, though, for example, through digital processing. It should also be appreciated that in some embodiments, operations performed by the processor may instead or additionally be performed by hardware. The disclosure provided herein provides example embodiments regarding compositions of the example communications satellite.

Reference is made throughout to features and uses of the example communications satellite. It should be appreciated that a GEO communications satellite may be configured to perform all, or a subset of the described uses based, for example, on provisioning. Further, it should be appreciated that the GEO communications satellite may include all or a subset of the described features, which enable the different described uses to be performed.

GEO Communications Satellite Embodiment

Figure 1:
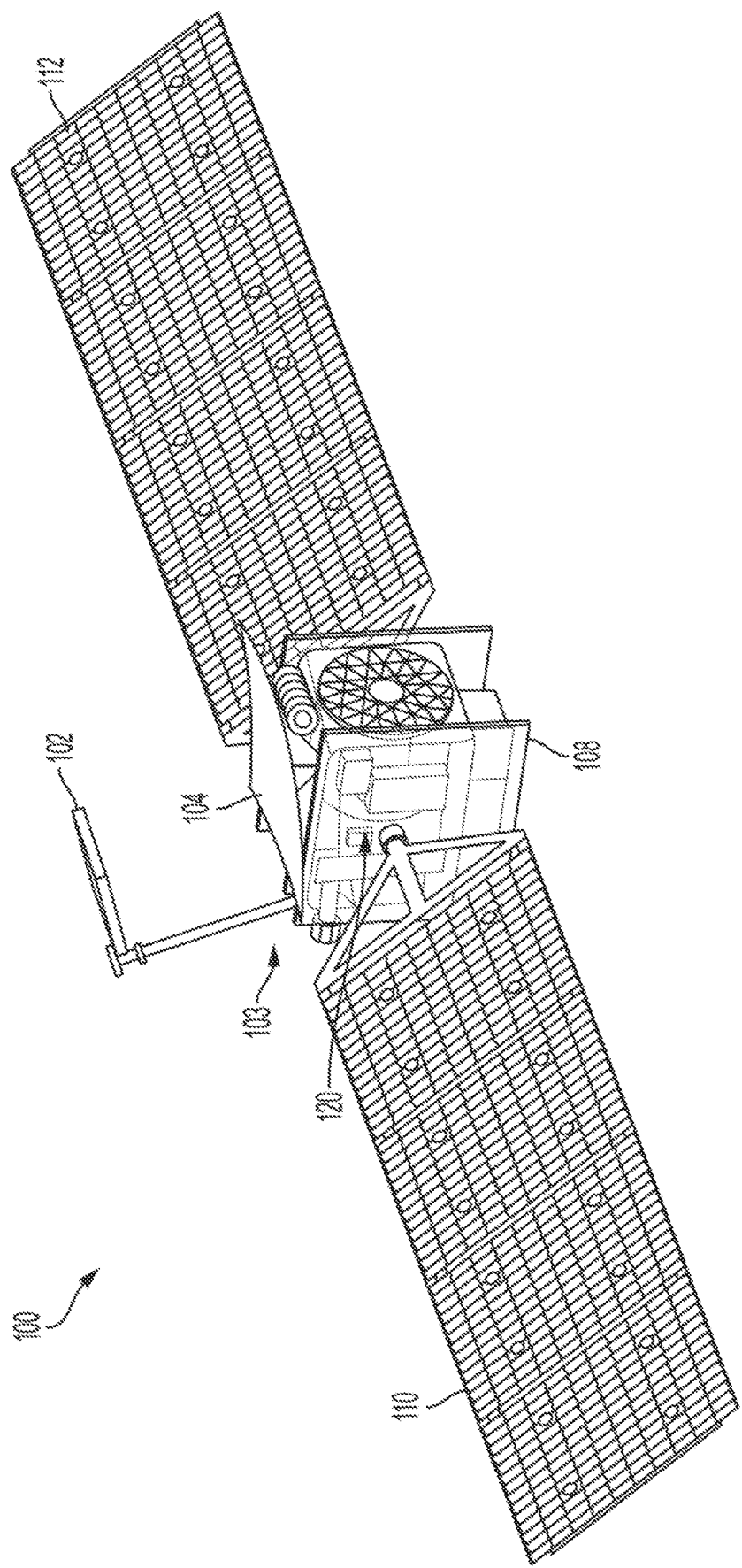
FIG. 1 shows a diagram of an example communications satellite, according to an embodiment of the present disclosure.

FIG. 1 shows a diagram of an example GEO communications satellite 100, according to an example embodiment. The example satellite 100 is configured to provide communication services to aero or ground locations using a payload communications system 120. The satellite 100 transmits and receives wireless signals using one or more antennas 103. The satellite 100 may include a first reflector 102 and a second reflector 104 to direct the signals to the one or more feed antennas 103.

Together with the payload communications system 120, the example GEO communications satellite 100 is configured to provide SDR services to specified aero or ground locations. The SDR services enable communication parameters to be changed as desired while the satellite 100 is in orbit, including providing a flexible carrier frequency, flexible bandwidth, flexible channelization and routing, compatibility with millimeter-wave and optical gateway transceivers, flexible beam shapes, beam hopping, interlaced beams, use of large flexible aperture antennas, use of low-element/high-element phased arrays, noise removal and equalization, flexibility for a compressed gateway spectrum, flexibility for different network topologies, capability for frequent body repointing and/or orbital relocation, and/or intersatellite linking for mesh networking, Rx and Tx dedicated systems, and gateway aggregation, any of which may be updated or provisioned post-deployment in over-the-air updates.

The example satellite 100 includes a structure 108 configured to enclose and/or provide structural support to the feed antennas 103, reflectors 102 and 104, the payload communications system 120, battery, and other subsystems disclosed herein. The satellite 100 is powered by at least one on-board battery, which is recharged via solar arrays 110 and 112. The satellite may include an electric propulsion subsystem and/or a monopropellant subsystem for deployment, repositioning, or re-orientation.

The illustrated satellite 100 is relatively small compared to known commercial communication satellites. In an embodiment, the satellite 100 has a height, length, and depth of 1 meter ("m"), thus having a volume of 1 $m^3$. In other embedment, the satellite 100 may be larger or smaller. For example, the satellite may have a volume as small as 0.65 $m^3$ or a volume as large as 10 $m^3$.

Payload System Embodiment

Figure 4:
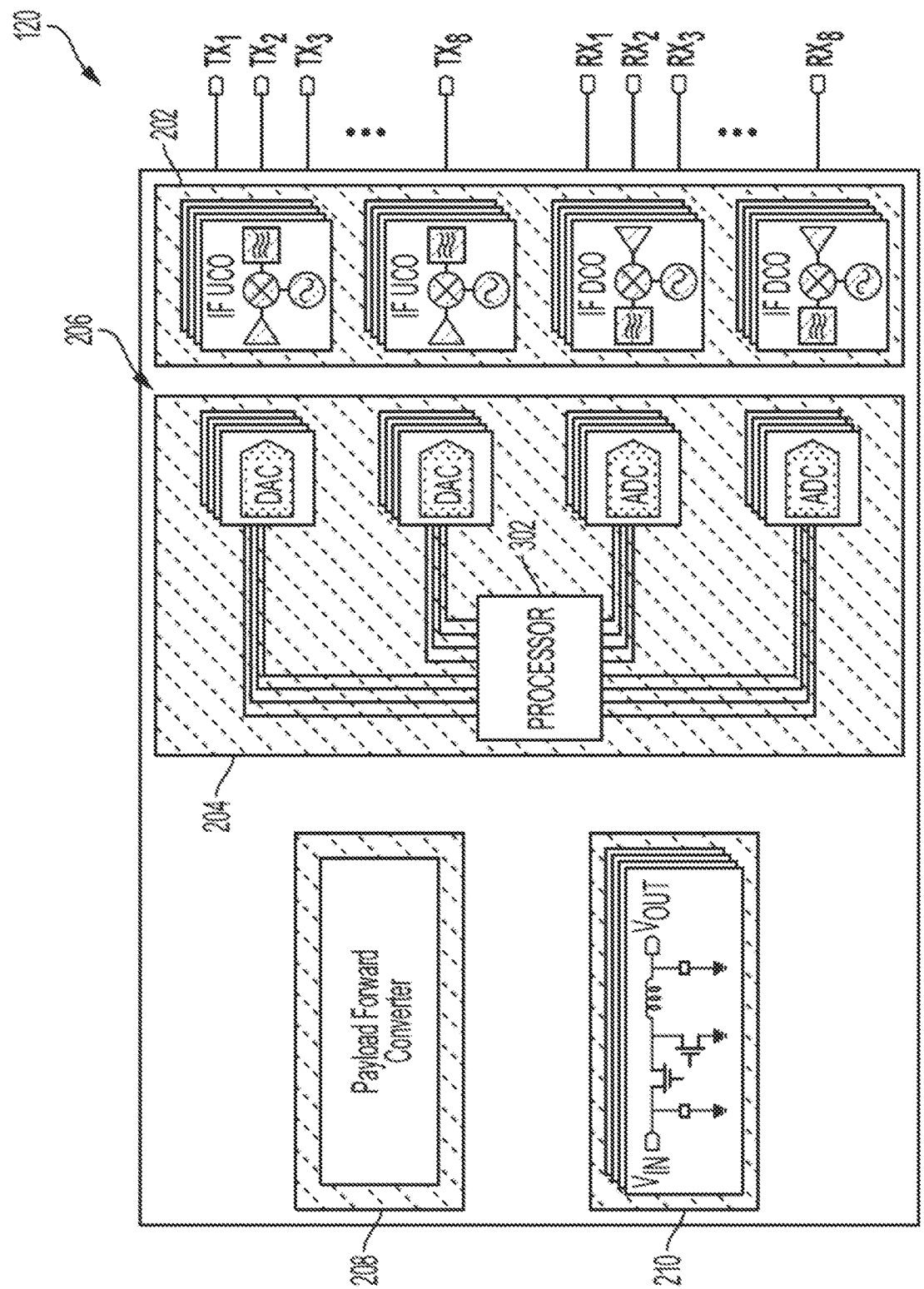
FIG. 4 shows a diagram of an example payload communications system of the communication satellite of FIG. 1, according to an example embodiment of the present disclosure.

FIG. 4 shows a diagram of the example payload communications system 120 of FIG. 1, according to an example embodiment of the present disclosure. The example system 120 is communicatively coupled to the feed antennas 103 via one or more transmitting (e.g., TX) and receiving (e.g., RX) lines and signal multiplexers. In the illustrated embodiment, the payload communications system 120 includes eight transmission lines (e.g., 8 intermediate frequency output ports with a 1.0 to 6.0 GHz capability) and 8 receiving lines (e.g., 8 intermediate frequency input ports with a 0.5 to 5.5 GHz capability), thus creating 8 paths. In other embodiments, the payload communications system 120 may include fewer or additional lines.

Figure 2:
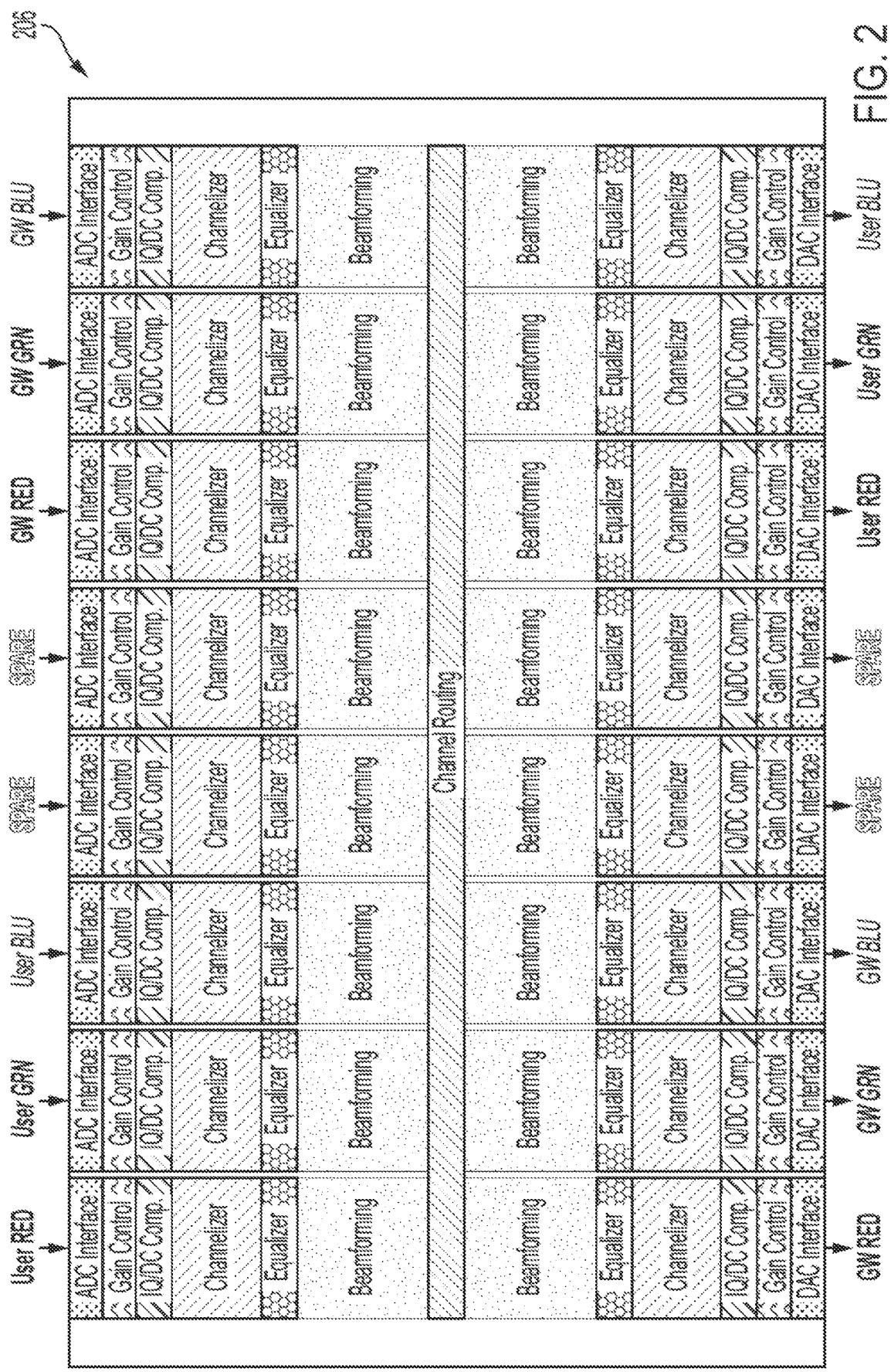
FIG. 2 shows an example diagram of an SDR of the example communications satellite of FIG. 1, according to an example embodiment of the present disclosure.

The example SDR 206 of FIG. 2 is included within the system 120 and includes an intermediate frequency ("IF") board 202 configured to convert signals for transmission or reception over the transmitting and receiving lines. The payload communications system 120 also includes a digital board configured to process received signals for transmission. In the illustrated example, the IF board 202 includes amplifiers, filters, and up/down converters while the digital board 204 includes DAC/ADCs and an FPGA processor 302. In other examples, the IF board 202 and the digital board 204 may be combined or components from the boards 202 and 204 may be arranged differently. For example, in some embodiments, the DAC/ADCs may instead be located on the IF board 202. Alternatively, in some examples, the IF board 202 functionality may be included in upconverters 406 and downconverters 408.

The example SDR 206 is configured to process signals received on input ports or receiving lines for transmission via the output ports or transmission lines. FIG. 2 shows an example diagram of the SDR 206, according to an example embodiment of the present disclosure. The SDR 206 includes, in order from reception to transmission, interfaces configured to connect to the ADCs, gain control, IQ/DC compensation, channelization, equalization, beamforming processing, and channel routing. In addition, for transmission, the SDR 206 includes beamforming processing, equalization, channelization, IQ/DC compensation, gain control, and interfaces configured to connect to the DACs.

The channel routing may provide routing at one or many different network levels. For example, the channel routing may route signals at a physical level, where signals having a certain specified carrier frequency are routed to another channel. The channel routing may also provide routing at the network or hardware level, where data packets may be routed to other channels based on destination IP address, MAC address, etc.

Figure 5:
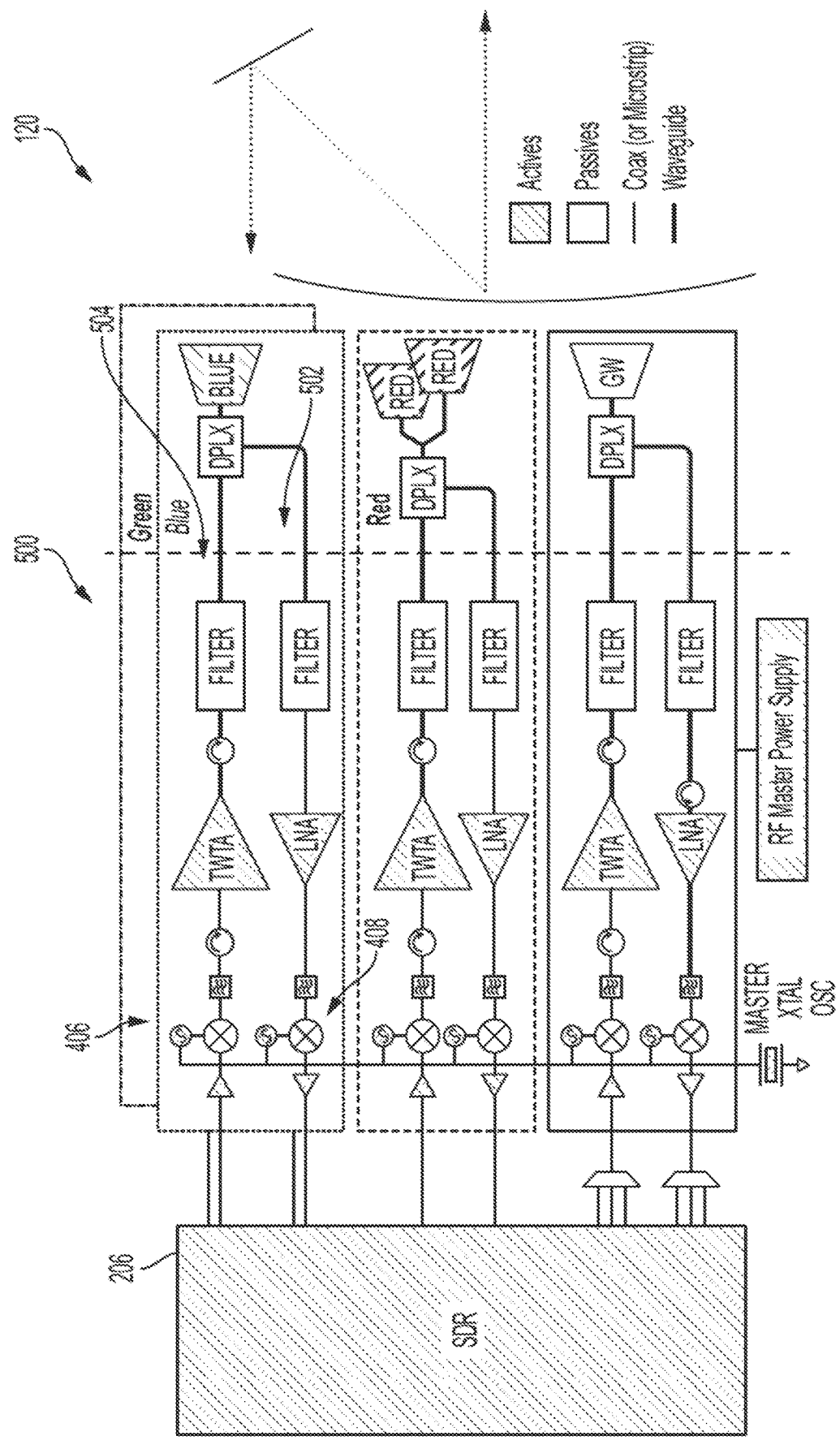
FIGS. 5 to 7 show diagrams of different embodiments of the example payload communications system of FIG. 4, according to example embodiments of the present disclosure.
Figure 6:
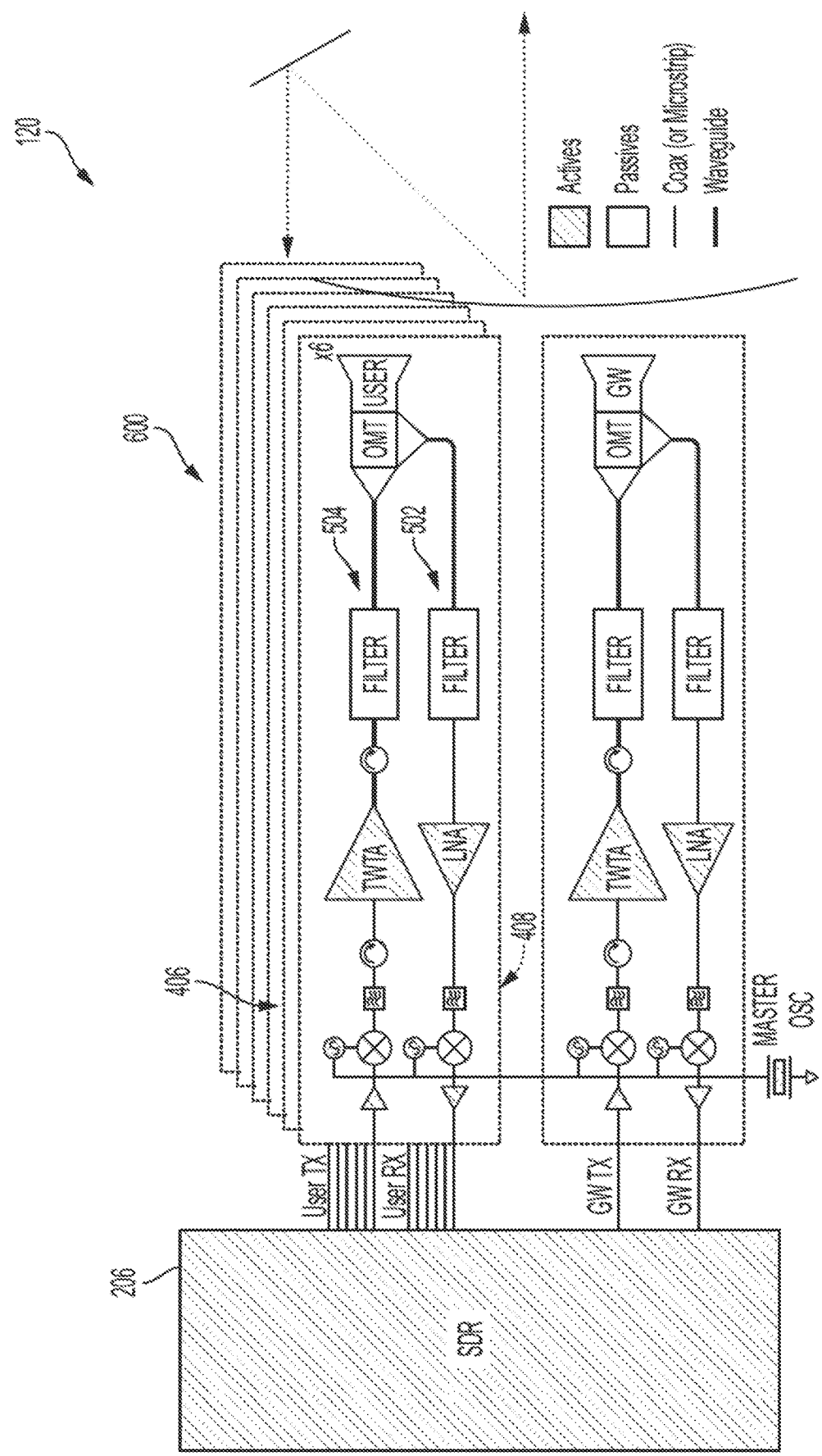
Figure 7:
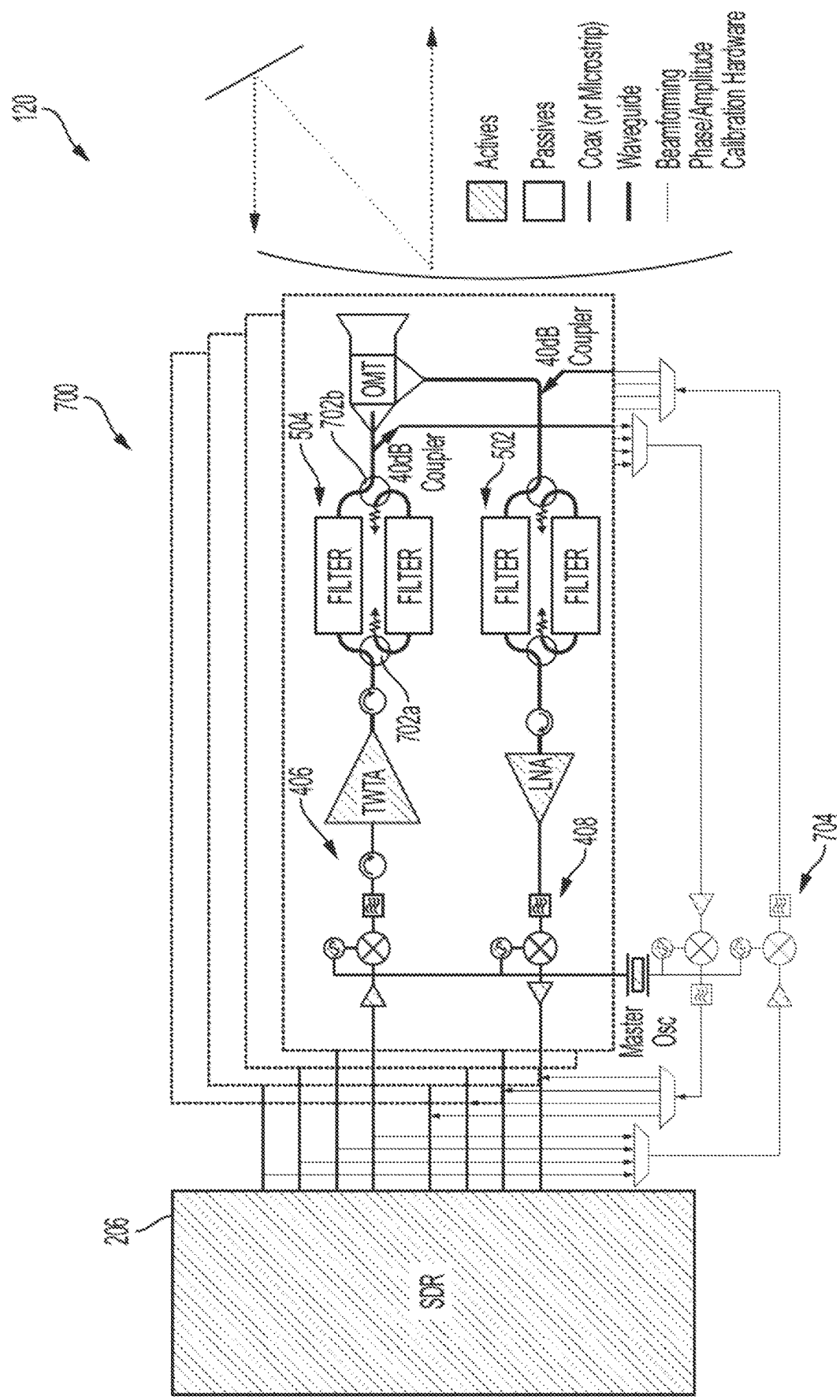

FIG. 2 shows that the SDR 206 is configured for three user slices (labeled in the Figure as red, green, and blue) and one gateway slice. Each user slice communicates with a distinct gateway slice while the gateway slice combines/splits inputs/outputs to/from the three different user slices. Each slice includes a transmitting/output port and a receiving/input port, as shown in FIGS. 5 to 7. For reception, in the illustrated embodiment, the RF/IF front end includes a transmission rejection filter (e.g., an LNA filter with isolator), and a down-converter. For transmission, in the illustrated embodiment, each slice includes an up-converter, TWTA, and a reception band noise rejection filter. In other examples, the SDR 206 is configured to support additional or fewer slices. For example, the SDR 206 shown in FIG. 6 supports 5 different slices.

In the illustrated example, each input/output port corresponds to a channel, which may be divided into sub-channels (e.g., 2 MHz sub-channels). In addition, the SDR 206 of FIG. 2 may be configured to provide equalization for the analog-RF front end and automatic gain control with, for example, 40 to 45 dB of dynamic range). Further, the SDR 206 of FIG. 2 may be configured to provide 5 GHz of frequency flexibility with 1 GHz, or more, of instantaneous bandwidth per port.

The SDR 206 (shown in FIG. 4) also includes a payload power board 208 and an SDR power board 210. The payload power board 208 is configured to isolate a battery power supply from the payload communications system 120 and establish a single point of ground for the SDR 206. The payload power board 208 may convert a 28-volt power supply to 5.5 v for the SDR 206 and other components on the boards 202 and 204. The example SDR power board 210 may include a buck converter configured to provide an adjustable voltage of 0.9 volts to 3.3 volts for the SDR 206 and/or other components on the boards 202 and 204.

Figure 3:
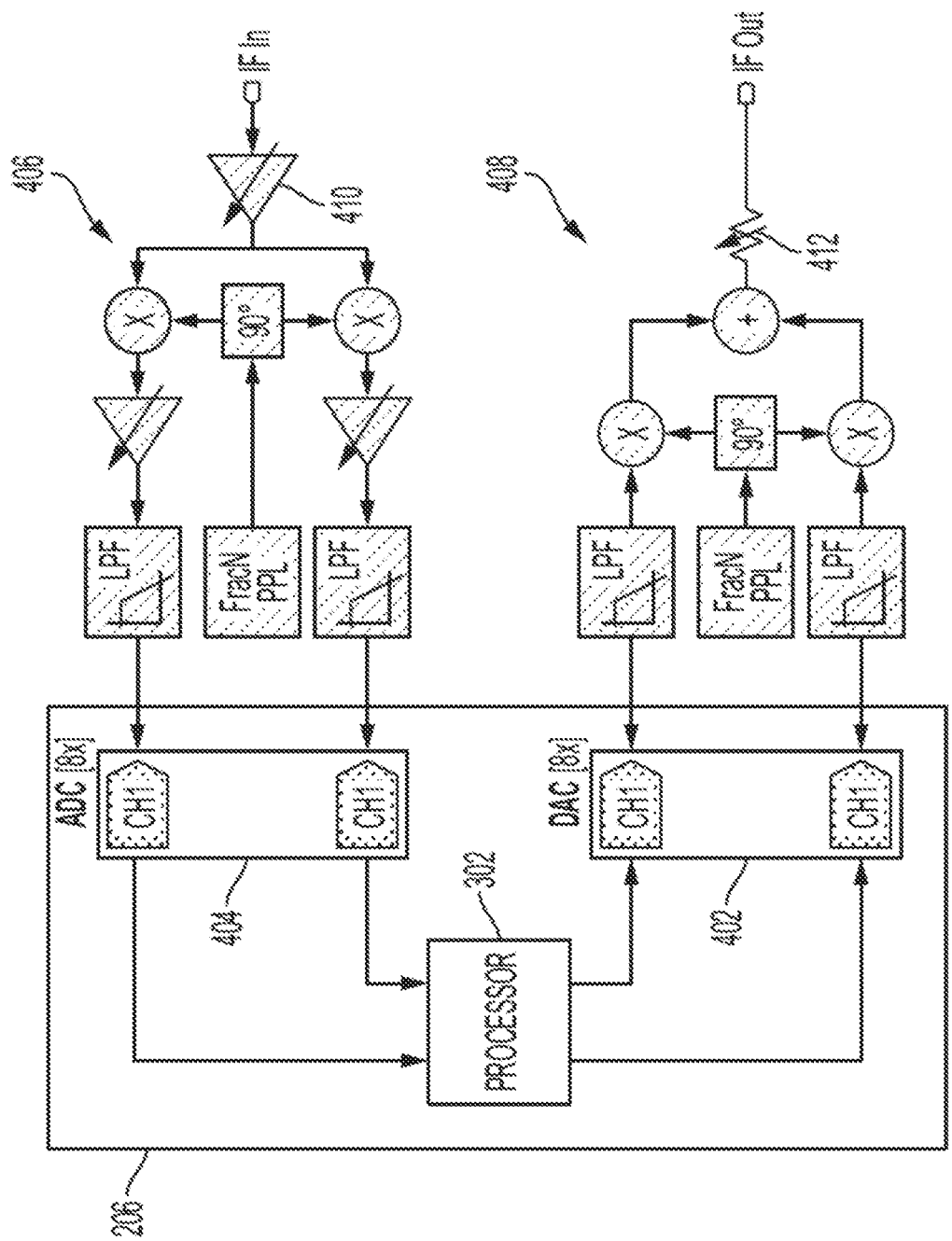
FIG. 3 shows an example front-end system of the communications satellite of FIG. 1 connected to the SDR of FIG. 2, according to an example embodiment of the present disclosure.

FIG. 3 shows a diagram of a processor 302 (e.g., an FPGA) of the SDR 206 that is communicatively coupled to one or more DACs 402 and one or more ADCs 404 for each input and output port. On the input side, the ADC 404, for each input or receiving line, is connected to a down-converter 406. On the output side, the DAC 202, for each output or transmission line, is connected to an up-converter 408. In the illustrated embodiment, the ADC 404 and down-converter 406 provide for two separate slices. In addition, DAC 402, and the up-converter 408 provide for two separate slices. In other embodiments, only one channel may be provided, or more than two slices may be supported (e.g., four slices).

In the illustrated example, the processor 302 is communicatively coupled to eight ADCs 404 and eight DACs 402. The eight input and output connections provided by the ADCs 404 and the DACs 402 may correspond to, for example, the 8 user/gateway inputs/outputs shown in FIG. 2 of the SDR 206.

The example ADCs 404 may have a sampling rate between 1000 MS/s and 20 GS/s. In addition, the ADCs 404 may have an input bandwidth between 500 MHz and 10 GHz, for example, around 5 GHz with 0.5 dB of ripple or 9 GHz with 3 dB of ripple. Further, the ADCs 404 may have a resolution between 9 bits and 20 bits, for example, between 10 and 14 bit with a resolution with +/−0.5b INL/DNL.

The example DACs 402 may have a sampling rate between 0.5 GS/s and 20.0 GS/s. The example DACs 402 may also be configured to have sufficiently high SFDR as to meet ITU emissions requirements. For example, the DACs 402 may provide 60 dB SFDR at −2.4 dBm output power and have a resolution between 9 bits and 20 bits, for example, around 16 bits with a power ratio of −74 dBc SFDR at −7 dBFS output. Further, the DACs 402 may be configured to provide internal interpolation of at least one of 1×, 2×, 4×, or 8×.

The example down-converter 406 is configured to convert a received signal to a lower frequency for digitization by the ADC 404. The illustrated down-converter 406 of FIG. 3 includes a variable gain IF amplifier 410 configured to reduce the dynamic range of a received signal (e.g., gain control). The downconverter 406 may be configured to provide for IQ demodulation to retain phase information after a translation to a baseband signal. The downconverter 406 includes a fractional PLL configured to tune to a center frequency of a desired channel and lowpass filters to remove adjacent channels. The PLL of the downconverter 406 may be configured to provide IF frequencies from 0.5 to 6.5 GHz with phase noise under −110 dBc/Hz at 100 Hz and an output power of 3 dBm.

The example up-converter 408 is configured to process I and Q signals from the DAC 402, which can be a dual channel DAC or of any other architecture. The up-converter 408 includes low pass filters to remove DAC images and an IQ modulator to inject phase information into the IF carrier signal. Fractional PLLs of the up-converter 408 are configured to tune to a center frequency of a desired channel. The up-converter 408 further includes a variable attenuator 412 (capable of providing up to 12 dB of programmable attenuation) for high backoff when increased linearity is desired. In some embodiments, the attenuator 412 includes the TWTA of FIGS. 5 to 7. The PLL of the up-converter 408 may be configured to provide IF frequencies from 0.5 to 6.5 GHz with phase noise under −110 dBc/Hz at 100 Hz and an output power of 3 dBm. The up-converter 408 may provide 500 MHz single-sided bandwidth and have a 0.1 dB gain imbalance and 1.5 degree of phase imbalance.

The down-converter 406 and/or the up-converter 408 enable the SDR 206 to improve rejection of adjacent channels, compensate for IQ imbalance, compensate for mixer local oscillator ("LO") feedthrough, split a signal into many 2 MHz subcarriers, and equalize linear distortion in the IF board 202 (e.g., the front-end) and uplink channel. The PLL of the downconverter 406 can be configured to provide IF frequencies from 0.5 to 6.5 GHz with phase noise under −110 dBc/Hz at 100 Hz and an output power of 3 dBm. The downconverter 406 may provide at least 500 MHz single-sided bandwidth with about 42 dB of programmable gain with a 0.1 dB gain imbalance and 1.5 degree of phase imbalance.

FIGS. 5 to 7 show diagrams of different embodiments of example payload communications systems 500, 600, and 700, according to example embodiments of the present disclosure. The example SDR 206 is configured to enable any of the embodiments of FIGS. 5 to 7 to be used based on customer or end-user specifications without significant modification or tuning. In other words, the embodiments of example payload communications systems 500, 600, and 700 are modular and may replace each other for the payload communications system 120 described in FIGS. 1 to 4. As described below, each of the embodiments provide different capabilities.

FIG. 5 shows red, green, blue, and grey slices (as labeled) corresponding to the inputs/outputs of the SDR 206 shown in FIG. 2. The gateway slice is combined/split with the inputs/outputs of the three different user SDR slices (green, blue, and red) via a duplex antenna configuration. In other embodiments, at least one slice may be dedicated for signals to/from the gateway via a dedicated duplex antenna. In the illustrated example, each user slice includes an input line/port and output line/port, which are connected at a duplexer or orthomode transducer ("OMT"). The choice may depend on the antenna configuration implemented. The input line 502 includes an input filter, such as a transmission band rejection filter and an LNA. The filter may be configured to pass frequencies between 27 GHz and 30 GHz or any other range depending on the operating frequency bands of the mission. The input line 502 further includes the downconverter 408. The output line 504 includes a reception band noise rejection filter, a TWTA, and the up-converter 406.

In the illustrated example of FIG. 5, shaded components are active and may be adjustable, which provides the front-end subsystem 500 flexibility disclosed herein. Specifically, the TWTA, LNA, amplifiers, multipliers, PLLs and/or LPFs of the up-converter 406 and the downconverter 408 are active components. The example configuration illustrated in FIG. 5 may be configured to provide one or more fixed beams, including, for example, regional beams or High-throughput satellite ("HTS") spot beams. The adjustability of the front-end 500 (in addition to the SDR 206) enables flexibility of the features discussed below.

The example front-end subsystem 600 of FIG. 6 includes similar input lines 502, output lines 504, down-converters 408, and up-converters 406 as the front-end subsystem 500 of FIG. 5. However, in the example of FIG. 6, the system is configured to provide six user slices and one gateway slice. In this example, the six user slices are configured to provide beams for user terminals while the gateway slice is configured to communication with a gateway station. Similar to the front-end system 500 of FIG. 5, the front-end subsystem 600 of FIG. 6 may be configured to provide one or more fixed beams, including, for example, regional beams or HTS spot beams. The adjustability of the front-end 600 (in addition to the SDR 206) enables flexibility of the features discussed below.

The example front-end subsystem 700 of FIG. 7 includes a switch between two filters for each input and output line 502 and 504. On the transmission side, a first filter may pass frequencies between 10.5 and 11.5 GHz while the second filter passes signals between 11.0 and 13 GHz. In other examples, the switch may be removed and the input and output lines 502 and 504 may each include a single filter.

The example front-end subsystem of FIG. 7 includes a beamforming calibration network 702. The network 702 is configured to transmit and measure signals including, for example, different direct sequence spread spectrum pseudonoise ("PN") sequence on each transmit chain. The network 702 may be configured to receive a different sequence on each receive chain for beamforming calibration. The beamforming calibration may enable flexible beam shaping and/or beam hopping in addition to providing one or more fixed beams, including, for example, regional beams or HTS spot beams. The adjustability of the front-end 700 (in addition to the SDR 206) also enables flexibility of the features discussed below.

In either of the embodiments of FIGS. 5 to 7, the example SDR 206 may be configured with a regenerative configuration for increased compute capabilities. The increased capabilities include, for example, noise removal and a compressed gateway spectrum, as described below in more detail.

Features of the Example Communications Satellite

As described above in connection with FIGS. 1 to 7, the example GEO communications satellite 100, including the SDR 206, provides for feature flexibility and adaptability that enables a multitude of different uses. FIG. 8 shows a diagram of an example chart 800 that illustrates a relation between features of the example GEO communications satellite 100, including the SDR 206 and corresponding uses supported by the features. The example features provided by the GEO communications satellite 100, including the SDR 206 comprise frequency flexibility and efficiency, antenna flexibility, signal quality enhancements, and flexibility based on a network or architecture. Frequency flexibility and efficiency includes flexible carrier frequencies, flexible bandwidth, flexible channelization and routing, and/or the use of millimeter-wave and optical gateway transceivers. Antenna flexibility includes flexible beam shapes, beam hopping, interlaced beams, and/or the use of large flexible aperture antennas, low-element phased arrays, and high-element phased arrays. Signal quality enhancements include noise removal, compressed gateway spectrum, and/or equalization. Flexibility based on a network or architecture includes a flexible network topology, frequent body repointing, frequent orbital relocation, inter-satellite linking, mesh networking across satellites, Rx- and Tx-only satellite systems, fast build and delivery to orbit capabilities, gateway aggregation, and/or small capacity for low cost capabilities.

The example chart 800 of FIG. 8 shows how each of the mentioned features relate to different uses, including testing for a new market, filing in gaps in existing coverage, rapid response to new and changing markets, bridging traditional GEO capacity, on-orbit redundancy and response to failures, bring into use ("BIU"), lower cost per Mbps, phased-in capacity, augmenting existing capacity, serving time-varying coverage, and having dedicated satellite to end customer(s). For example, flexible carrier frequencies, flexible bandwidth, flexible channelization and routing, flexible beam shapes, flexible network topology, frequent body repositioning, frequent orbital relocation, fast build and delivery to orbit, and small capacity for low cost features are conducive for testing a new market for satellite coverage. It should be appreciated that while the example chart 800 provides an illustration of a relation between features and use cases, in some embodiments, fewer or additional features may be related to a particular use case and/or the GEO communications satellite 100, including the SDR 206 may be provisioned to support fewer features and only a subset of the use cases based on mission requirements.

The following sections describe features of the GEO communications satellite 100, including the SDR 206. A description of the use cases is provided following the discussion of the features.

Flexible Carrier Frequency Embodiment

Figure 10:
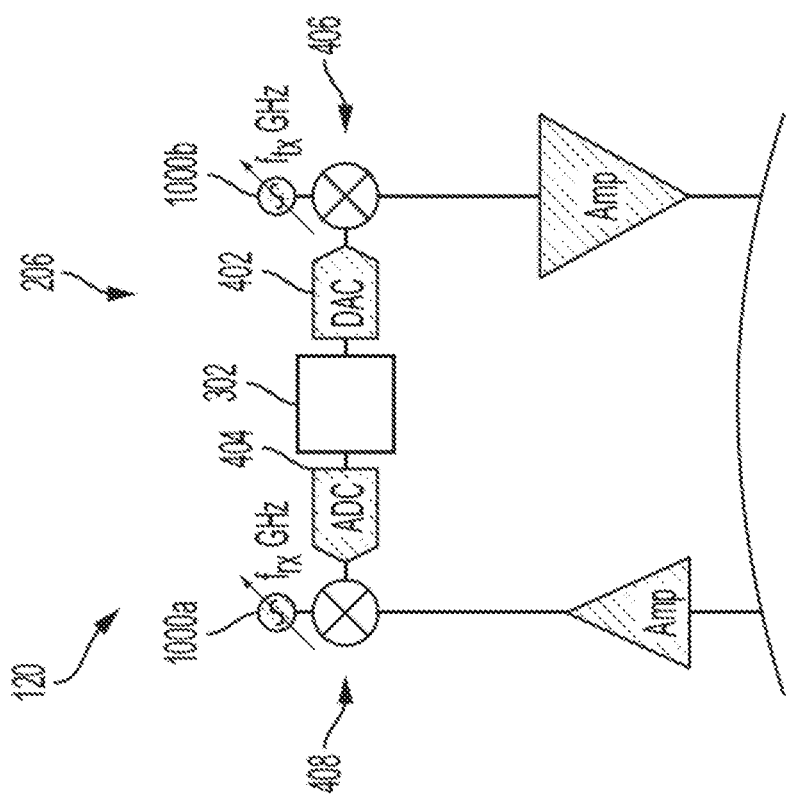
FIGS. 9 and 10 show diagrams that compare known satellite systems and the example GEO communications satellite of FIG. 1 regarding carrier frequency adjustability, according to example embodiments of the present disclosure.
Figure 9:
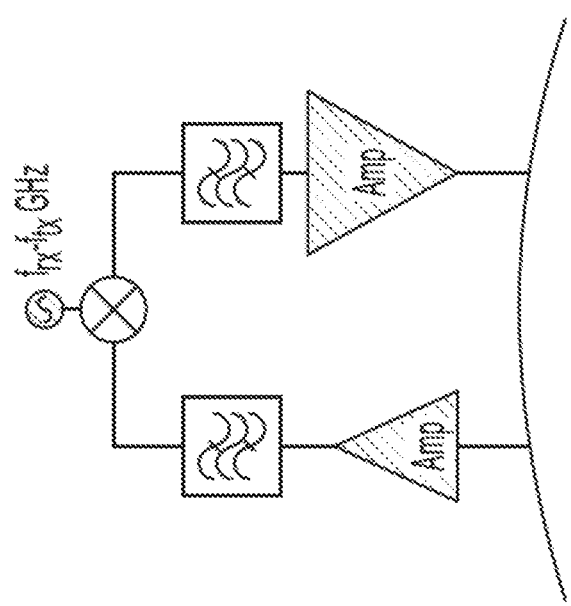

FIGS. 9 and 10 show diagrams related to the carrier frequency flexibility of the payload communications system 120, including the SDR 206. FIG. 9 shows a diagram of known satellite systems that typically include about 50 to 100 slices in which analog filters set the receive and transmit frequencies. By comparison, FIG. 10 shows a diagram of the example payload communications system 120 in which the receive and transmit carrier frequencies are independently tunable. The configuration shown in FIG. 10 includes fewer slices, such as eight slices. The example SDR 206, including the processor 302, may be configured to tune the frequency, based, for example, on instructions received from a ground station. In other examples, the SDR 206 may tune the transmit and/or receive frequencies in support of any of the uses discussed below in connection with FIGS. 55 to 65.

The frequency flexibility enables the example payload communications system 120 to tune to a desired transmit or receive carrier frequency. The flexibility enables the payload communications system 120 to be deployed for multiple service providers, for certain defined periods of time. For example, the payload communications system 120 may be deployed for a first provider to cover a communication outage or increase in bandwidth usage, then later switch frequencies for a second service provider after service is no longer needed for the first provider. In other words, the example payload communications system 120 provides a satellite-sharing capability. The flexibility also enables interference to be reduced by side-stepping the interfering frequencies.

In the illustrated example of FIG. 10, the payload communications system 120 includes dual tunable oscillators as part of respective converters 406 and 408. In other examples, the payload communications system 120 may include a single tunable oscillator or instead adjust a carrier frequency by adjusting gains of the ADC 404 and/or the DAC 402. In other embodiments, the payload communications system 120 may use four or more, such as six, local oscillators with flexible up-conversion or down-conversion architecture and frequency planning. In another embodiment, the payload communications system 120 may include oscillators configured in multiple stages where frequencies are added, mixed, multiplied, and/or divided to achieve a desired carrier frequency. It should be appreciated that any analog or digital configuration may be implemented to provide for carrier frequency adjustment.

In some instances, the configuration is different between the receive and transmit sides. For example, a receive side may include a single tunable oscillator while the transmit side includes two oscillators that provide a mixed output. In addition, in some embodiments, the oscillators, in conjunction with the SDR 206, may be configured to provide a set of discrete carrier frequencies. In other embodiments, the oscillators, in conjunction with the SDR 206, may be configured to provide a continuous range of carrier frequencies.

Flexible Bandwidth Embodiment

Figure 12:
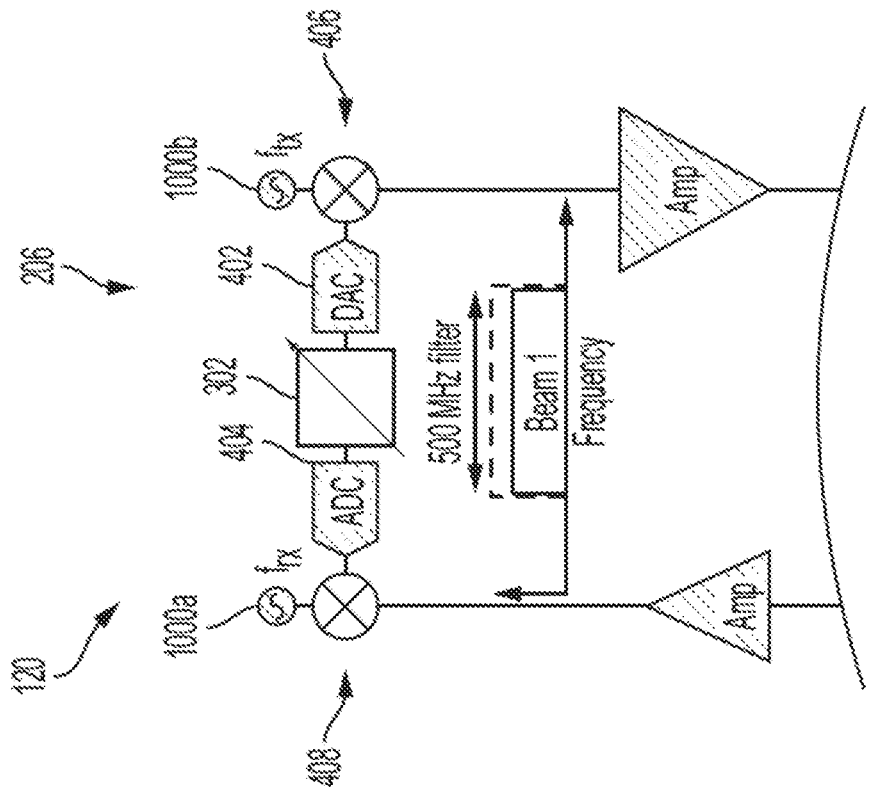
FIGS. 11 to 14B show diagrams that compare known satellite systems and the example GEO communications satellite of FIG. 1 regarding bandwidth adjustability, according to example embodiments of the present disclosure.
Figure 11:
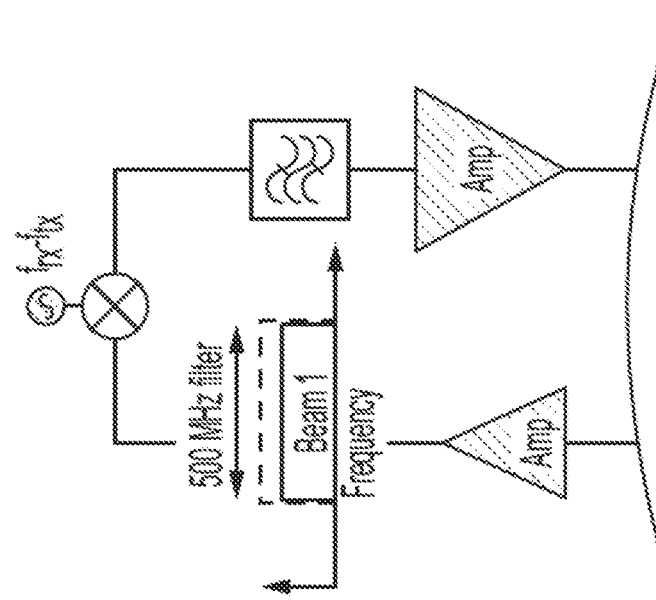
Figure 14A:
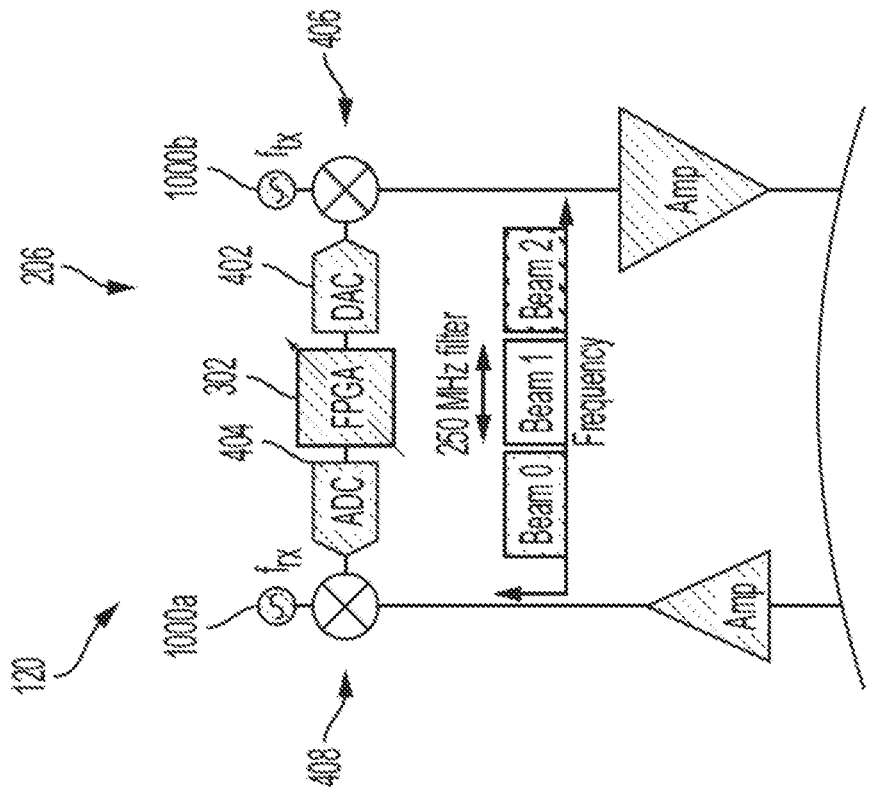
Figure 13:
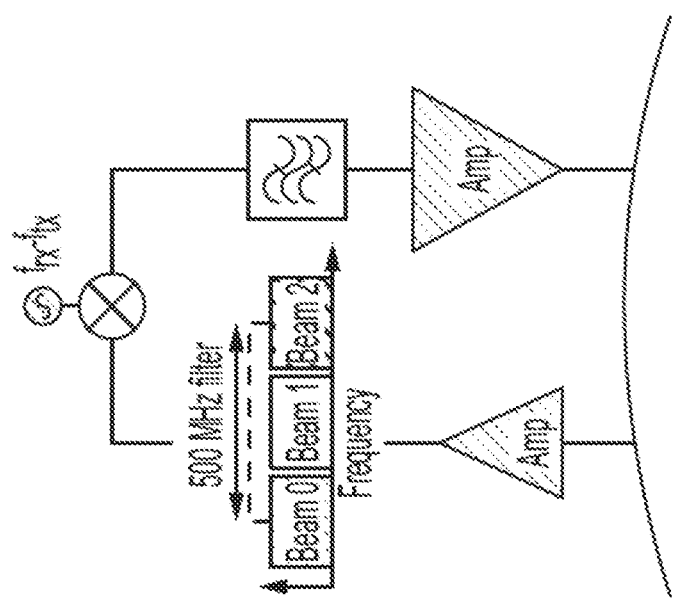

FIGS. 11 to 14B show diagrams related to the bandwidth flexibility of the payload communications system 120. FIG. 11 shows a known satellite system in which fixed analog filters permit only one beam to pass through. The filter has a fixed beamwidth of 500 MHz, for instance. This fixed configuration may be acceptable in some circumstances. FIG. 13 shows a circumstance where three beams are received. The fixed bandwidth of the known system causes half of beams 0 and 2 to pass through the 500 MHz filter.

In contrast to known satellite systems, the example payload communications system 120 of FIG. 12 includes a digital filter provided by the SDR 206. In FIG. 12, the SDR 206 is configured to have a bandwidth of 500 MHz to enable the only beam to pass through, similar to the known system of FIG. 11. However, if the desired bandwidth per beam decreases as multiple beams are received, the example SDR 206 is configured to accordingly adjust the bandwidth of the digital filter. For example, in FIG. 14A, the SDR 206 is re-configured to permit only the single beam by reducing the bandwidth of the digital filter to 250 MHz.

The example SDR 206 is configured to enable the bandwidth to be adjusted between 1 MHz to 1 GHz (or more) via an over-the-update. In some embodiments, the SDR 206 may adjust filters to change the passband. The use of digital filters enables smaller guard bands to be used as a result of sharper channel filtering, which may consume less than 1% of the available frequency spectrum compared to known systems that have guard bands that consume upwards of 10% of the spectrum.

Figure 14B:
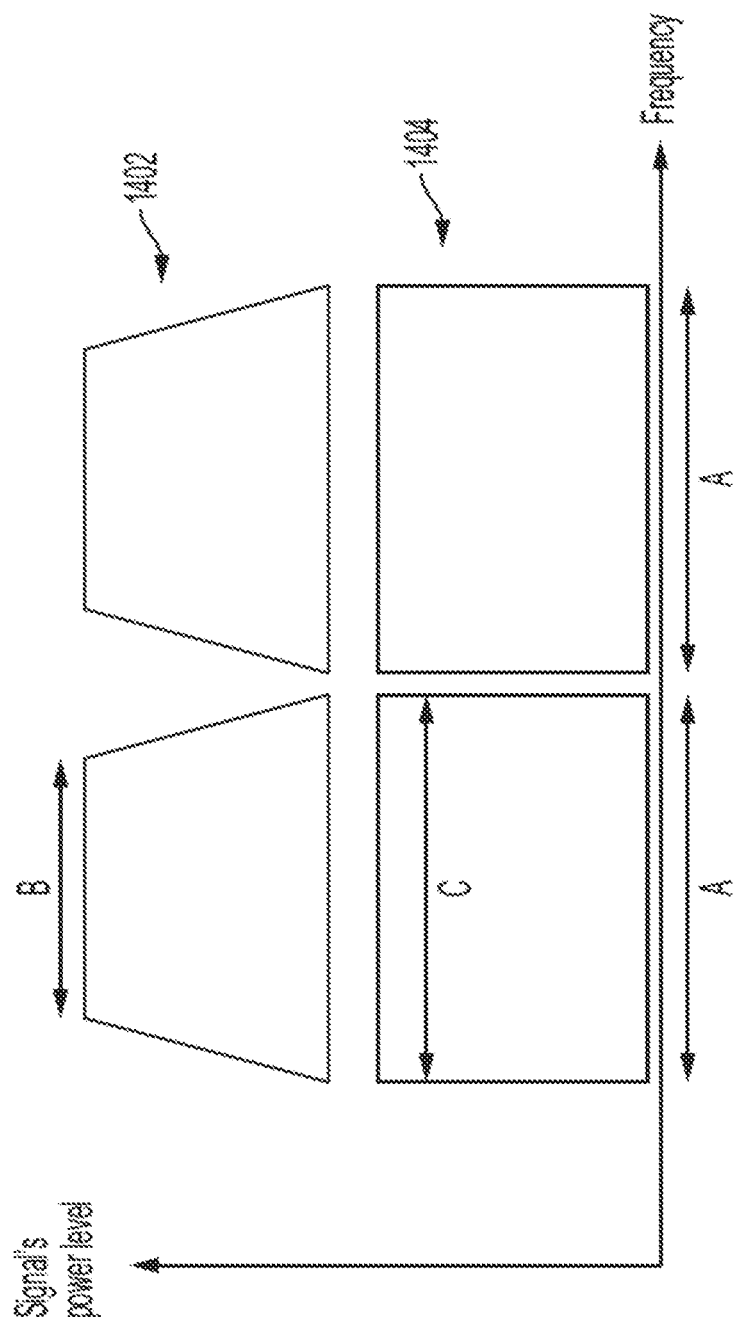

FIG. 14B shows a diagram comparing channel filtering of traditional analog systems 1402 and digital channel filtering 1404 provided by the SDR 206. Traditional analog filtering has a greater roll off at the edges compared to digital filtering. As a result, systems that use traditional analog filtering have lower spectral efficiency factor, such as 0.9, and need to allocate larger guard bands, such as 25 MHz. By comparison, the sharper digital filtering has a higher spectral efficiency factor, as high as 99%, and enables smaller guard bands to be used. The digital filtering accordingly provides a greater spectral efficiency factor and provides more available bandwidth for users.

The flexible bandwidth of the payload communications system 120 enables a service provider to support increases in demand when additional spectrum is not available. For example, a single payload communications system 120 may be reaching capacity with 4 beams of 500 MHz bandwidth. A second payload communications system 120 may be provided operating on the same spectrum, with each being configured to provide 4 beams of 250 MHz bandwidth, which increases total capacity by 40%. The adjustability of the digital filter enables the bandwidth to be reduced so that only the desired beams are processed.

In another example, the payload communications system 120 is operating at a frequency of 2 GHz, with 4 beams of 500 Mhz. A service provider may be granted an additional 2 GHz of spectrum. Instead of launching another satellite, the service provider adjusts the bandwidth of the digital filters to operate over 4.0 GHz, where the bandwidth of the filters are increased to 1 GHz (4 beams of 1 GHz), thereby automatically increasing capacity by 60% without launching an additional satellite.

Flexible Channelization and Routing Embodiment

Figure 15:
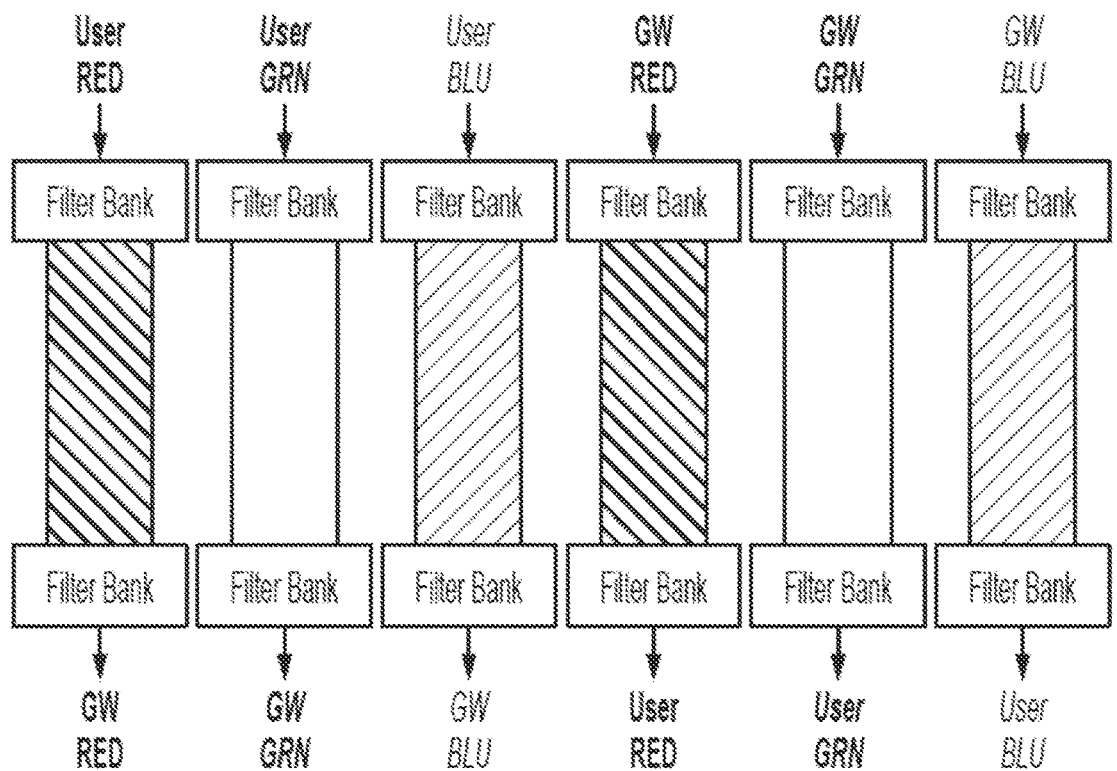
FIGS. 15 and 16 show diagrams that compare known satellite systems and the example GEO communications satellite of FIG. 1 regarding channelization and routing flexibility, according to an example embodiment of the present disclosure.
Figure 16:
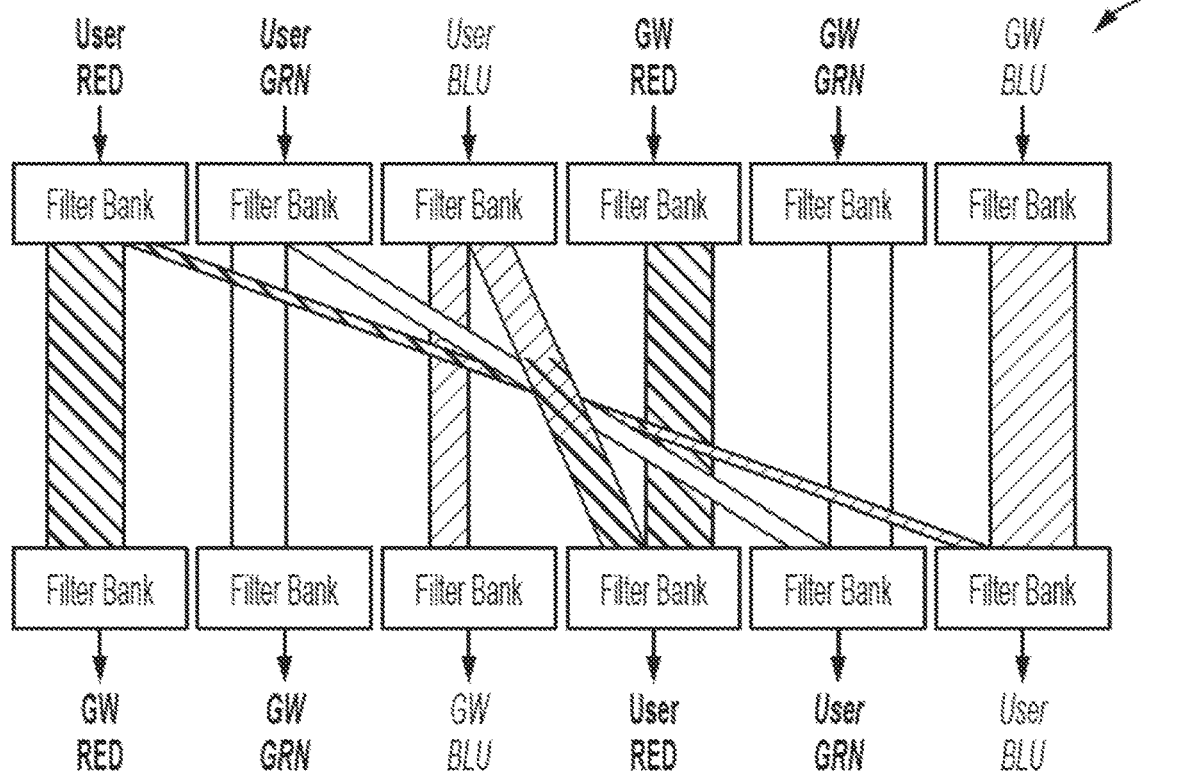

FIGS. 15 and 16 show diagrams related to channelization and routing flexibility of the payload communications system 120, according to an example embodiment of the present disclosure. FIG. 15 shows a known satellite system in which analog transponders provide a rigid network topology as a result of fixed, analog waveguide filters. The illustrated design is fixed during manufacture and provides for a pure hub-spoke design where all signals received on a channel are routed to the same output channel.

In contrast, FIG. 16 shows a diagram that is illustrative of channelization and routing configured within the SDR 206. The example SDR 206 includes a digital channelizer configured to enable flexible network topologies by using flexible digital filtering to separate a received signal into many narrow band channels. For each channel, the SDR 206 may change a frequency and select a certain beam for transmission. The selection may be in response to an over-the-air update. For transmission, the SDR 206 may combine many narrow channels assigned to the same beam into a single signal, as shown in FIG. 16.

The example SDR 206 may provide routing at one or many different layers. For example, the SDR 206 may be configured to provide physical layer routing such that subchannels of a specified frequency are routed to another channel. This may be performed for spectrum allocation or load balancing. The SDR 206 may also perform routing at the link or network layer by routing digital data based on MAC or IP address. In these examples, the SDR 206 may include a routing-and-forwarding table that specifies to which sub-channel data is to be routed.

Millimeter-Wave and Optical Gateway Embodiment

Figure 17:
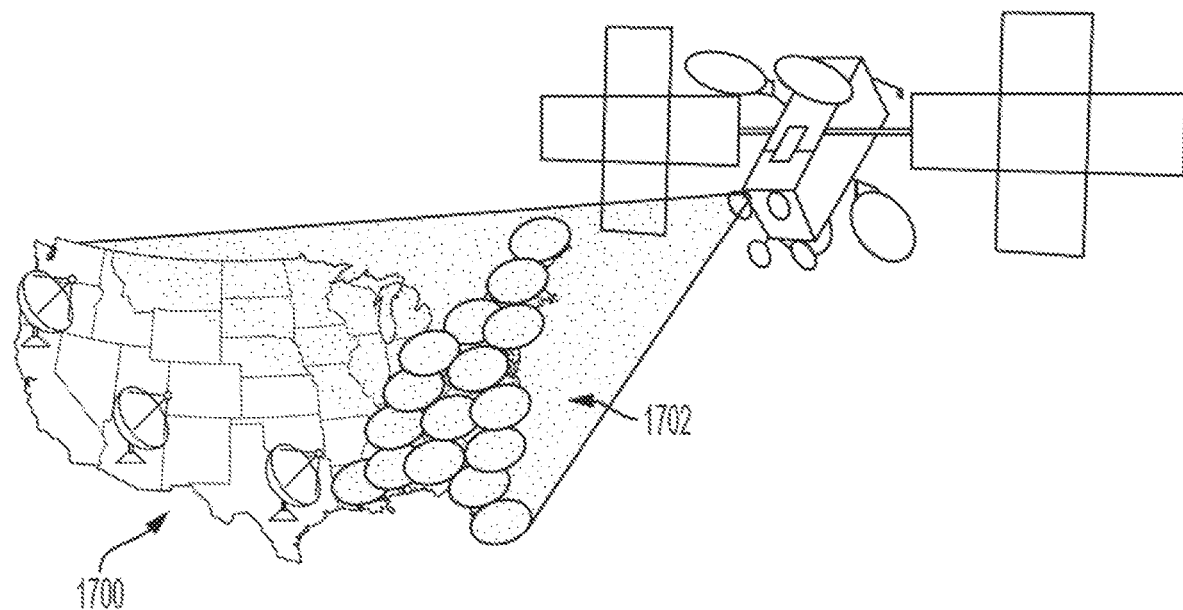
FIGS. 17 and 18 show diagrams related to the communications satellite, including the SDR of FIG. 2 being configured to operate with millimeter-wave and optical gateway transceivers, according to example embodiments of the present disclosure.
Figure 18:
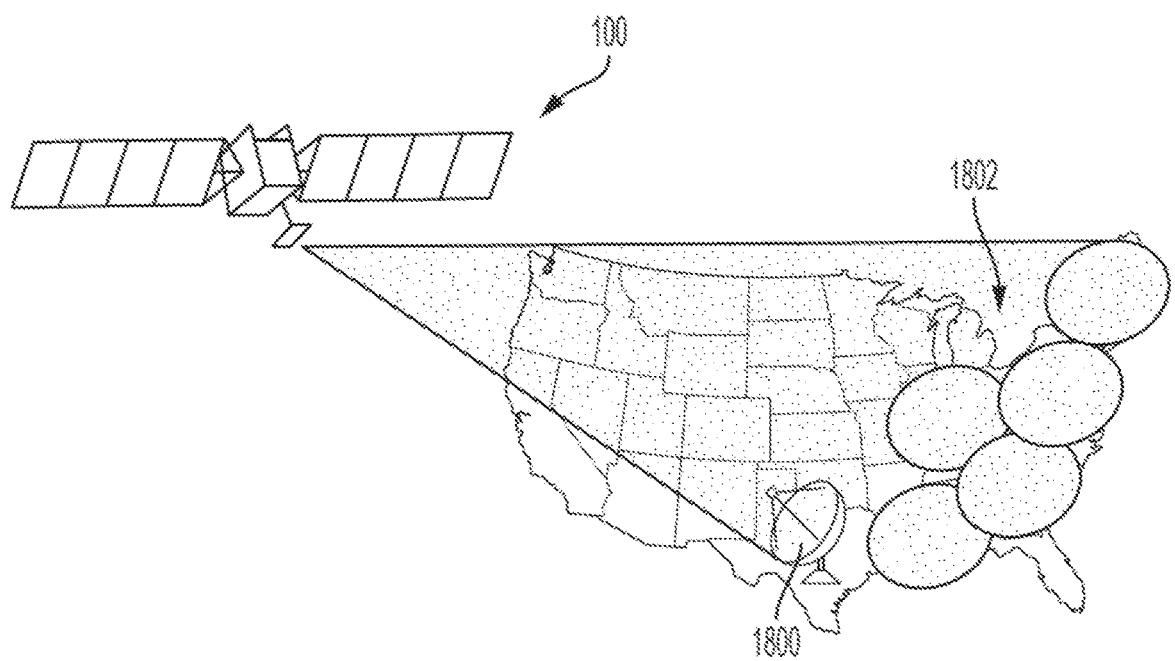

FIGS. 17 and 18 show diagrams related to the GEO communications satellite 100 configured to compatibility with millimeter-wave and/or optical gateway transceivers, according to an example embodiment of the present disclosure. FIG. 17 shows a diagram of a traditional satellite that communicates with gateway transceivers 800 operating in the same frequency as the use spectrum (i.e., the Ka band) or in another common user link frequency. For instance, the gateway may operate in the Ka band while the user links are provided in the Ku band. In this configuration, significant high-value spectrum is consumed by the gateway link with the satellite. In some instances, the limited spectrum available for the gateway 800 is the bottleneck for network capacity.

FIG. 18 shows an embodiment of the GEO communications satellite 100, including the SDR 206 configured to communicate with a gateway 1800 that is configured to communicate over a higher frequency compared to the user links. The higher frequency may comprise the Q-band, the V-band, the W-band, or an optical band, which are generally less suitable for user links and where spectrum is generally more plentiful. Communication over these bands between the gateway 1800 and the satellite 100 provides more bandwidth for the low-frequency, high-value user links in the Ka or Ku band. The use of higher frequencies for the gateway link also enables higher directivity on the gateway link, thereby reducing the transmit power requirements and enabling greater spectral efficiency factor values. This configuration may also reduce the number of gateways needed since frequency reuse is not as critical. As discussed above, the example SDR 206 is configured to provide the frequency flexibility and/or demodulation/modulation needed to enable millimeter-wave and/or optical communication with gateways. In some instances, the SDR 206 may additionally or alternatively be configured to facilitate user links in the higher frequency bands.

It should be appreciated that the example SDR 206 may also be configured to process different waveforms. Different service providers may have different waveforms, some being proprietary. The SDR 206 may be configured to process a first waveform on a gateway link while processing second different waveforms on a user link. Further, the SDR 206 may receive over-the-air programming to change the waveform being processed by, for example, adjusting digital filter parameters, adjusting DAC/ADC gain values, and/or adjusting carrier frequency/bandwidth.

Flexible Beam Shape Embodiment

Figure 19:
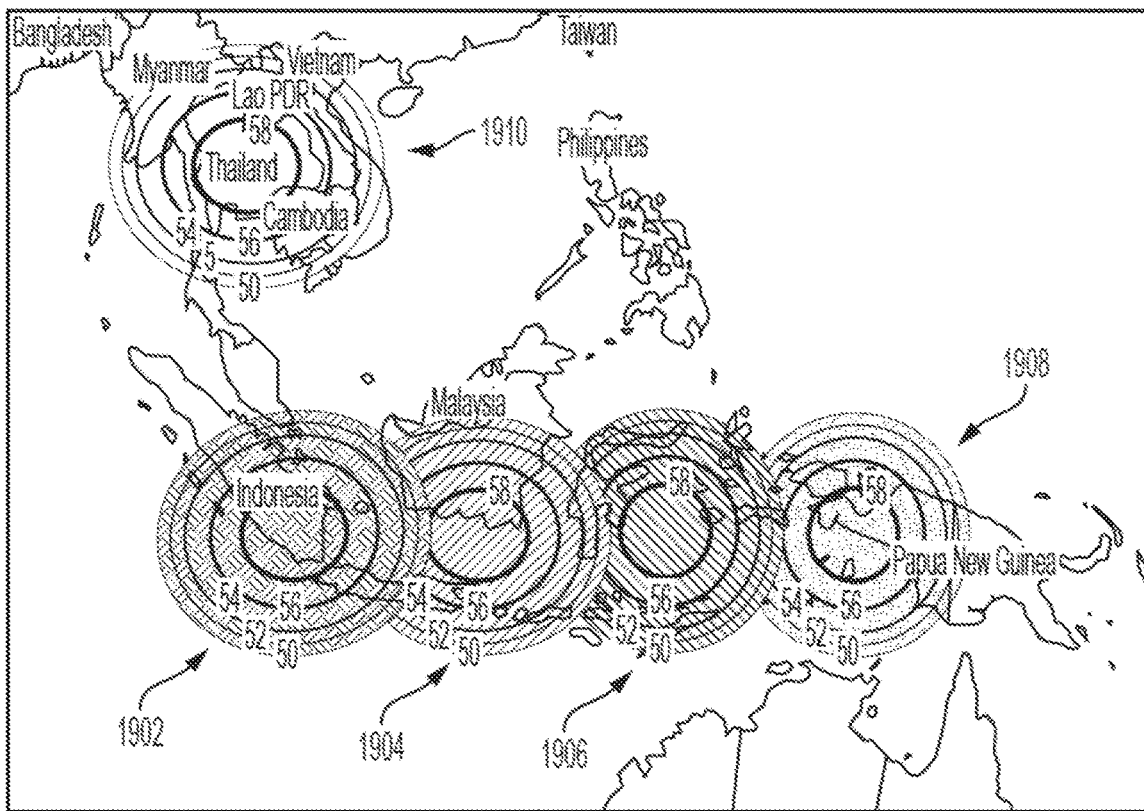
FIGS. 19 to 21 show diagrams that compare known satellite systems and the example GEO communications satellite of FIG. 1 regarding beam shape flexibility, according to example embodiments of the present disclosure.
Figure 20A:
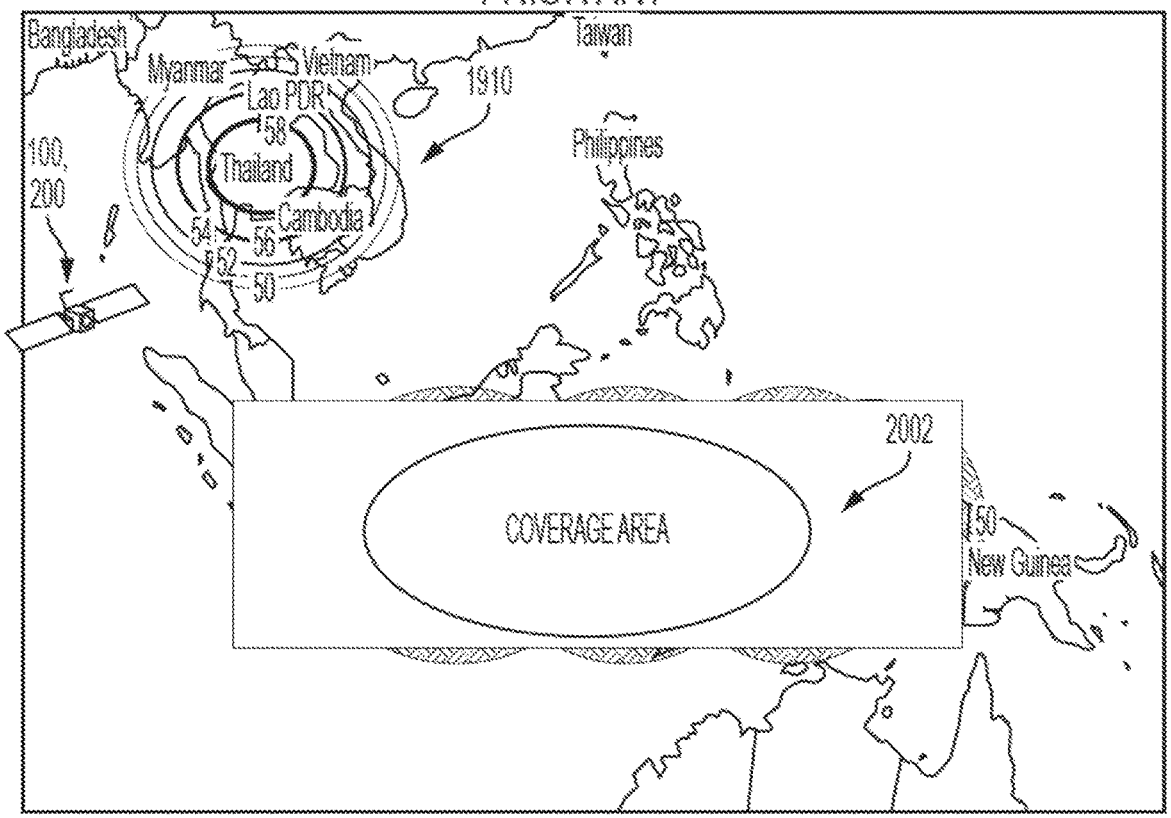
Figure 20B:
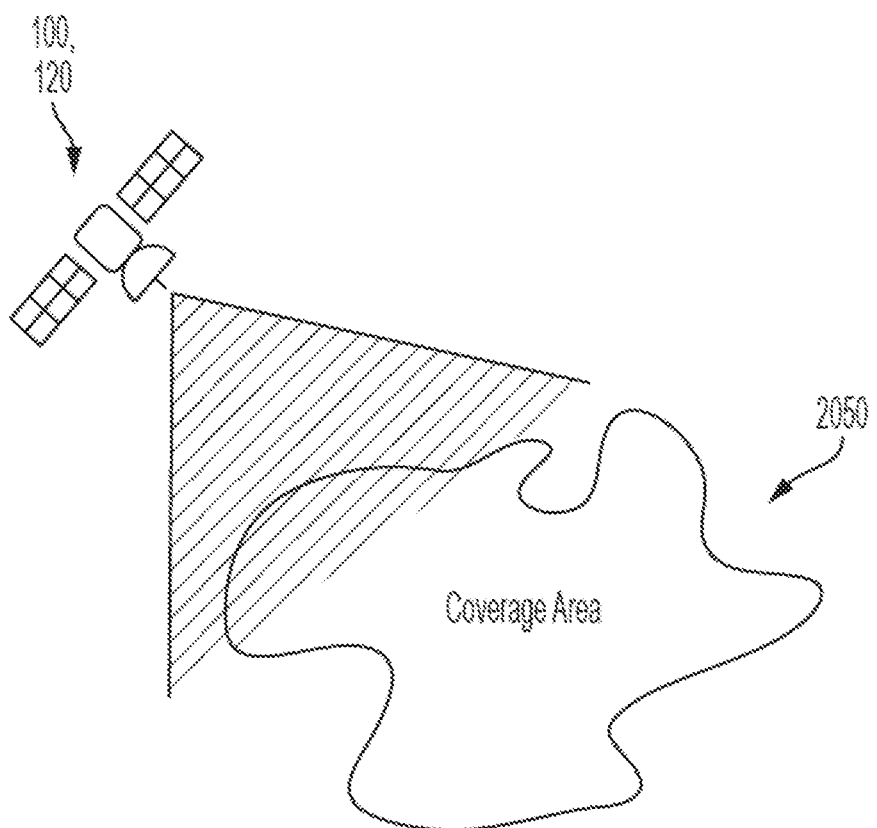
Figure 21:
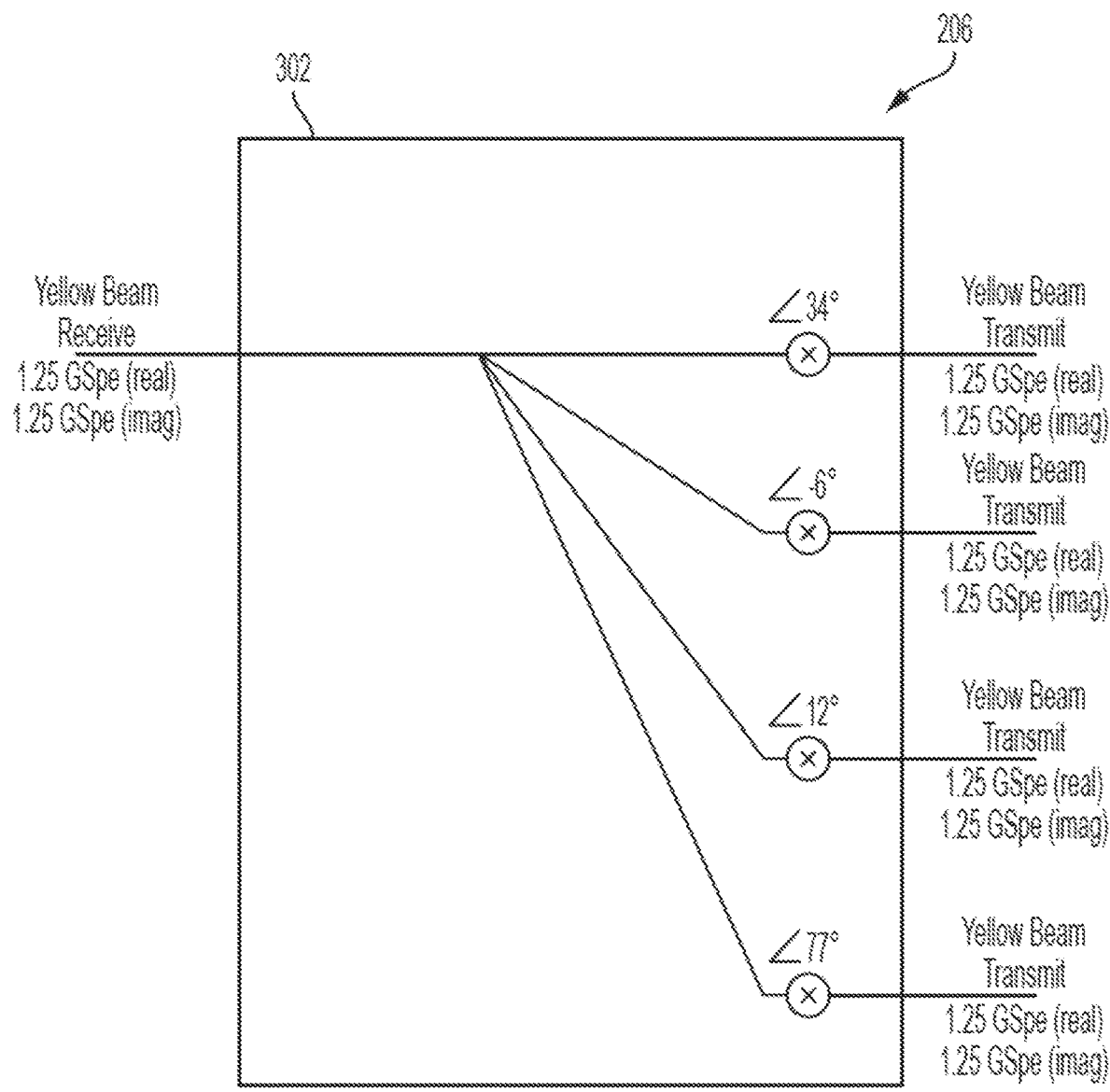

FIGS. 19 to 21 show diagrams related to the beam shape flexibility of the payload communications system 120. FIG. 19 shows a diagram of a coverage area of known satellites. Generally, the beam shapes (driven by the radiation pattern of the antenna) are fixed.

FIGS. 20A and 20B shows diagrams of example beams or radiation patterns provided by the example payload communications system 120. In this example, the four narrow beams from FIG. 19 are re-configured by the SDR 206 into a single wide beam. The beam may be provisioned for broadcast television, for example. The single elongated beam shown in FIG. 20A has consistent Quality of Service ("QoS") coverage throughout the service area.

The elongated beam shown in FIG. 20A is one example of a formed beam shape. It should be appreciated that a combined and/or individual shape of beams may take many forms depending on the terrestrial coverage needed. For example, one or more beams may be formed into a triangular coverage area, an L-shaped coverage area, etc. FIG. 20B shows an example of a possible beam shape. The example SDR 206 may achieve the beam shape shown in FIG. 20B via an over-the-air update which adjusts an amplitude and/or phase of signals entering/leaving each feed on an antenna feed plane. The amplitude and/or phase may be adjusted via a gain varying amplifier, controllable phase shifters, and/or turning on/off certain antennas in an array. The example SDR 206 may provide for separate beam forming for each sub-carrier channel to produce virtually any radiation pattern. As such, the beam forming described herein may be performed digitally within the SDR 206, via analog components, and/or a combination of both.

FIG. 21 shows a diagram of the SDR 206 configured for providing flexible beam shapes using a phased array, which is described below in additional detail. In the illustrated example, the SDR 206 is configured to route a received signal to four transmitters. (In other embodiments, the signal may be routed to fewer or additional transmitters). The SDR 206 adjusts amplitude and phase of the signal for each transmitter to fine tune the shape of the desired beam. In some embodiments, the SDR 206 receives instructions, including phase and/or amplitude information from a ground station. In other examples, the SDR 206 is configured to select the phases and/or amplitudes based on a received indication of a coverage area, QoS requirements, etc. The example beamforming calibration network 702 of FIG. 7 may be used to maintain the relative phases and/or amplitudes as the signal propagates through the transmitters.

Beam Hopping Embodiment

Figure 22:
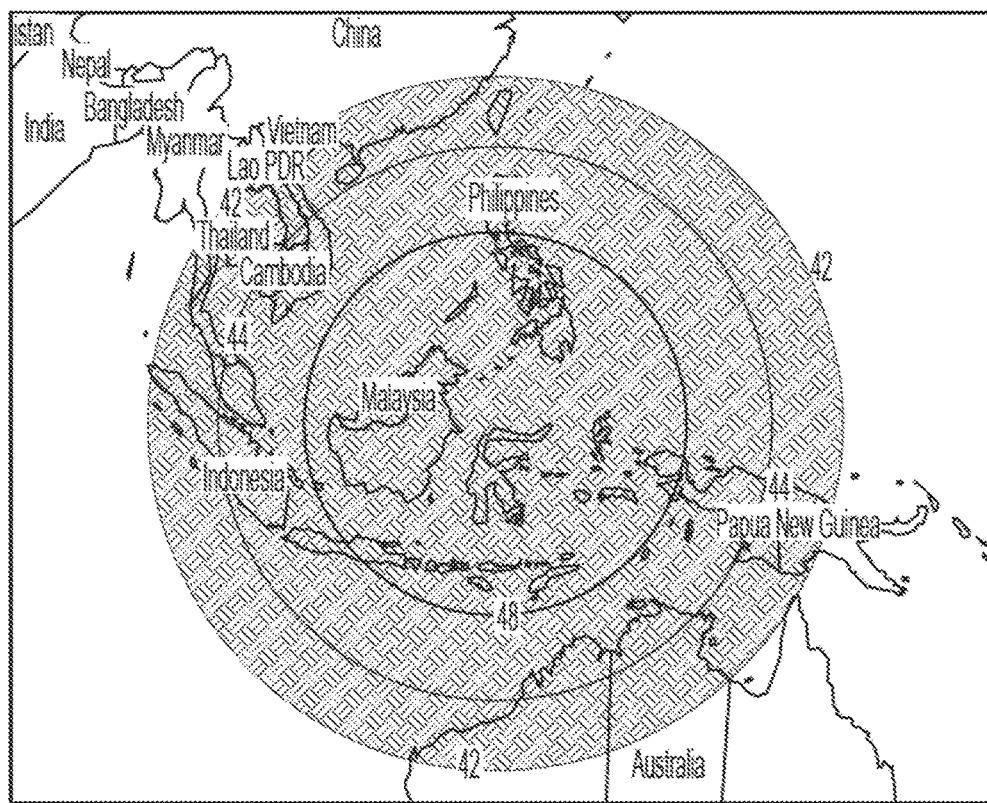
FIGS. 22 and 23B show diagrams that compare known satellite systems and the example GEO communications satellite of FIG. 1 regarding beam hopping capability, according to example embodiments of the present disclosure.
Figure 23A:
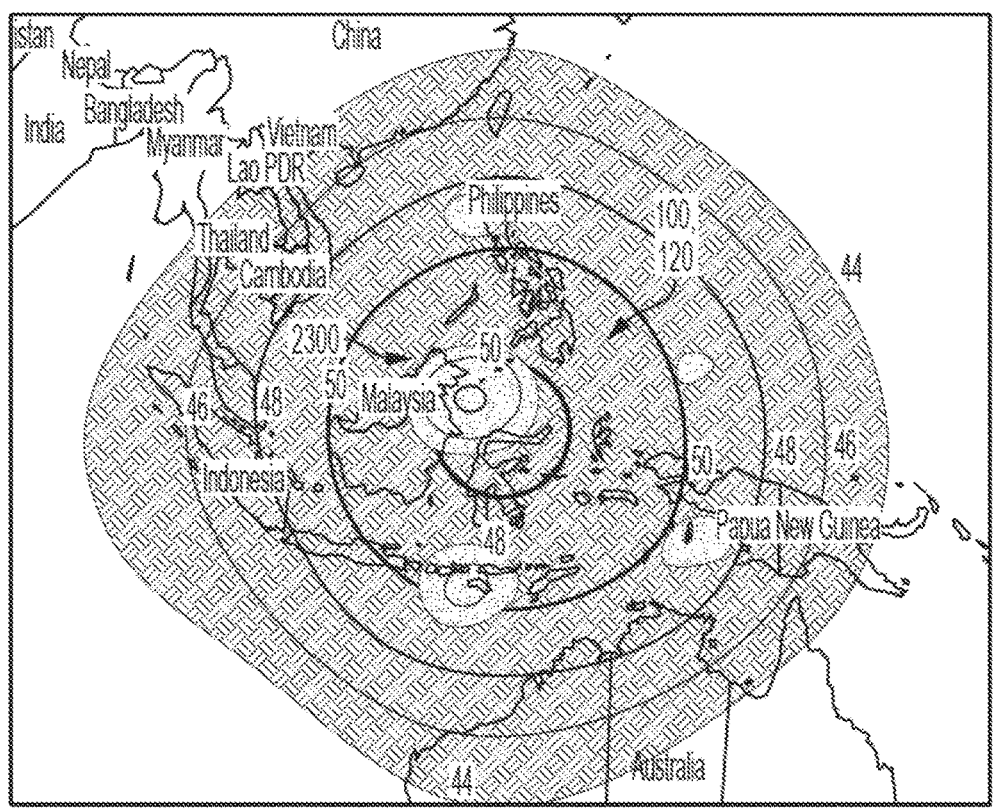
Figure 23B:
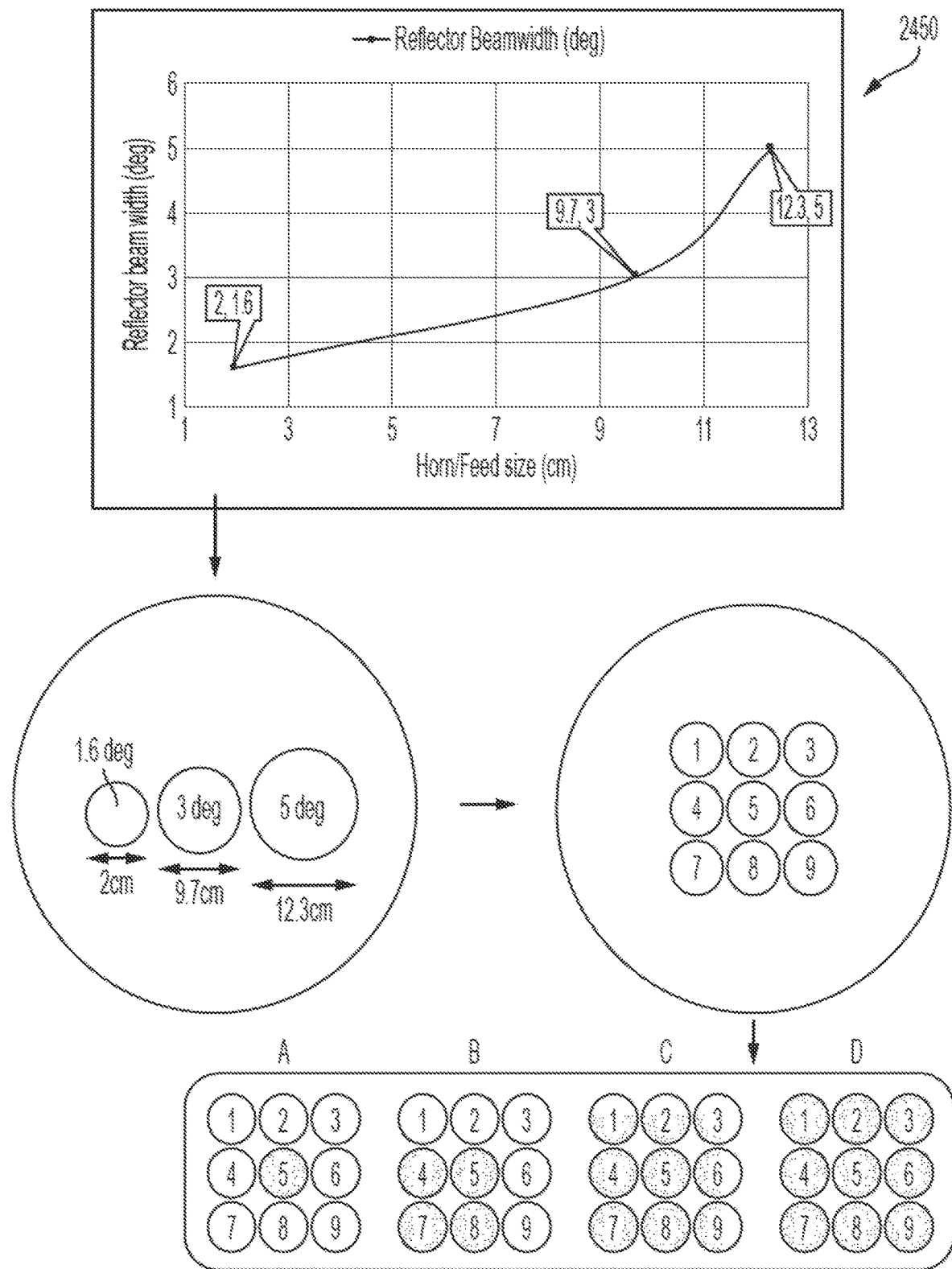

FIGS. 22 to 23B show diagrams related to the beam hopping capability of the payload communications system 120. FIG. 22 shows a diagram of a known satellite system providing a fixed wide-area beam. The known satellites systems are constrained to providing low signal levels throughout the coverage area due to the large geographic area covered. This configuration can be problematic for high throughput cases.

In addition to providing a flexible beam shape, the example SDR 206 of the payload communications system 120 is configured to enable one or many small beams to be moved within a coverage area, as shown in FIG. 23A. This configuration enables a relatively large amount of bandwidth to be provisioned for a small geographic location. In an example, one or more cruise ships may be within a coverage area. Each cruise ship has thousands of passengers that provide a significant bandwidth load in a relatively small area. Instead of a bandwidth-constrained wide beam, the example SDR 206 may create a small beam with high signal levels focused on the cruise ship. In addition, the SDR 206 may cause the beam to follow a path of the cruise ship or jump between cruise ships. As a result, the SDR 206 is able to provide a 5 dB stronger signal while improving average system capacity by 50–100%, for example. The example payload communications system 120 may provide beam hopping for other embodiments, such as satellite service-sharing for providing communication coverage for a large festival or conference taking place for a limited duration in a remote location.

The example SDR 206 may be configured to provide beam hopping based on an over-the-air instruction and/or according to a predetermined routine. The SDR 206 may adjust the location of the beam as quickly as every 5 ms to maximize the gain experienced by a user, thereby increasing capacity on both the forward and return links. The SDR 206 may adjust a location of beam by adjusting an amplitude and/or phase of signals entering and leaving each feed on the feed plane, using for example a phased array or any of the operations discussed above in connection with FIGS. 20A, 20B, and 21.

FIG. 21 shows a diagram of the SDR 206 configured for providing beam hopping. In the illustrated example, the SDR 206 is configured to route a received single to four transmitters. (In other embodiments, the signal may be routed to fewer or additional transmitters). The SDR 206 adjusts a phase of the signal for each transmitter/receiver to move the peak of the transmitted/received beam. In addition, the SDR 206 adjusts phase and amplitude of the signal for each transmitter/receiver to fine tune the shape of the desired beam. The SDR 206 may also adjust the amplitude of the signals.

In some embodiments, the SDR 206 receives instructions, including phase and amplitude information and a location for the beam (e.g., a position of a cruise ship) from a ground station. In other examples, the SDR 206 is configured to select the phase and amplitude based on a received indication of a coverage area, geographic location, QoS requirements, etc. In other examples, the SDR 206 may track a moving object, thereby determining a location for a beam. The SDR 206 may track by moving the beam in different directions and determining to which direction has the greatest bandwidth consumption, which is a modified version of the conical scanning method used in radars making it suitable for satellite application. The example beamforming calibration network 702 of FIG. 7 may be used to maintain the relative phases and amplitude as the signal propagates through the transmitters and/or receivers.

FIG. 23B shows a diagram that illustrates how an array of antennas feeding a reflector can be selectively turned on to move a beam quickly. Graph 2450 shows a relation between reflector antenna beamwidth (e.g., coverage area on the Earth) in degrees and a feed horn aperture size. The graph 2450 shows that as the aperture size increases from 2 to 12.3 mm, the beamwidth increases from 1.6 to 5 degrees. In a static embodiment, different feed horns with different aperture sizes may be used. The SDR 206 may select which feed horn is to be used based on the coverage area requirement. By contrast, in a dynamic environment, the SDR 206 may be connected to an array of smaller feed horns with identical apertures. The SDR 206 is configured to control excitations of the individual feed horns in the array to create different effective aperture sizes. For instance, in the illustrated embodiment, activating only one element (A) will provide a smallest effective feed size while turning on all the elements (D) will provide the largest feed size. The SDR 206 may achieve anything in between by exciting a subset of the elements in a discrete manner, as shown in (B) or by exciting all elements and controlling the excitations with more granularity for continuous control, as shown in (C).

Large Flexible Aperture Antenna Embodiment

Figure 24:
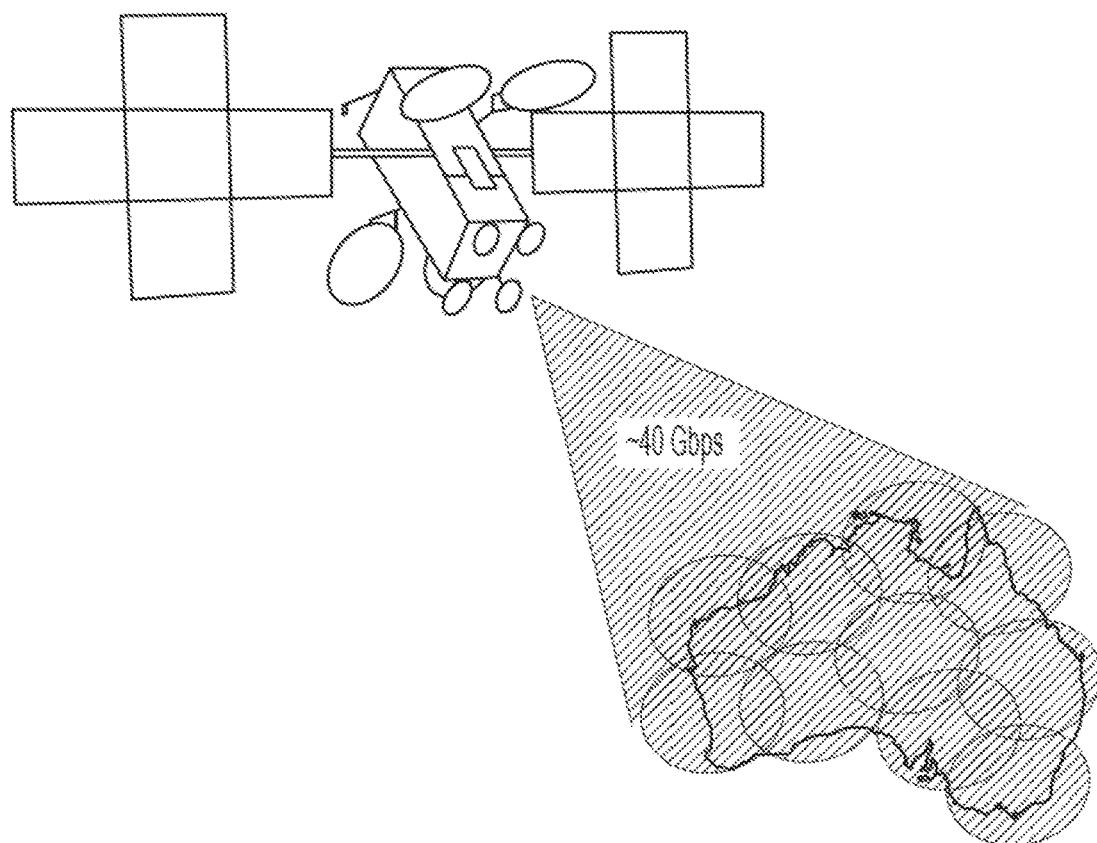
FIGS. 24 and 25B show diagrams that compare known satellite systems and the example GEO communications satellite of FIG. 1 regarding the use of large flexible aperture antennas, according to an example embodiment of the present disclosure.
Figure 25A:
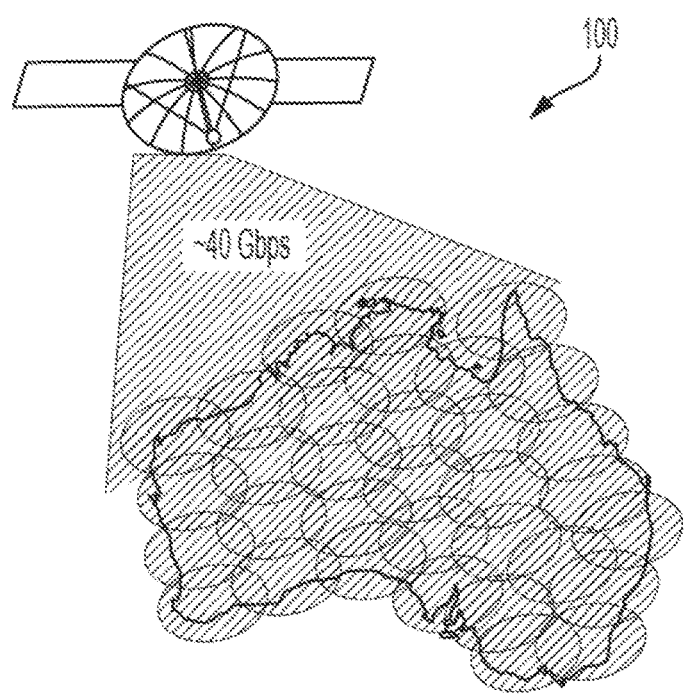
Figure 25B:
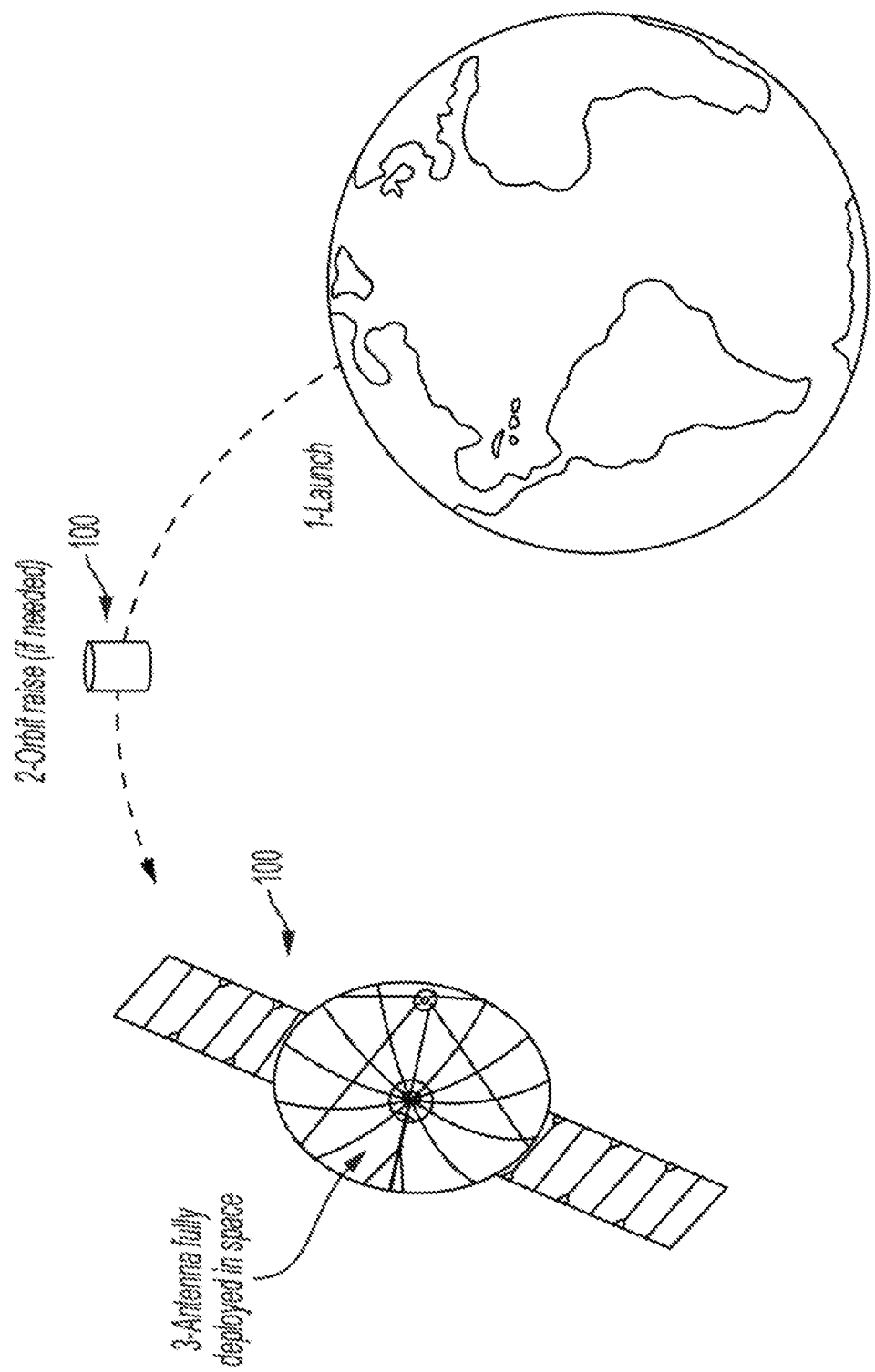

FIGS. 24 to 25B show diagrams related to capabilities of the GEO communications satellite 100, including the SDR 206, regarding the use of large flexible aperture antennas, according to an example embodiment of the present disclosure. As shown in FIG. 24, known satellites are constructed as single-piece structures such that antenna sizes are limited in diameter. The size limitation on the antenna limits maximum equivalent isotropically radiated power ("EIRP") and gain to noise-temperature ("G/T"), which limits data throughput. Many known satellites, as shown in FIG. 24, use multiple small to medium (e.g., 1 to 2 meter) reflectors.

FIG. 25A shows an example of the GEO communications satellite 100 with antennas with larger apertures. While the use of large apertures is not new, the use of large flexible aperture antennas on a relatively small GEO communications satellite is unique. The antennas may be stowed for launch and deployed and expanded when the GEO communications satellite 100 is in orbit (hence called "flexible"). The GEO communications satellite 100 may include an unfurlable mesh antenna, an expandable antenna, a deployable or foldable (flexible or solid) antenna, a flexible (compliant solid) antenna, and/or a stowable array antenna (forming various types of flexible antennas). The GEO communications satellite 100 may be configured specifically to provide a larger aperture antenna and provide for a unique deployable structure without constraints from other adjacent antennas or space limitations within the housing. As shown in FIG. 25A, the use of the larger reflector, along with proper feed architecture, enables more spot beams to be provisioned for the same data rate as shown in FIG. 24 at a substantially lower cost.

FIG. 25B shows an example regarding how the GEO communications satellite 100 may be launched with a large flexible aperture antenna. In the illustrated embodiment, an antenna is packed into a very small volume during launch (and orbit raise depending on mission requirements). The packing enables an antenna with more than a 5× aperture size to be used, which would occupy the same volume as a traditional reflector antenna. After the satellite 100 is positioned, the antenna with the large flexible aperture is unfurled, thereby providing a dramatic savings in time and cost of the mission while providing unprecedented data rates.

Interlaced Beams Embodiment

Figure 26:
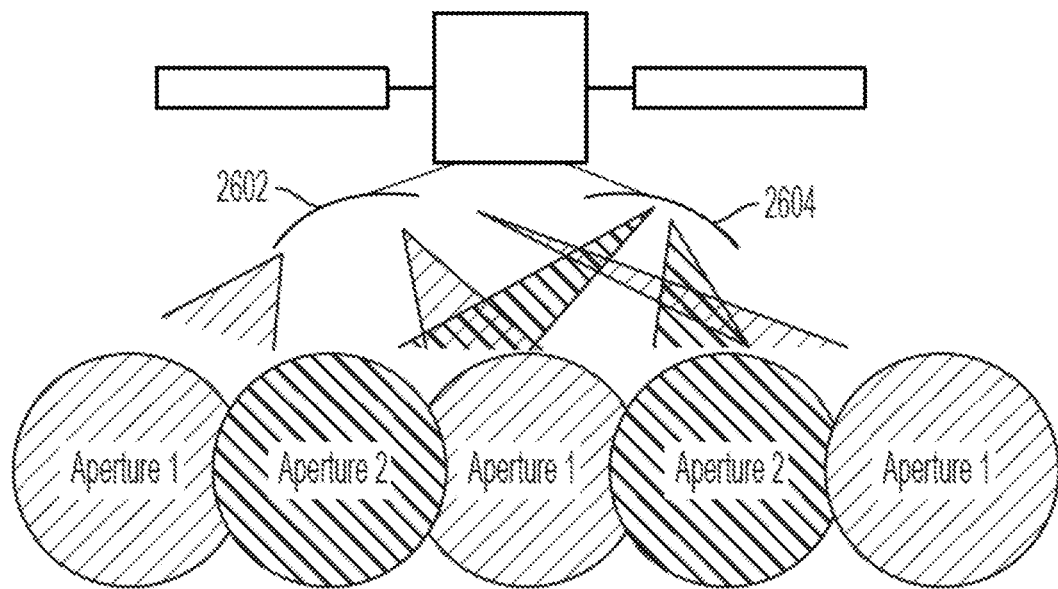
FIGS. 26 and 27 show diagrams that compare known satellite systems and the example GEO communications satellite of FIG. 1 regarding the use of interlaced beams, according to an example embodiment of the present disclosure.
Figure 27:
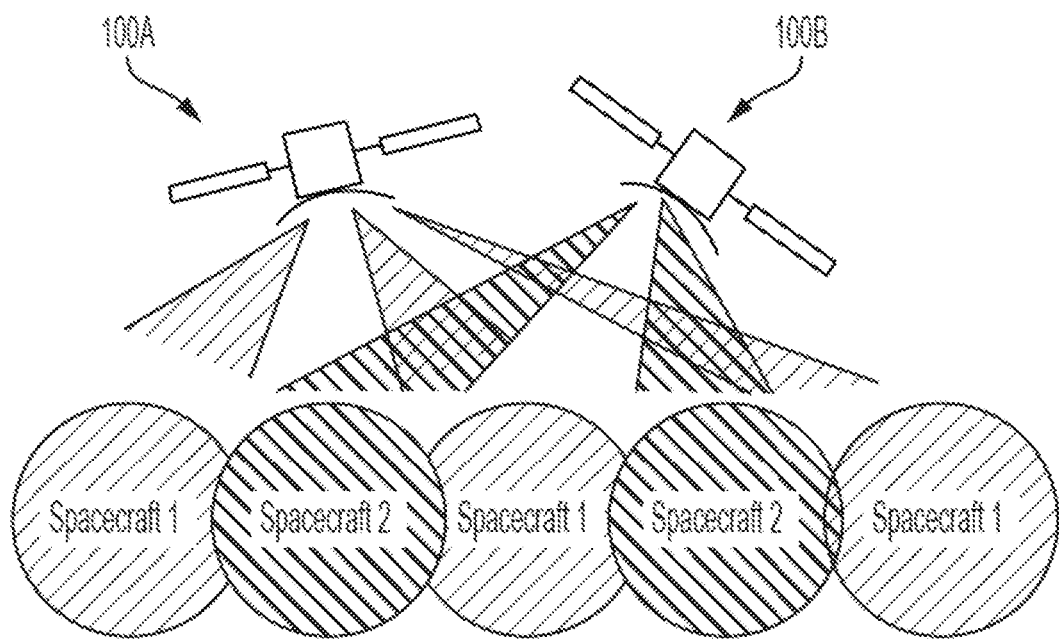

FIGS. 26 and 27 show diagrams related to capabilities of the GEO communications satellite 100, including the SDR 206, regarding the use of interlaced beams, according to an example embodiment of the present disclosure. FIG. 26 shows a figure of a known satellite with multiple apertures. In the illustration, the multiple apertures (shown as Aperture 1 and 2) and reflectors provide different interleaved beams. The illustrated configuration requires a large satellite with multiple apertures and reflectors to achieve a tight-arrangement or packing of beams.

By comparison, FIG. 27 shows a diagram of multiple communication satellites 100 (shown as satellites 100A and 100B) that are arranged to achieve a tight packing of separate beams. In the illustrated example, each of the communications satellites 100 may include only a single aperture such that the beams from each satellite 100 are interleaved. This arrangement of single-aperture satellites 100 enables capacity to be phased-in or a sub-set of capacity to be repointed or any other use/advantage of providing a small, single-aperture satellite. The illustrated satellites 100A and 100B are specifically orientated and coordinated with respect to each other to provide for the tight-packing of beams without having to compensate for aperture or reflector size or orientation, thereby enabling single aperture satellites to achieve the performance of known conventional, multiple aperture satellites.

Low-Element and High-Element Phased Arrays Embodiments

Figure 28:
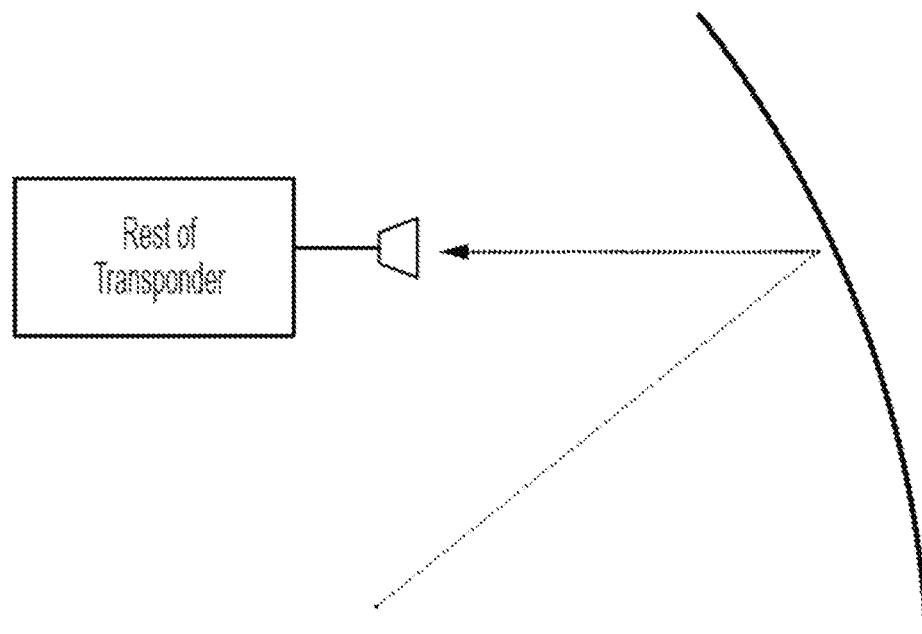
FIGS. 28 to 30 show diagrams that compare known satellite systems and the example GEO communications satellite of FIG. 1 regarding the use of low-element and high-element phased arrays, according to an example embodiment of the present disclosure.
Figure 29:
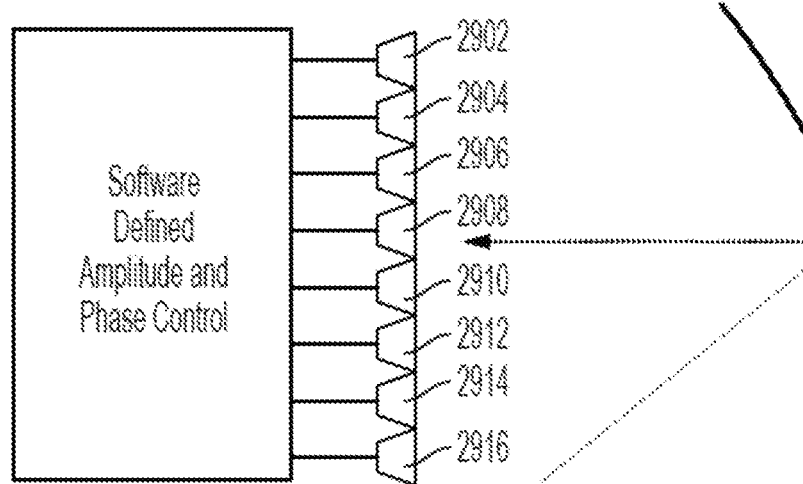
Figure 30:
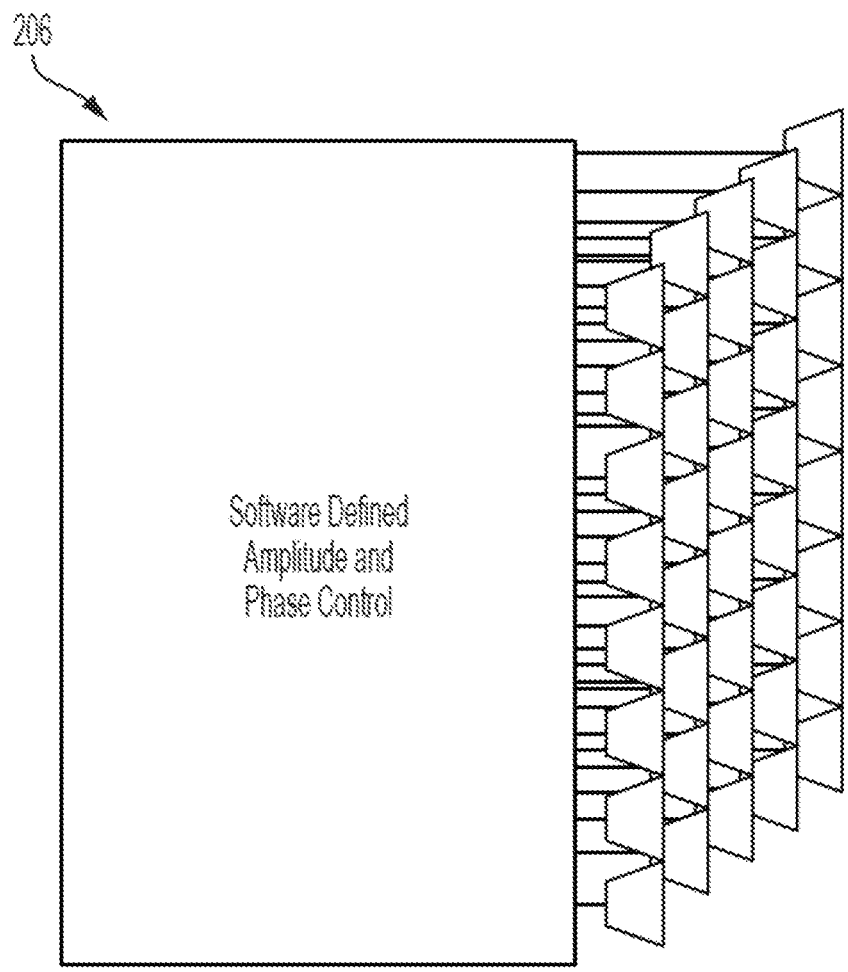

FIGS. 28 to 30 show diagrams related to capabilities of the GEO communications satellite 100, including the SDR 206, regarding the use of low-element phased arrays, according to an example embodiment of the present disclosure. FIG. 28 shows a diagram of a known satellite where a single feed per beam is configured. The single feed per beam generally results in an inflexible beam footprint on the ground. In addition, power needed to supply the single feed is relatively high to drive costly, but highly efficient, conventional traveling wave tube amplifiers.

FIG. 29 in contrast shows the satellite 100 with the SDR 206 having a relatively low number of feed elements. Generally, phrased arrays are complex to implement based on the large number of elements needed. However, the example SDR 206 reduces element complexity via dynamic digital control of the amplitude and phase for the elements in the array. The SDR 206 provides software control of amplitude and/or phase of each transmission/reception signal for each feed. As discussed above, this amplitude and/or phase flexibility enables dynamic beam shapes and beam-hopping. In some instances, a relatively low element count phased array may not generate the directivity needed for a link. As a result, the GEO communications satellite 100 may include one or more reflector surfaces to improve link directivity.

FIG. 30 shows the satellite 100 with the SDR 206 having a multiple feed for a relatively large number of elements. The satellite 100 may include a large number of low-power solid state power amplifiers (SSPAs), high element count, and/or software control of signal amplitude and/or phase via the SDR 206. The illustrated configuration enables a highly directive, highly steerable beam footprints. In addition, the illustrated phased array is configured to directly radiate towards the Earth, thereby removing the need for any reflectors.

Noise Removal Embodiment

Figure 31:
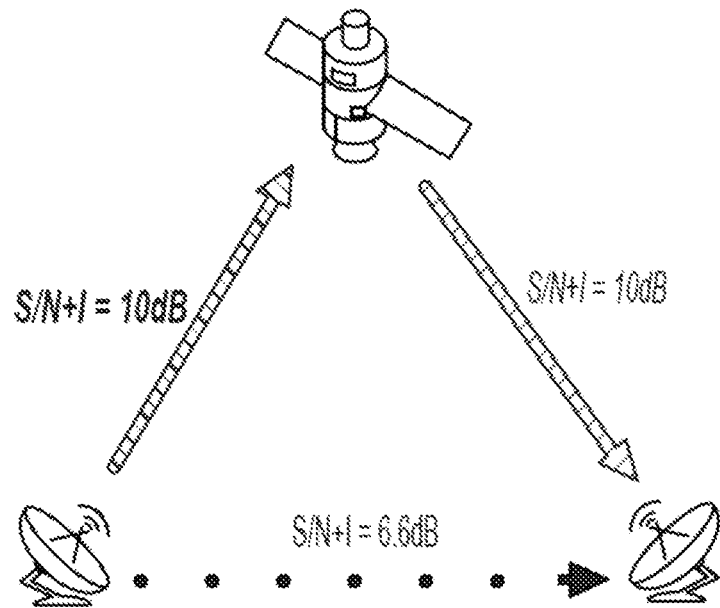
FIGS. 31 to 33 show diagrams that compare known satellite systems and the example GEO communications satellite of FIG. 1 regarding noise removal capability, according to example embodiments of the present disclosure.
Figure 32:
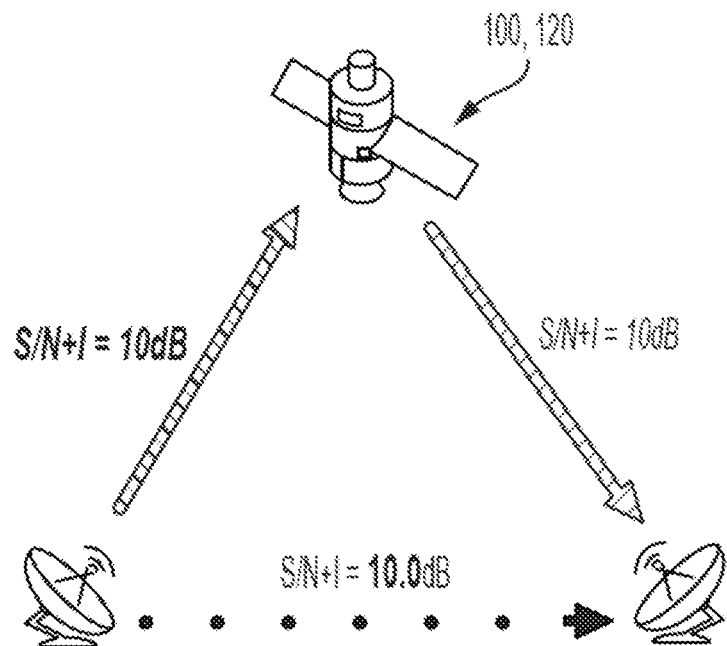
Figure 33:
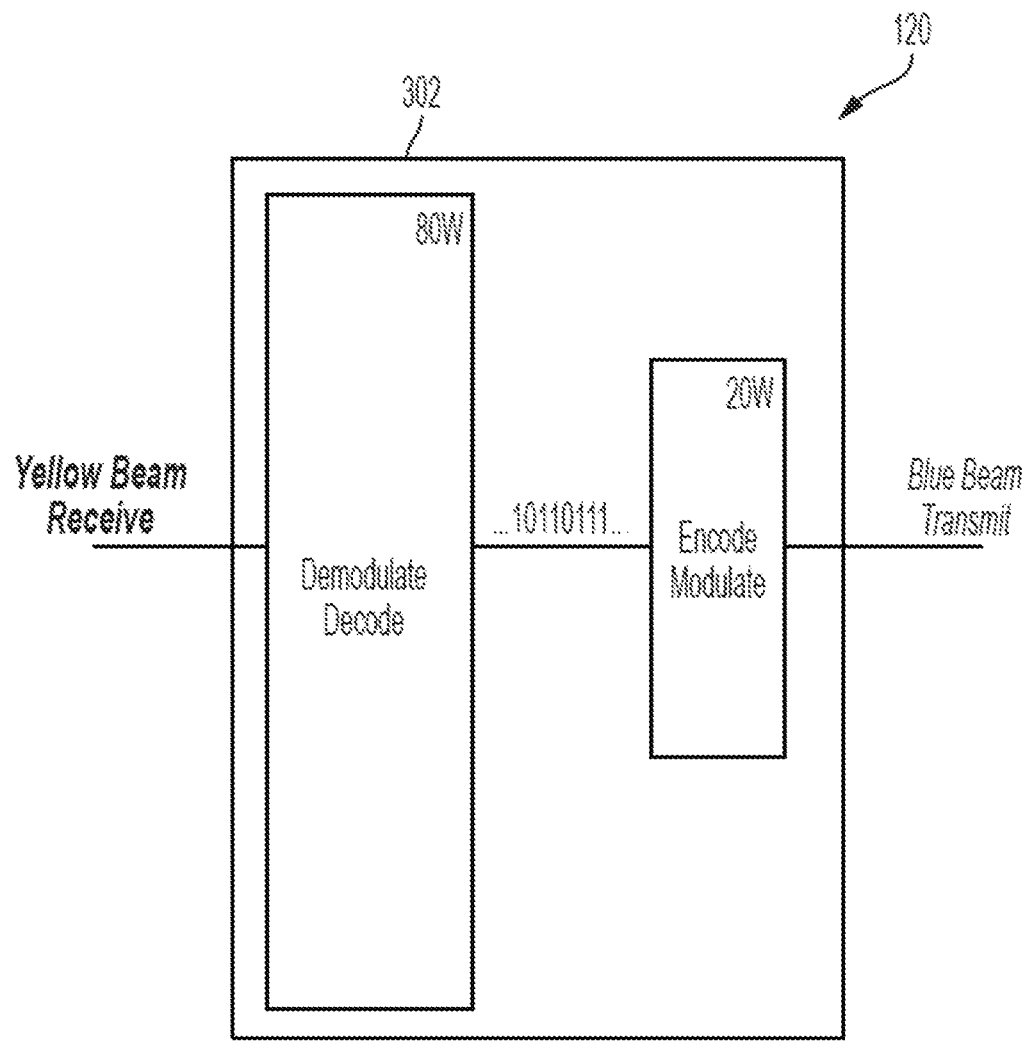

FIGS. 31 to 33 show diagrams related to the noise removal capability of the payload communications system 120. FIG. 31 shows a known satellite in which noise is propagated from uplink (receive) to downlink (transmit). This causes the known satellite to transmit degraded signal quality, and waste power on noise transmission, which could lead to losses in signal strength by up to 6.5 dB.

FIG. 32 shows a diagram of the example payload communications system 120 removing virtually all interference and noise from a signal before retransmitting to a gateway or user terminal. In the illustrated example, the signal to noise ratio is maintained at 10 dB. This can be especially important when the payload communications system 120, via the SDR 206 is configured to route traffic between adjoining beams, which may create signal interference. By removing the noise and interference between the adjacent beams, the SDR 206 is capable of improving signal quality by more than 3 dB at the user terminal, thereby increasing capacity by over 30% between the adjoining beams.

FIG. 33 shows a diagram of the example SDR 206 regarding its noise removal capabilities. To remove noise, the example SDR 206 is configured to demodulate and decode a received signal into a digital or binary stream of '1s' and '0s'. This may be provided in conjunction with signal routing between slices, as described above in regard to network topology. For transmission, the digital signal is reconstructed via modulation and encoding and transmitted on the desired slice.

The example SDR 206 is configured to remove noise in any waveform via an over-the-air update specifying, for example, the waveform parameters for modulation in addition to processing and filtering. In some examples, the SDR 206 may operate in connection with hardware components configured to remove noise from a signal. Additionally, or alternatively, the SDR 206 may provide noise removal via regenerative digital signal processing.

Compressed Gateway Spectrum Embodiment

Figure 34:
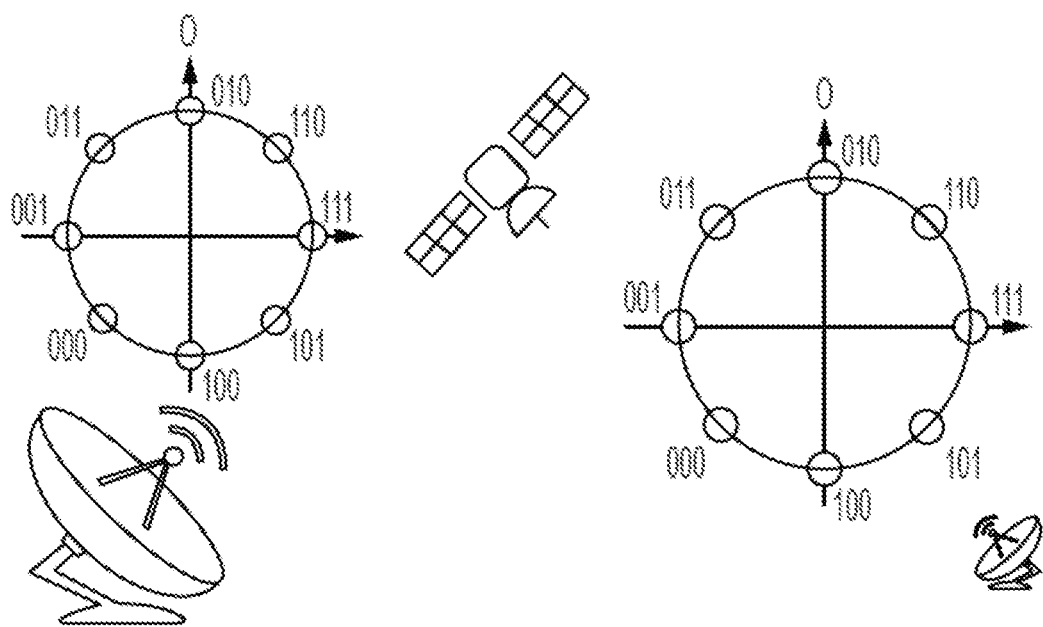
FIGS. 34 and 35 show diagrams that compare known satellite systems and the example GEO communications satellite of FIG. 1 regarding compressed gateway spectrum, according to example embodiments of the present disclosure.
Figure 35:
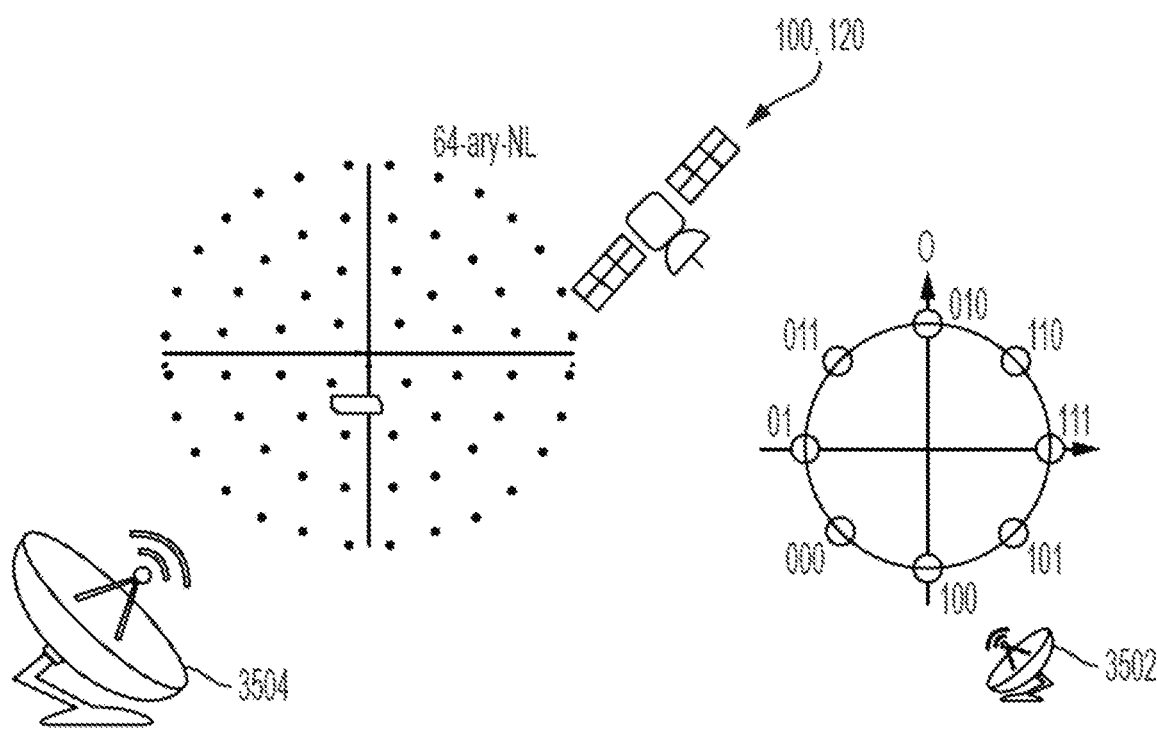

FIGS. 34 and 35 show diagrams related to the compressed gateway spectrum capability of the payload communications system 120. FIG. 34 shows a diagram of a known satellite system in which a modulation and encoding scheme is provisioned in which an eight symbol constellation is used on the user links and the same eight symbol constellation is used on the gateway links, where the modulation is the same for the user and gateway links. In some known systems, the satellite system may be provisioned such that a different modulation and encoding scheme is used for the gateway link because the gateway terminal is larger. This enables the modulation used for the gateway to be more spectrally efficient. However, the known satellite systems are fixed in that the modulation and coding cannot be changed after deployment. Thus, if conditions change or service is provided for a different provider, the provisioned modulation and encoding scheme may not be sufficient. For example, a smaller gateway could be installed or used. However, the known satellite has already been provisioned to operate efficiently with a larger gateway.

In some instances, the gateway and user links may use the same modulation and coding for known satellite systems. The gateway link may use the same modulation and coding despite the gateway link having significantly more C/N margin. The reason for this is because convention transponders on known satellites are incapable of altering the modulation and coding of a received signal before retransmitting.

The example payload communications system 120 of the GEO communications satellite of FIG. 35 is configured to change modulation and encoding schemes for any of the user or gateway slices. For example, upon use of a larger gateway, the SDR 206 may change a modulation and coding scheme to one that is more spectrally efficient, thereby allowing spectrum to be repurposed and used to increase system capacity or throughput by at least 15% without increasing the spectrum allocated to the gateway. This additional spectrum can be used for serving additional content, for example. In other words, spectrum saved on the gateway link can be provided by the SDR 206 for user links. In the illustrated example, the SDR 206 may provide eight symbols on user links or slices and 64 symbols on the gateway links. Accordingly, the SDR 206 enables the modulation and coding for the gateway link to be independent of the modulation and coding used for the user links, which are often C/N limited.

FIG. 33 shows a diagram of the example SDR 206 regarding compressed gateway spectrum capabilities. The example SDR 206 has software-based demodulators/decoders and modulators/encoders. The SDR 206 may select between the different programmed demodulators/decoders and modulators/encoders for each slice or link. This may be provided in conjunction with signal routing between slices, as described below in regard to network topology. For transmission, the digital signal is reconstructed via the selected modulation and encoding and transmitted on the desired slice or link.

Equalization Embodiment

Figure 36:
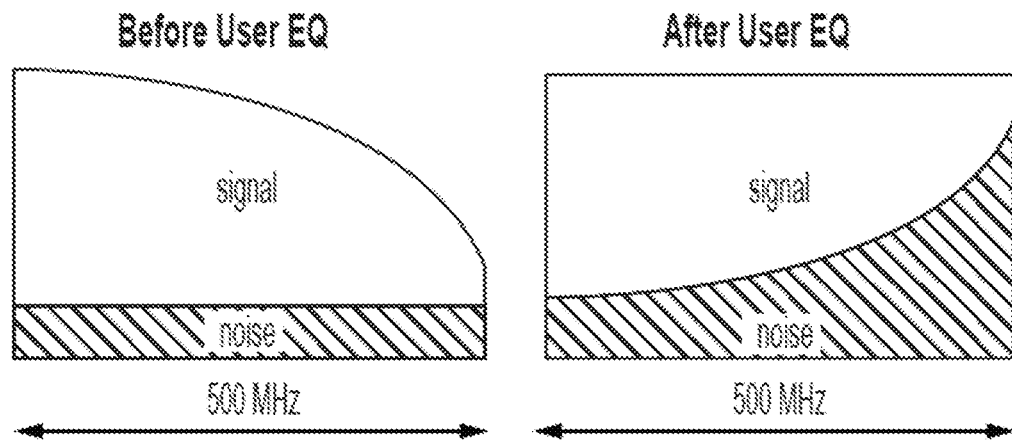
FIGS. 36 and 37 show diagrams that compare known satellite systems and the example GEO communications satellite of FIG. 1 regarding equalization capability, according to example embodiments of the present disclosure.
Figure 37:
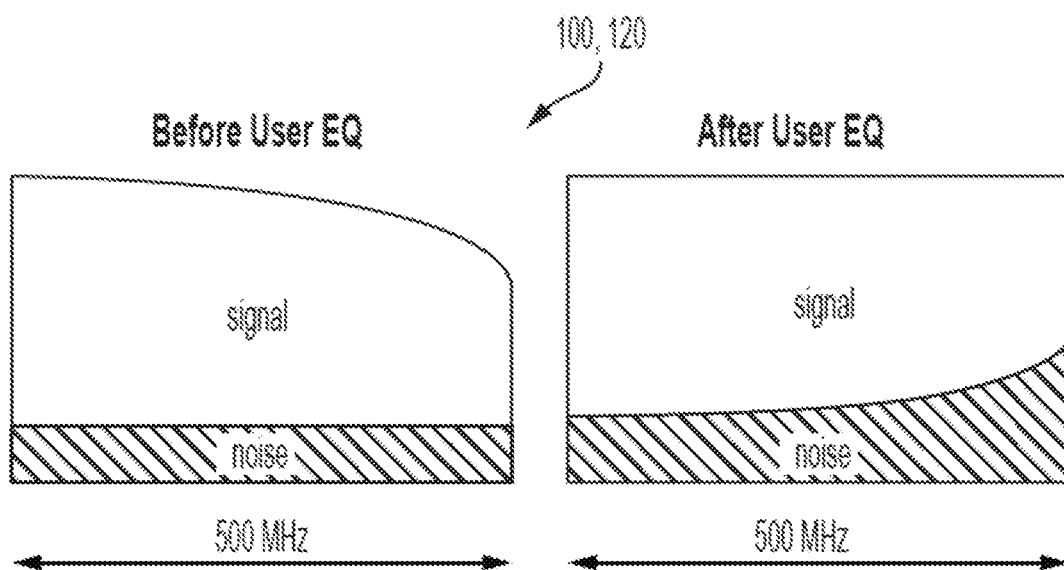

FIGS. 36 and 37 show diagrams related to the equalization capability of the payload communications system 120. Generally, known satellite systems are not capable of providing equalization. Instead, user terminals provide equalization of the received satellite signal. However, equalization performance by ground receivers is limited since significant thermal noise has been introduced before the equalization is performed. FIG. 36 shows that for known systems, user terminals equalize the received signal but amplify the noise significantly in the process. The amplification of noise, especially at higher frequencies, can lower throughput by at least 10%, especially when operating in ultra-wideband channels, such as 500 MHz and above.

In contrast to known satellite systems, the example SDR 206 of the payload communications system 120 (included in the satellite 100) is configured to equalize the signal before downlink noise is added, thereby leaving a relatively small amount of equalization to be done by the user terminal. As shown in FIG. 37, the example SDR 206 is configured to provide digital equalization, which corrects for (i) different frequencies having slightly different gains/losses passing through the atmosphere (e.g., rain, clouds, scintillation in the troposphere), filters, amplifiers, etc., and (ii) different frequencies taking different amounts of time to propagate through the atmosphere, filters, amplifiers, etc. that may affect or introduce signal gain slope, reflections, and/or group delay distortion. The equalization performed by the SDR 206 means there is less amplification of noise by the user terminal, and thus a higher capacity link, thereby improving the data rate of the system.

The example processor 302 may include a 12-bit complex tap applied to each 2 MHz subcarrier, as described above in connection with the network topology flexibility. The processor 302 in other embodiments may include an 8-bit complex tap up to a 24-bit complex tap. In some instances, the taps may be determined via calibration over temperature and frequency, or in a closed loop adaptive fashion.

Flexible Network Topology Embodiment

Figure 38:
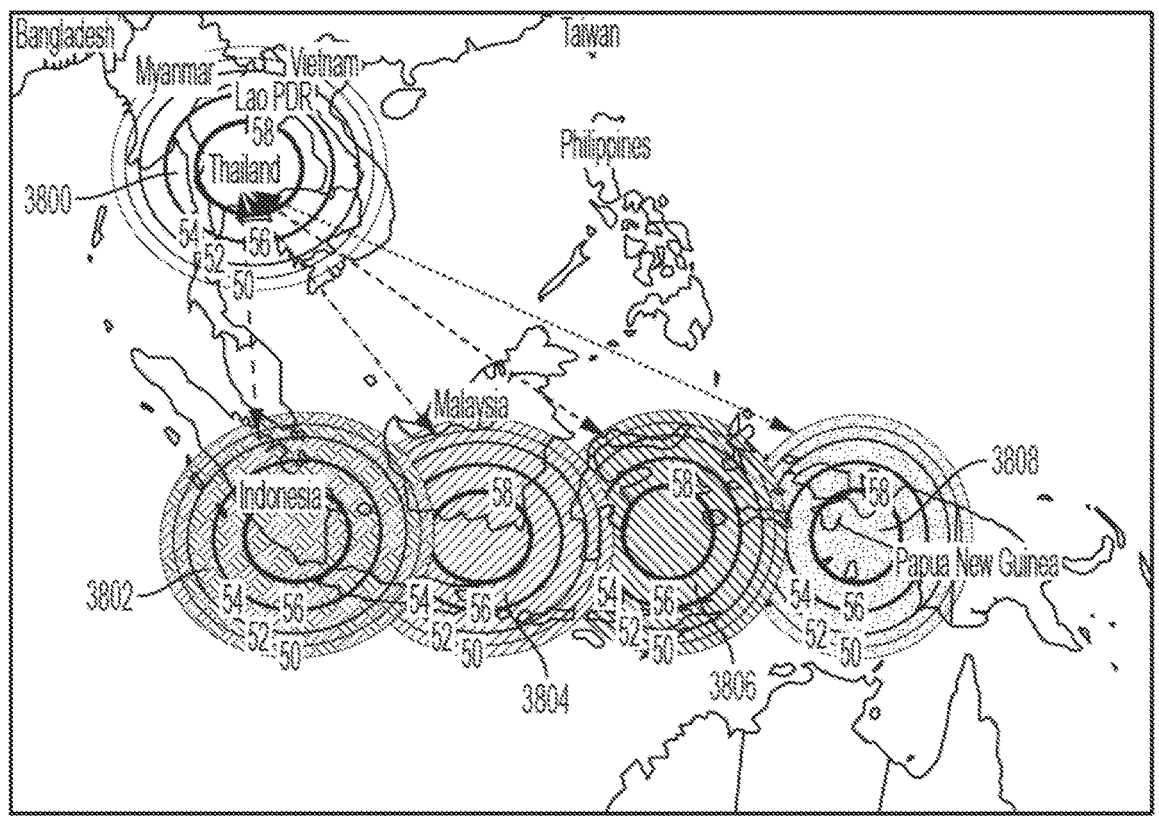
FIGS. 38 to 41 show diagrams that compare known satellite systems and the example GEO communications satellite of FIG. 1 regarding network topology flexibility, according to example embodiments of the present disclosure.

FIGS. 38 to 41 show diagrams that compare known satellite systems and the example GEO communications satellite 100 regarding network topology flexibility. FIG. 38 shows a diagram of coverage areas for known satellite systems. The systems are configured in a hub-and-spoke configuration where at least one beam 3800 is dedicated for a gateway station while separate beams are provided for user terminals. In this hub-and-spoke configuration, the satellite system causes all communications to be routed through the gateway station, which determines whether the communications are to be routed to another user terminal in the same or a different beam.

Figure 39:
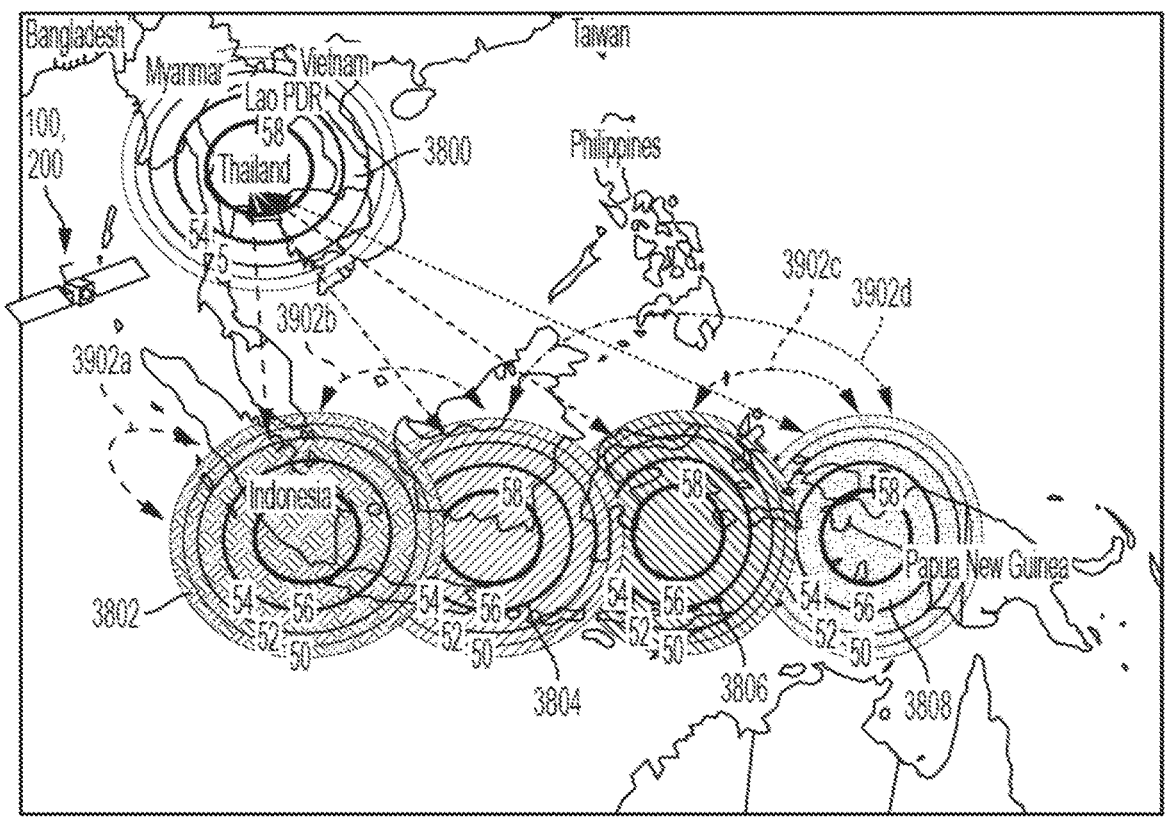

In contrast to the known satellite systems, the example payload communications system 120 is configured to be able to support virtually any network topology, including mixing network topologies. FIG. 39 shows an example of network topologies supportable at the same time by the example payload communications system 120. Similar to the known systems, the payload communications system 120 supports a hub-and-spoke topology. Additionally, the example SDR 206 of the payload communications system 120 enables other network topologies to be supported, such as user-to-user (shown as links 3902), mesh, and/or a combination of hub-spoke and user-to-user. In some embodiments, the network topology may vary over many time scales (e.g., seasonally, daily, hourly, etc.). The SDR 206 is configured to adjust to the network topology via over-the-air software or digital logic updates, which provides flexible channelization and routing for steering traffic.

The SDR 206 may be provisioned via over-the-air programming to support a specified topology. In a combined topology, the SDR 206 may route data based on network or link layer protocols to enable data to be transmitted in a return link or routed to another satellite. In an example, the SDR 206 (and/or a ground station) may detect that a gateway link or beam is close to capacity. However, a significant amount of traffic originates and ends in one beam. Instead of sending this identified traffic to the gateway station, the example SDR 206 is configured to route the traffic back through the beam to the destination terminals, thereby reducing the traffic on the gateway beam. Thus, the SDR 206 saves gateway spectrum and power and improves networking speeds by eliminating one receive/transmit route on the gateway link. The SDR 206 may read a destination address (and/or use geolocation data related to the destination terminal) to identify to which beam a communication is to be routed.

In another example, the SDR 206 (and/or a ground station) may detect that a large data center is located in a user beam or link. Instead of sending all of the traffic through the gateway link, the SDR 206 is configured to determine user beams for the traffic. Accordingly, the SDR 206 routes network traffic directly to a destination user terminal, thereby saving bandwidth usage on the gateway link and improving network latency.

Figure 40:
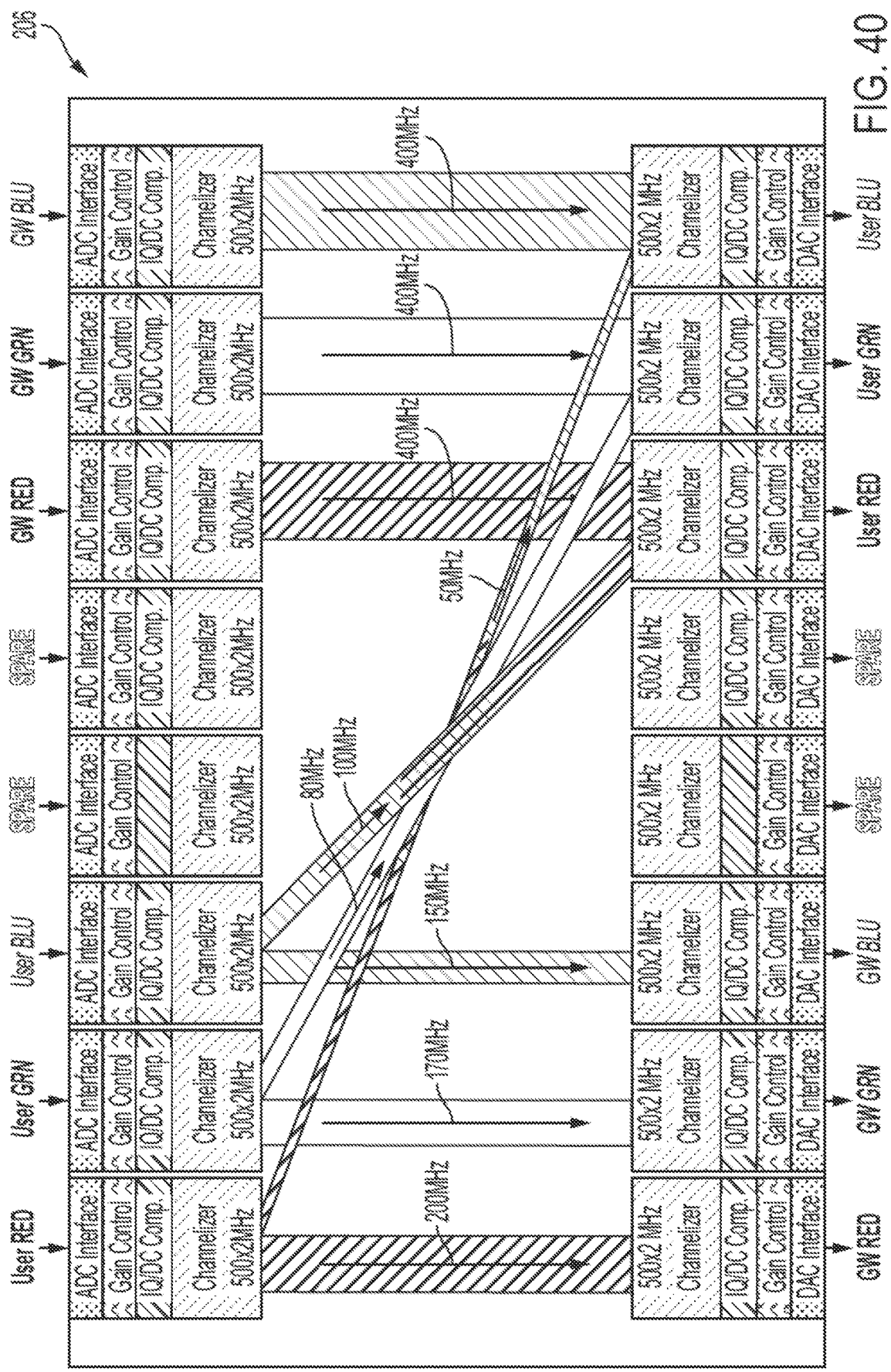

FIG. 40 shows a diagram of the example SDR 206 configured to support multiple network topologies. Subchannels can be flexibly linked across slices by the SDR 206, enabling network traffic to be routed internally within the example payload communications system 120, rather than sending all received communications to a ground-based gateway station. In the illustrated example, more of the bandwidth is reserved for routing to/from a gateway station. However, at least some bandwidth is allocated between the different user slices (e.g., links or beams). For example, 100 MHz of bandwidth is provisioned between a blue user slice and a red user slice. It should be appreciated that in some embodiments, each user slice may have at least some bandwidth allocated for routing traffic to each of the other user slices (as well as the gateway slice).

Figure 41:
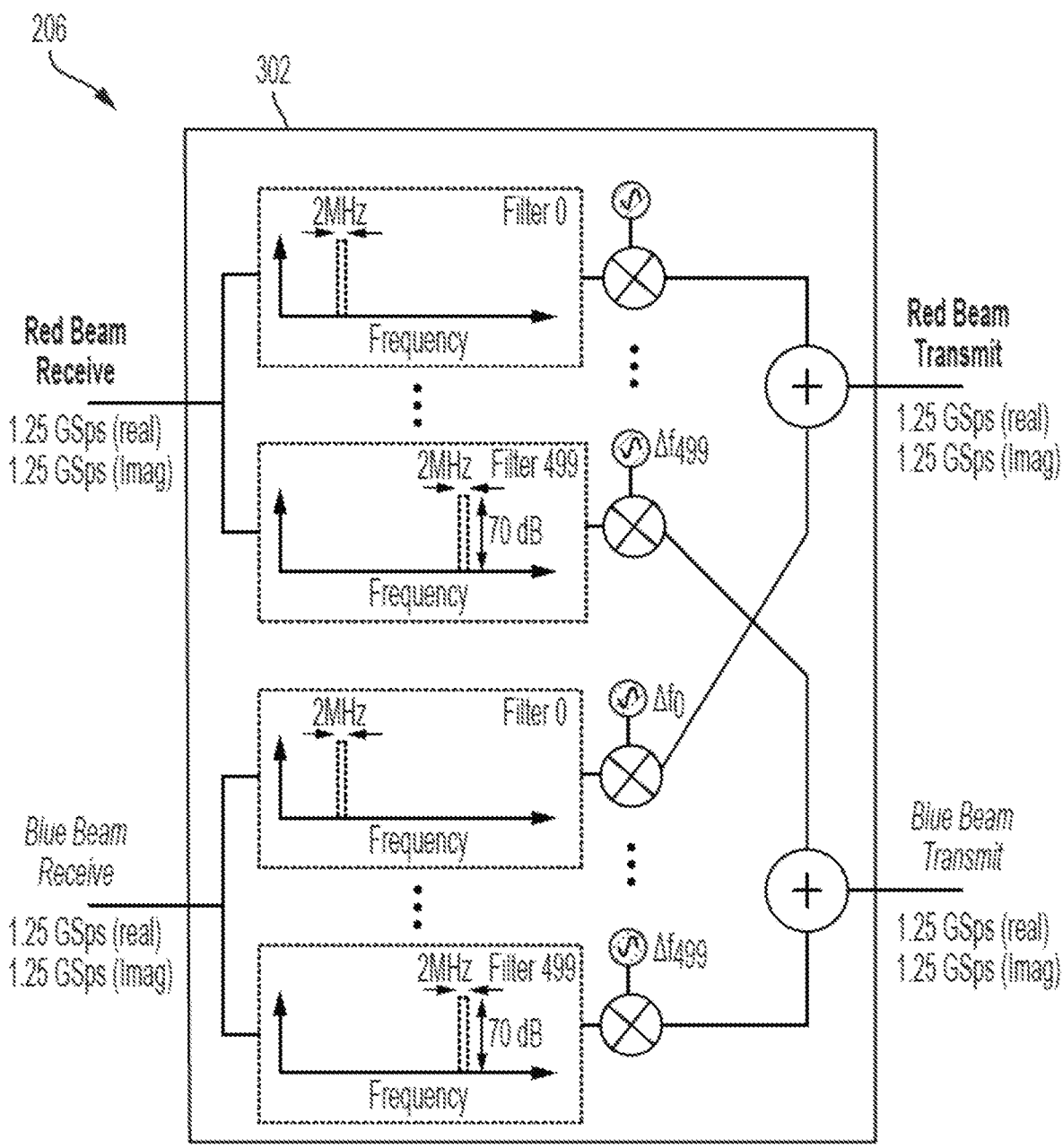

FIG. 41 shows a diagram of features of the SDR 206 for providing a flexible network topology, in some embodiments. The example SDR 206 is configured to separate the received signals into many narrowband channels. For example, a 1.0 GHz signal may be separated into 500 2.0 MHz subcarriers. In other examples, a 1.0 GHz signal may be separated into 2, 500 MHz subcarriers or 250, 4 MHz subcarriers. This configuration removes adjacent channels to the 1.0 GHz signal (to −40 dBc). The SDR 206 may achieve channel separation via a polyphase filter bank, or any digital filtering structure. The polyphase filter may have, for example, an input sample rate of 1250 MHz for 14 bit I and Q, a pass band of 1.0 MHz with 2.0 MHz two-sided passband, a stop band start of 3.0 MHz, a transition band of 2.0 MHz, a pass band ripple of 0.1 dB, and a stop band rejection of 92.0 dB to ensure aliasing into the passband is at most −40 dBc in the presence of adjacent interference at +26 dB SD.

For signal routing, the example SDR 206 is configured to change the frequency and/or beam assignment of each narrowband channel. The SDR 206 then combines the many narrowband channels for each transmit beam before transmitting. The SDR 206 may achieve signal construction via a polyphase filter bank, or any digital filtering structure.

Intersatellite Linking and Mesh Networking Embodiments

Figure 42:
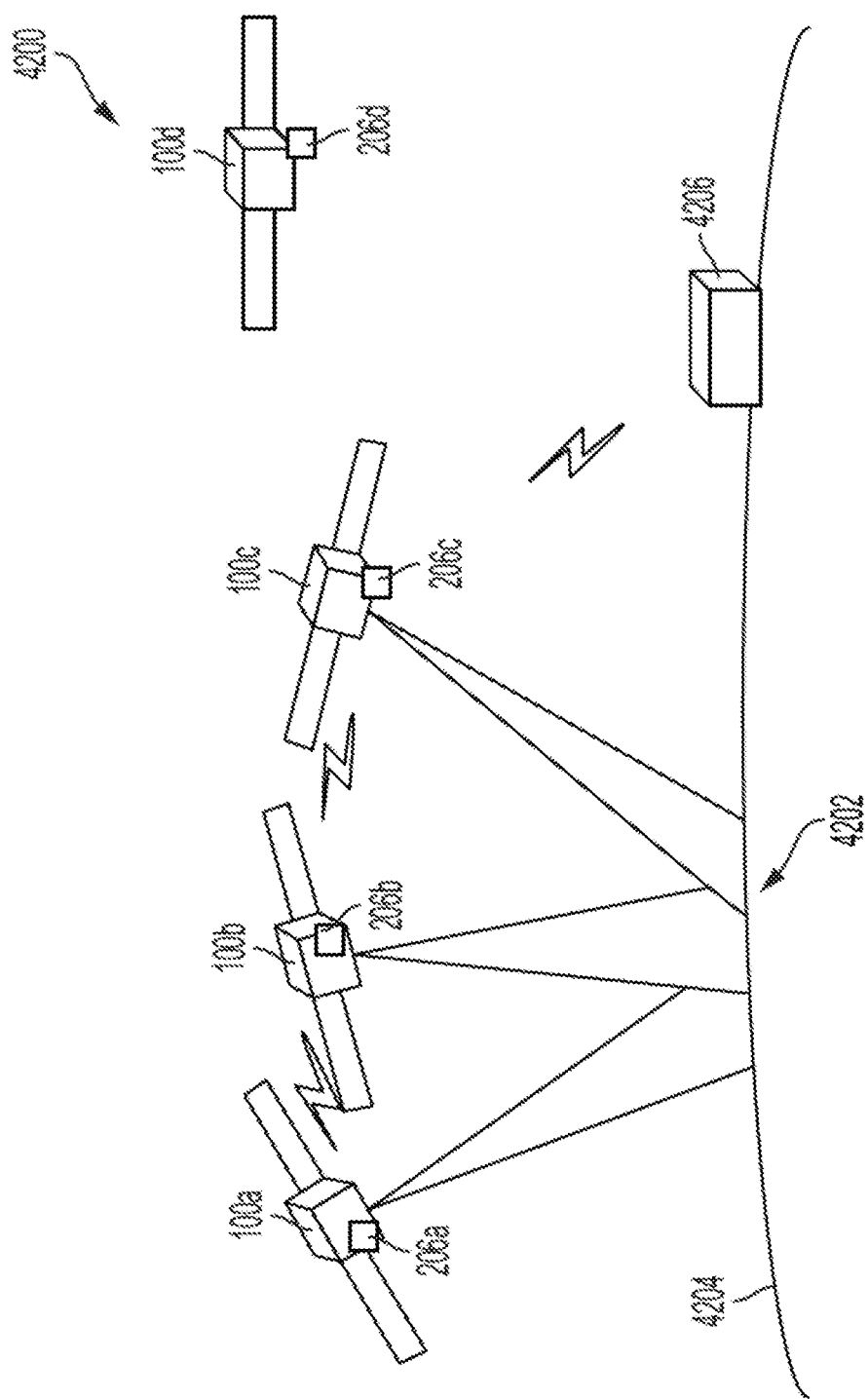
FIG. 42 shows a diagram of an example operating environment in which communication satellites having the SDR of FIG. 2 operate together and are co-located within a single GEO orbital slot.

In some embodiments, the example GEO communications satellite 100 may operate in coordination with other similar communication satellites 100. FIG. 42 shows a diagram of an example operating environment 4200 in which communication satellites 100 operate together and are co-located within a single GEO orbital slot. In the illustrated example, the communications satellites 100a, 100b, and 100c are providing communication coverage to an area 4202 on the Earth 4204. In addition, the GEO communications satellite 100d is provisioned as a spare. While the illustrated example shows four satellites, it should be appreciated that other operating environments may include fewer or additional satellites. For example, the environment 4200 may include 10 to 40 (for example, around 15) relatively small satellites providing communication coverage to a continuous area or separate areas that are relatively close in proximity compared to a size of Earth's surface area (e.g., covering the main islands of Indonesia). In addition, the operating environment 4200 may include at least two spare satellites 100d.

The communication satellites 100 are provisioned such that satellites 100a, 100b, and 100c are each assigned a coverage area. The spot beam placement, satellite orientation, coverage areas, coverage shapes, bandwidth/channel allocation, frequency use/reuse, coding/encryption protocols, and/or network topology provided by the satellites 100 is configurable via respective SDRs 206. The communication satellites 100 may be provisioned with the communication parameters prior to launch and/or post launch via a ground station 4206. The provisioning of the satellites 100 causes them to operate together to provide continuous, substantially uniform communication coverage to an area on the ground.

In some embodiments, the satellites 100 are configured to communicate with each other. In these embodiments, the satellites 100 each include a wireless transceiver and antenna that is configured to transmit and receive communication parameters and instructions outside of a frequency channel/band used for providing services to the ground units. In some embodiments, the satellites 100 may be configured to communicate over a microwave or optical band in a mesh network. The satellites 100 may also have steerable or directional antennas that are configured to point to an adjacent satellite, thereby creating a mesh network. In other instances, the satellites 100 may have unidirectional antennas due to the close proximity of spacecraft.

Figure 43:
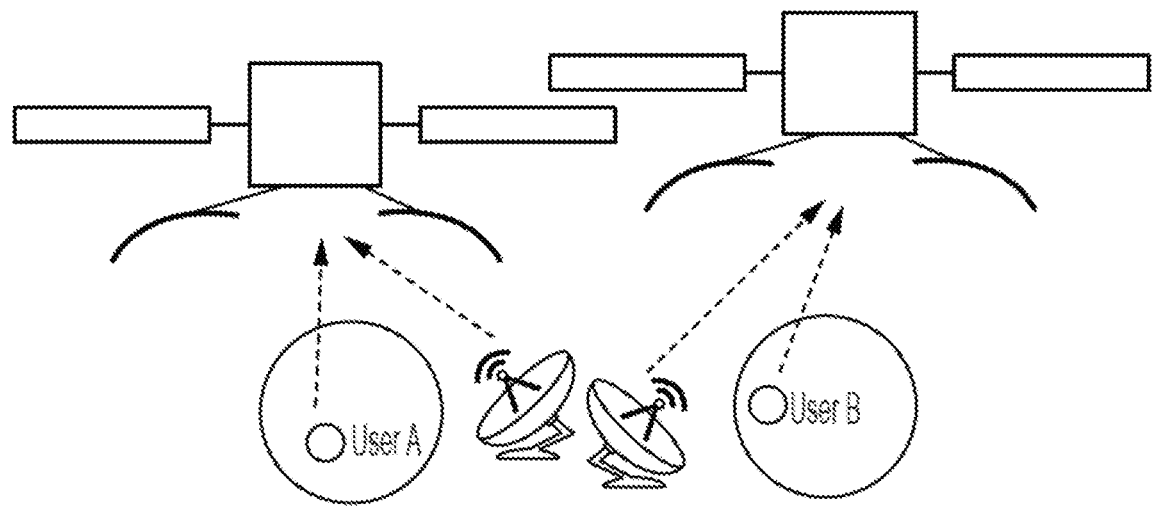
FIGS. 43 and 44 show diagrams related to mesh networking of the example payload communications system of FIG. 4, according to example embodiments of the present disclosure.

In contrast to the embodiment shown in FIG. 42, known commercially produced satellites communicate only with user terminals or gateways on the ground. Generally, the satellites are not configured to communicate with each other. Oftentimes, the satellites are not visible to each other or are too far away to enable effective intersatellite communication. For example, FIG. 43 shows known satellite configurations where data can only pass between two satellites through the ground stations or gateways.

Figure 44:
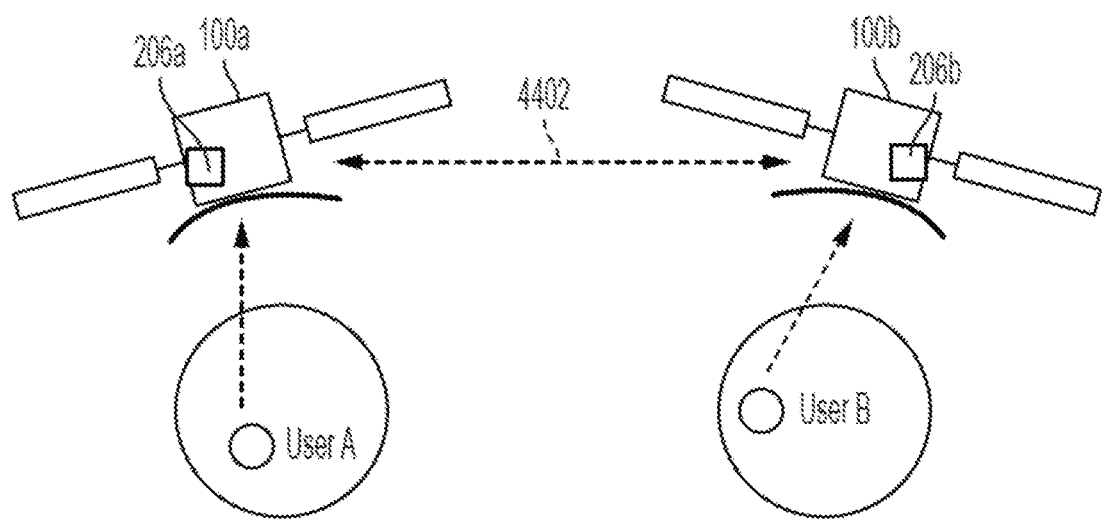

In some instances, the mesh configuration of the satellites 100 shown in FIGS. 42 and 44 may provide gateway sharing or direct user-to-user connections. The mesh network enables more flexible network topologies, spectrum savings, power savings, and lower latency. The mesh configuration provided at least by the satellites 100a and 100b enables direct user-to-user connections, thereby saving transmission time and reducing lag. As discussed above, the SDR 206 is configured to use link-layer or network-layer routing to determine which data packets are to be transmitted on a sub-carrier, or over a particular intersatellite link. In addition, the mesh configuration enables more flexible network topologies, spectrum savings, power savings, etc.

In some examples, the SDRs 206 may be configured to determine when capacity has been reached, or close to being reached. Accordingly, the SDRs 206 may send instructions to one or more adjacent satellites 100 with information indicative of the spot beams in which capacity is limited, causing one or more other satellites (with available capacity) to change at least one of spot beam's shape/location, frequency, bandwidth, etc. to provide additional capacity. This enables additional satellites 100 to overlay more capacity for a certain geographic area on top of existing beams.

In addition to providing coordination for capacity, the satellites may communicate among each other to cover when one satellite is taken offline for software updates/refreshes, taken offline due to low battery power, taken offline to correct an operational issue, or removed from service. The satellites 100 may also communicate among each other to adjust for local weather or other environment issues and/or adjust for changes in population density. As such, the satellites 100 may reconfigure themselves to account for satellites going offline. In the illustrated example, the satellites 100 may be programmed with a complete coverage area in addition to the capabilities of the satellite 100, in addition to a starting provision of services. The satellites 100 may then coordinate in orbit among themselves to best maintain the desired coverage area using the flexibility provided by the SDR 206.

In some instances, the satellites 100 may be in communication with the ground station 4206, which may provide provisioning instructions. The satellites 100 may be in direct communication with a ground station via a directional antenna or communication with the ground station 4206 via communication gateways that are located in coverage areas. In this instance, the satellites transmit their capacity, bandwidth, and other parameters to the ground station 4206. The example ground station 4206 uses one or more optimization algorithms to change the communication parameters to address current conditions. In this example, the ground station 4206 determines how each satellite 100 should be provisioned and transmits one or more messages to the appropriate satellites 100 with the new provisioning information.

In other instances, the satellites 100 and the ground station 4206 are configured to operate together to dynamically change communication coverage. For example, the satellites 100 may communicate among each other to adjust for relatively minor issues (and transmitting this to the ground station 4206) while the ground station 4206 provides commands for relatively larger changes in provisioning/adjusting communication parameters and/or orbits. In some instances where the satellites have limited or no intersatellite communication capability, the ground station 4206 and/or gateways may route provisioning or control instructions between the satellites 100.

In the illustrated example, the satellite 100d is provisioned as a spare. Given the relatively small and inexpensive nature of the satellites, an operator can deploy spares without absorbing a significant cost or needing to seek an immediate return. The spare satellite 100d may be in the same orbital location as the other satellites 100a, 100b, and 100c. Alternatively, the spare satellite 100d may be assigned to a different orbit. The example spare satellite 100d may be quickly brought online in near real-time to provide, for example extra capacity or provide as a backup in the event one of the other satellites goes offline. The space satellite 100d may receive provisioning instructions (and/or orbital realignment instructions) from at least one of a satellite 100 that has been (or will be) taken offline, a satellite 100 operating at close to capacity, one of the satellites 100 provisioned to provide coverage close to an area where the satellite 100d is to operate, and/or the ground station 4206.

The configurability and coordination among the relatively small satellites 100 via the SDR 206 enables coverage areas to be tuned to ground demographics and/or topography. This enables the satellites 100 to be placed strategically. By comparison, relatively large satellites are designed to provide communication coverage to wide areas and are generally static in their deployment for the reasons discussed above. The post-deployment configurability of the satellites 100 permits operators to construct coverage areas that match the ground. For example, coverage areas could be positioned along major transportation lines, population centers, and ground topology. This prevents, for example, bandwidth from being wasted in open water, deserts, or mountainous areas. The coverage areas may take on any shape since multiple satellites 100 may coordinate together, each capable of forming their own beam shapes. Ground patterns may include s-shapes, narrow lines or bands, rings, triangles, rectangles, etc. (with no or reduced coverage in the center), grids, etc.

Specially Provisioned Satellite Embodiments

Figure 45:
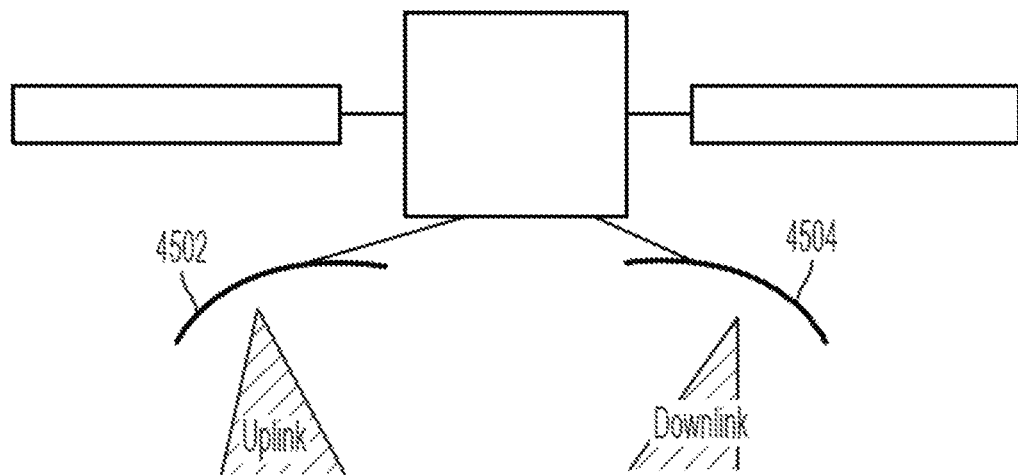
FIGS. 45 to 48 show diagrams related to specially configured satellites, according to example embodiments of the present disclosure.
Figure 46:
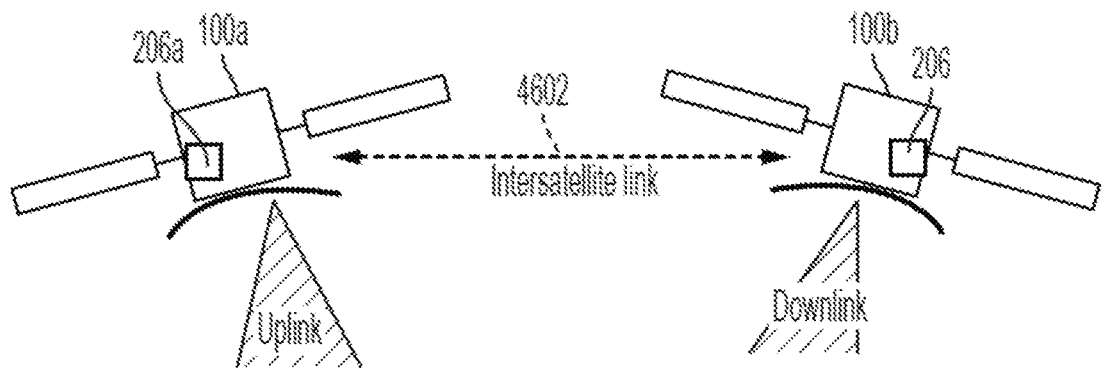

FIGS. 45 and 46 show diagrams related to how the example communications satellites 100 may be specially provisioned for one particular task, according to an example embodiment of the present disclosure. FIG. 45 shows a diagram of a known satellite system in which two parabolic dishes are used, where one dish is used for transmission and another is used for reception. In some instances, the reception dish is made less parabolic to achieve the same directivity as the transmit dish despite the higher frequency of the received signals. Overall, the known system provides a compromise between the reception and transmission side or optimizes for transmission while making reception significantly less efficient or robust.

In contrast, the example communication satellites 100 of FIG. 46 are configured to intersatellite communications, as discussed in connection with FIGS. 42 and 44. In this embodiment, the satellite 100a is optimized for uplinks while the satellite 100b is optimized for downlinks. In other words, the aperture of the satellite 100a is optimized for receiving signals while the aperture of the satellite 100b is optimized or specifically shaped for transmission. For transmission to the ground, the satellite 100a transmits signals to the satellite 100b via an intersatellite link, which then provides for downlink transmission. The SDR 206 in each satellite enables the signals to be routed across channels as part of the transmission path.

Generally, since the satellites 100 are smaller, compared to a single satellite shown in FIG. 45, they may be developed faster with less overall cost. Further, it is easier to add smaller satellites to a launch schedule since a single rocket does not need to be dedicated to launch only these specific satellites. For example, the satellites 100 may find room in a rocket configured to launch many smaller satellites.

Figure 47:
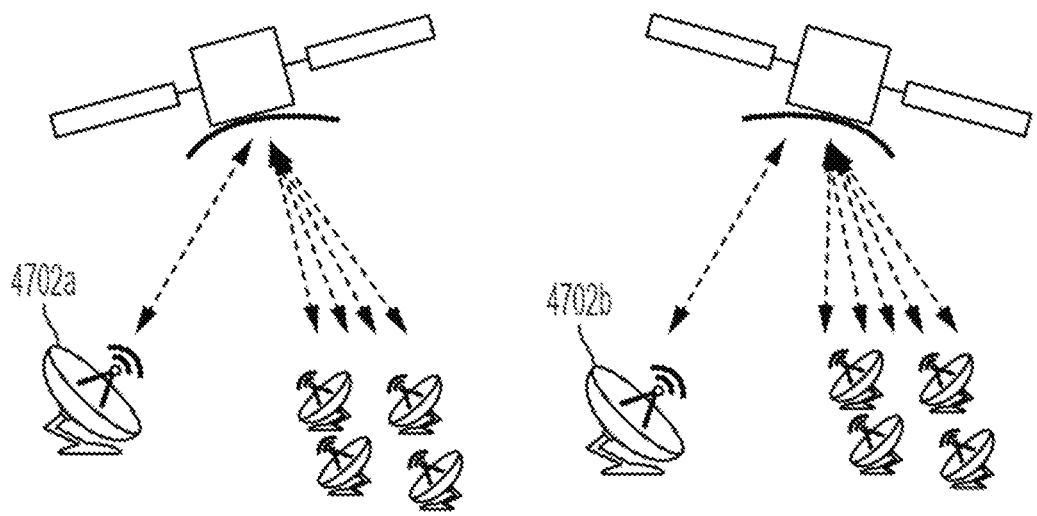
Figure 48:
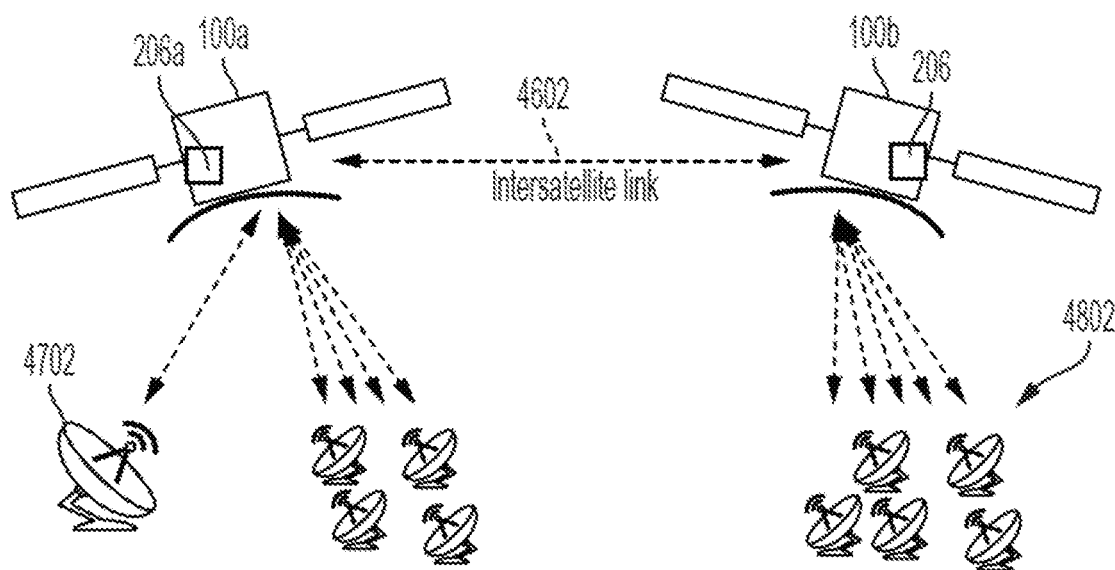

It should be appreciated that the satellites 100 may be specialized in other ways other than transmission and reception. For example, FIGS. 47 and 48 show how the satellites may be configured based on link type. FIG. 47 shows a diagram of a known satellite system in which satellites have gateway transmitters and receivers capable of providing all user links. Accordingly, each satellite has to be in communication with at least one gateway.

In contrast, FIG. 48 shows an embodiment where the satellites 100a and 100b use an intersatellite link, as discussed above in connection with FIGS. 42 and 44 to enable the satellite 100b to be specifically configured for providing only user links. The SDR 206b of the satellite is configured to use physical, network, or link layer routing of gateway traffic to the satellite 100a via the intersatellite link. The SDR 206a of the satellite 100a is configured to add the data from the satellite 100b to the gateway link for transmission to the gateway. As such, both satellites 100a and 100b share the same gateway while enabling the satellite to be specifically configured for providing user links. This configuration alleviates the need for additional gateways, which can save a customer millions of dollars. Further, the satellite 100b may be provisioned to provide service in situations which a gateway is not present.

Frequent Body Repointing Embodiment

Figure 49:
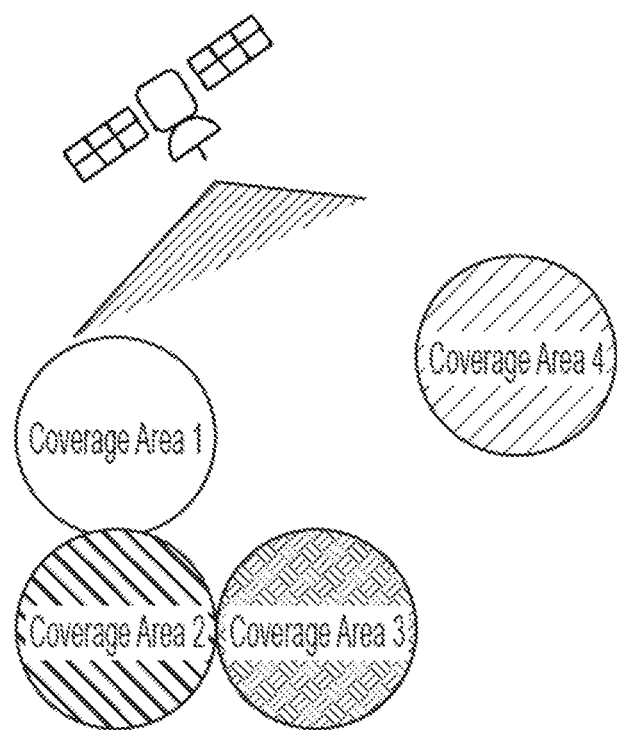
FIGS. 49 and 50 show diagrams related to frequent body repointing features of the communications satellite, according to an example embodiment of the present disclosure.
Figure 50:
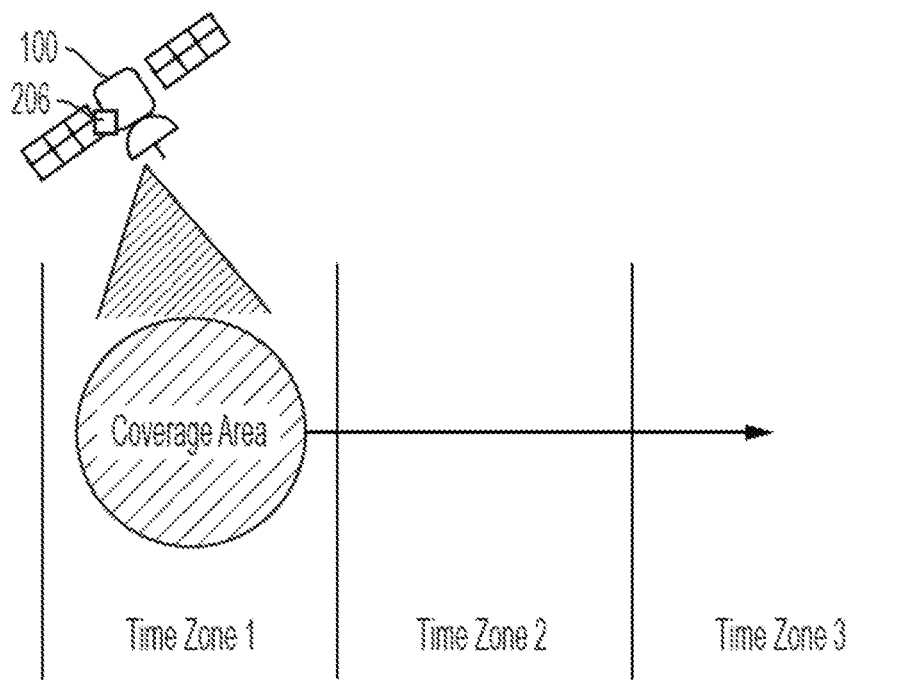

FIGS. 49 and 50 show diagrams related to frequent body repointing features of the GEO communications satellite 100, according to an example embodiment of the present disclosure. FIG. 49 shows a diagram of a known satellite system in which the satellite contains a large number of transponders that serve many markets. Given the spread of the markets, the satellite is required to stay in the orientation, since a small shift could cause a service disruption in one or more areas. Further, many known satellites are not capable of re-pointing since they rely on horizon sensors to maintain a specified orientation.

In contrast, FIG. 50 shows a diagram of the example GEO communications satellite 100, which is configured to repoint. The satellite 100 has a capacity and coverage area that is generally below the capacity demand variation of a given network. As such, the satellite 100 may be configured to re-point towards peak demand on a seasonally, weekly, daily, or hourly basis. For example, the satellite 100 may follow prime time demand across different time zones. The satellite 100 achieves frequent re-pointing via flexible attitude determination, such as star-gazer sensors and/or a sun sensor. This flexibility enables the satellite to point anywhere on the visible earth during its lifetime. In addition, the small size of the satellite 100 enables sufficient power margins to enable frequent re-pointing.

Frequent Orbital Relocation Embodiment

Figure 51:
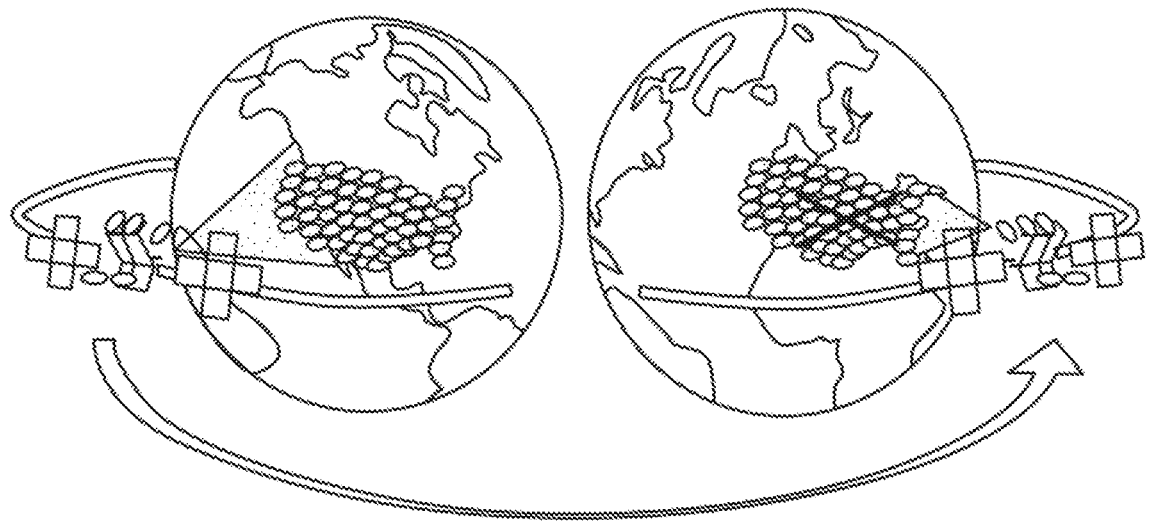
FIGS. 51 and 52 show diagrams related to frequent orbital relocation features of the communications satellite, according to an example embodiment of the present disclosure.
Figure 52:
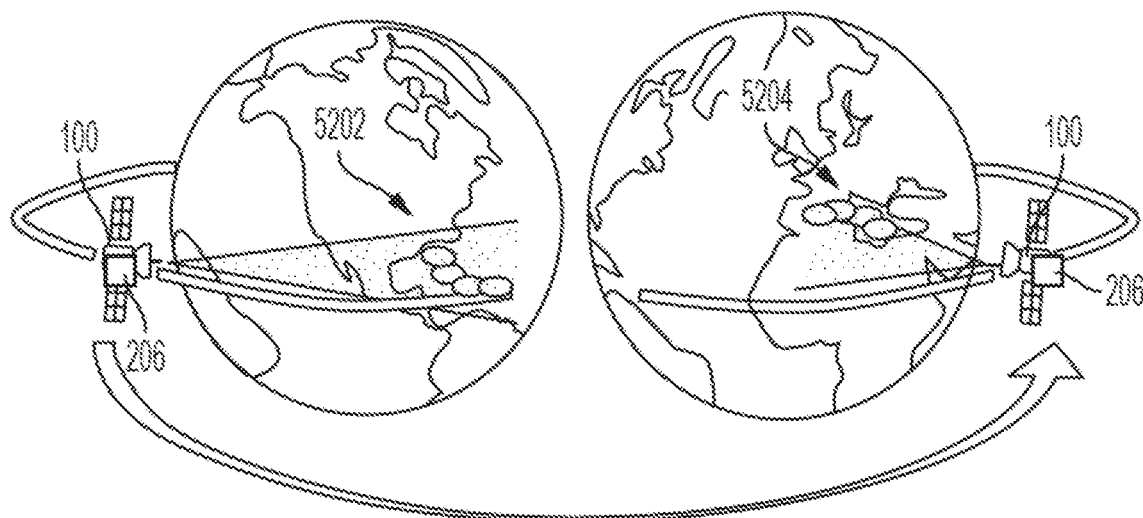

FIGS. 51 and 52 show diagrams related to frequent orbital relocation features of the GEO communications satellite 100, according to an example embodiment of the present disclosure. FIG. 51 shows a known satellite initially covering the continental United States from an orbital slot of 90W.

The satellite is configured on the ground such that the antennas provide beams that coincide with the borders of the U.S. The antennas are fixed in place to provide a fixed beam pattern in addition to a frequency plan. Thus, if the satellite is moved to slot 10E, the beam pattern of the U.S. would provide insufficient coverage of land and water over Europe and North Africa and the Middle East.

In contrast, FIG. 52 shows a diagram in which the example GEO communications satellite 100 is initially providing coverage over cruise lines in the Caribbean from orbital slot 90W. At a later time, the satellite 100 is moved to slot 10E, where beam shapes and coverage areas may be modified to cover cruise lines in the Mediterranean Sea. This configuration enables the satellite 100 to change orbital slots on a frequent basis, such as a seasonal or monthly basis. The flexible frequency, beam shape, and flexible channelization provided by the SDR 206 in addition to hardware enables better re-use over different geographic areas. Further the smaller size of the satellite 100 reduces the amount of fuel needed for relocation to enable many relocations over a lifetime.

Small Capacity and Fast Build Embodiment

Figure 53:
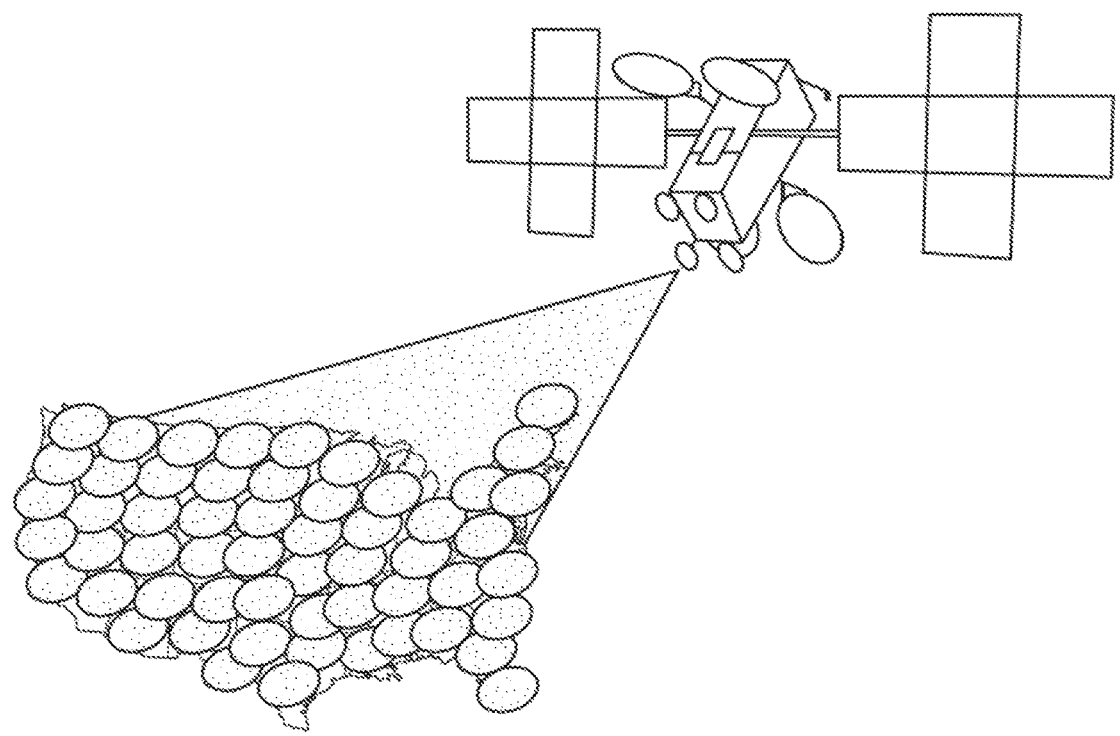
FIGS. 53 and 54 show diagrams related to how a smaller capacity of the example GEO communications satellite of FIG. 1 enables lower cost for the same coverage area on the ground or air, according to an example embodiment of the present disclosure.
Figure 54:
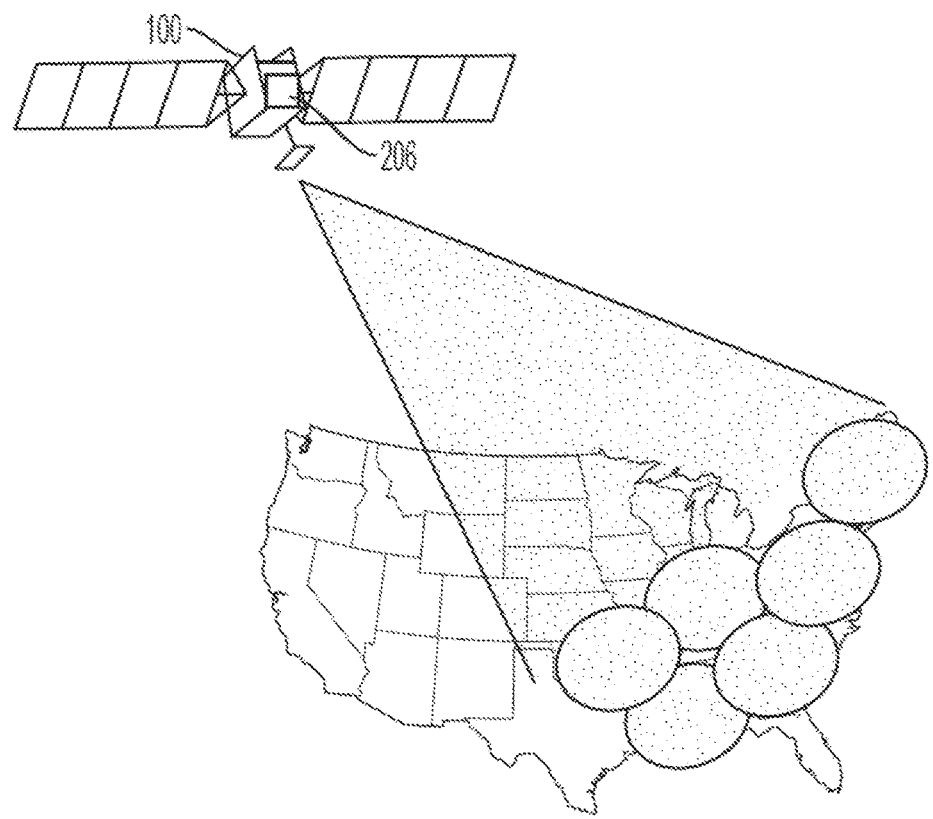

FIGS. 53 and 54 show diagrams related to how a smaller capacity of the example GEO communications satellite 100 enables lower cost for covering the same area on the ground or air, according to an example embodiment of the present disclosure. FIG. 53 shows a known satellite system that typically costs $150 to $400 million to produce and launch. The satellite is configured to cover the entire continental United States with over 50 static beams. As such, the known satellite has a custom payload which is purpose-built for a given service region. This customization requires long development time for design and manufacturing, which can span over three years. Further, since the satellite requires a dedicated launch, launch opportunities are more limited.

In contrast, FIG. 54 shows the example GEO communications satellite 100, which costs a fraction of the larger satellite of FIG. 53. As shown in the illustrated example, the satellite 100 provides fewer beams as a result of its smaller size. However, additional similar satellites 100 may be deployed to cover the entire continental United States, which is still less expensive than the single satellite. Further, as described above, the satellites are flexible and can individually be adjusted after launch based on ground conditions, customer requests, etc. while the known satellite of FIG. 53 is only provisioned for providing coverage for the Eastern continental United States.

The GEO communications satellite 100 may be available off-the-shelf or be developed and built in a shorter time, such as 18 months. The above described flexibility of the satellite 100 means that less customization per customer is needed, thereby reducing development time. Many nearly identical satellites 100 may be built together to dramatically reduce non-recurring engineering effort and provide for a constant supply chain and holding stock. The satellites may be built during the same run on a production line, thereby having a shorter lead time, higher throughput, and lower overall cost. Further, the smaller size of the satellite 100 provides more launch opportunities.

Use Embodiments

The example GEO communications satellite 100 described above may be provisioned for various uses in which conventional, known satellites cannot economically be deployed. The features described above in relation to the SDR 206 and the satellite 100 overall permit the novel uses. For example, the relatively small and inexpensive nature of the example communication satellites 100 disclosed herein enable them to be deployed to test or develop an initial market. The low cost of the satellite reduces the cost risk for the operator, compared to the cost of a larger satellite. The smaller satellite could be deployed to test how much demand there is for satellite service in a certain area or provide coverage as part of an incentive to market and develop satellite service in a particular area. As demand increases and the market is established, the satellite 100 could be replaced by a larger satellite, or additional satellites 100. The additional satellites may also enable the coverage area to be expanded to larger geographic areas, thereby scaling communication coverage in proportion to demand.

FIGS. 55 to 65 below describe at least some of the unique uses of the example satellite 100. It should be appreciated that any individual satellite may be provisioned to perform all the described uses or only a subset of the uses. Further, while the features shown in chart 800 enable the uses, it should be appreciated that not every feature is required for the use to be implemented. For example, for testing a new market, any of the flexible carrier frequency, flexible bandwidth, flexible channelization and routing, flexible beam shape, and flexible network topology may be enabled on the satellite 100 and implemented in the SDR 206.

A. Testing a New Market

FIG. 55 shows a diagram related to a use of the GEO communications satellite 100 for testing a new market. New geographic and vertical markets may require connectivity that is best served by satellites. However, as new markets, the economic hypothesis needed to be tested without dedicating a significant investment. Known satellites are too expensive and inflexible to be deployed in a new market. Instead, the example satellite 100 provides the low-cost and flexibility required to test new coverage areas. As shown in FIG. 55, the new markets may include vehicles (e.g., ships, buses, cars, etc.) with satellite connectivity and geographic areas not currently served by satellites. Flexible carrier frequency, flexible bandwidth, flexible beam shapes, flexible network topology, frequent orbital relocation, fast build and delivery to orbit, and small capacity for low cost individually or in any combination enable the satellite 100 to test for new markets.

B. Filling in Coverage Gaps

Figure 56:
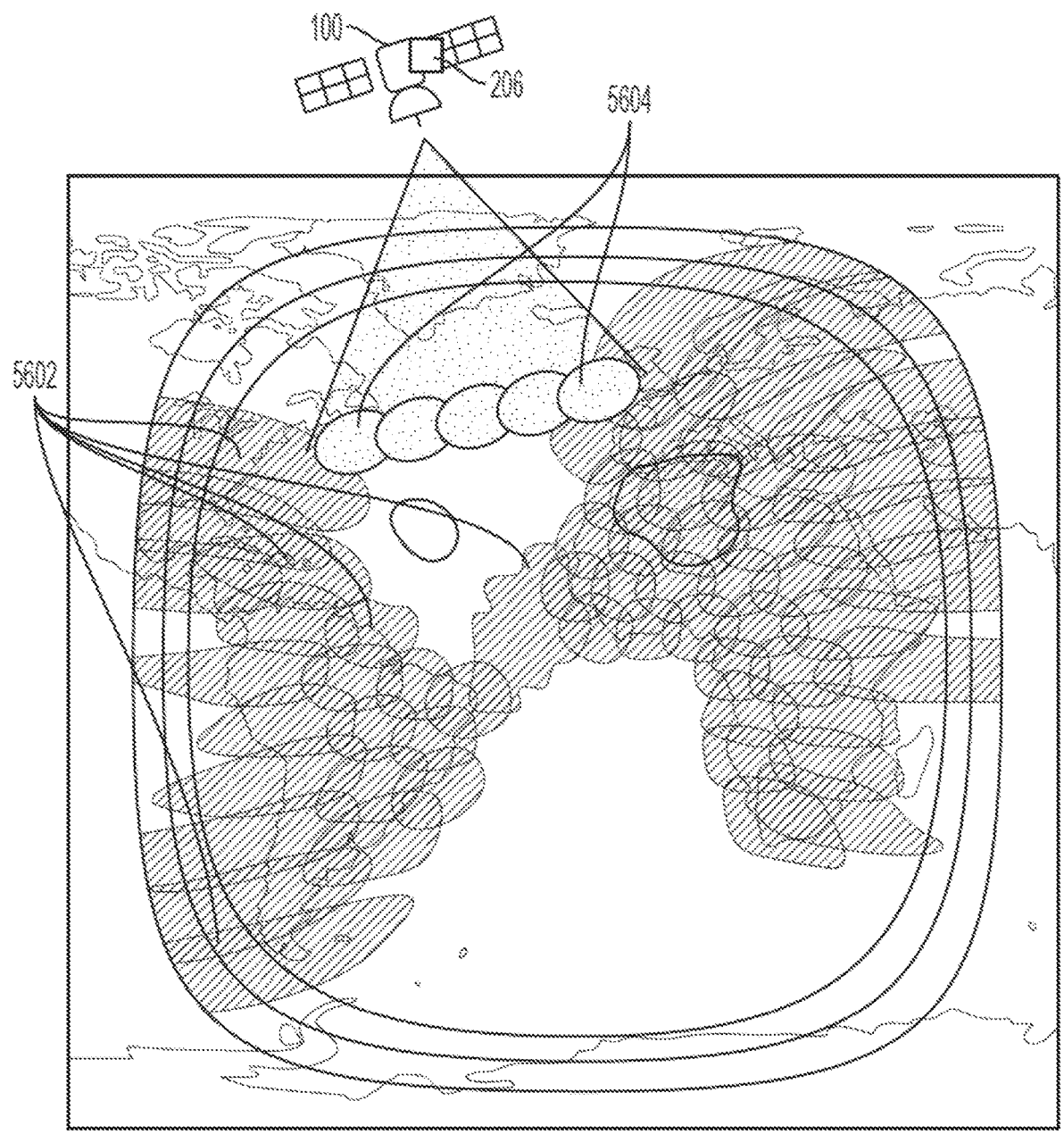

FIG. 56 shows a diagram related to a use of the GEO communications satellite 100 for filling in gaps in existing coverage. Locations 5602 represent coverage areas provided by traditional, known satellites. As an example, there is a gap in coverage along the North Atlantic route. This gap is not covered commercially given the relatively high cost of deploying an additional conventional satellite. In other instances, conventional satellites trade off coverage for performance and cost, thereby creating gaps in areas.

In the illustrated embodiment, the satellite 100 is deployed for filling in the North Atlantic route, as shown by highlighted locations 5604. The fast build and delivery to orbit in addition to the low cost enables the satellite 100 to be deployed to provide economical coverage in a known gap. In addition, the SDR 206 may provide flexible beam shapes to cover uniquely shaped gaps.

C. Rapid Response to New and Changing Markets

Figure 57:
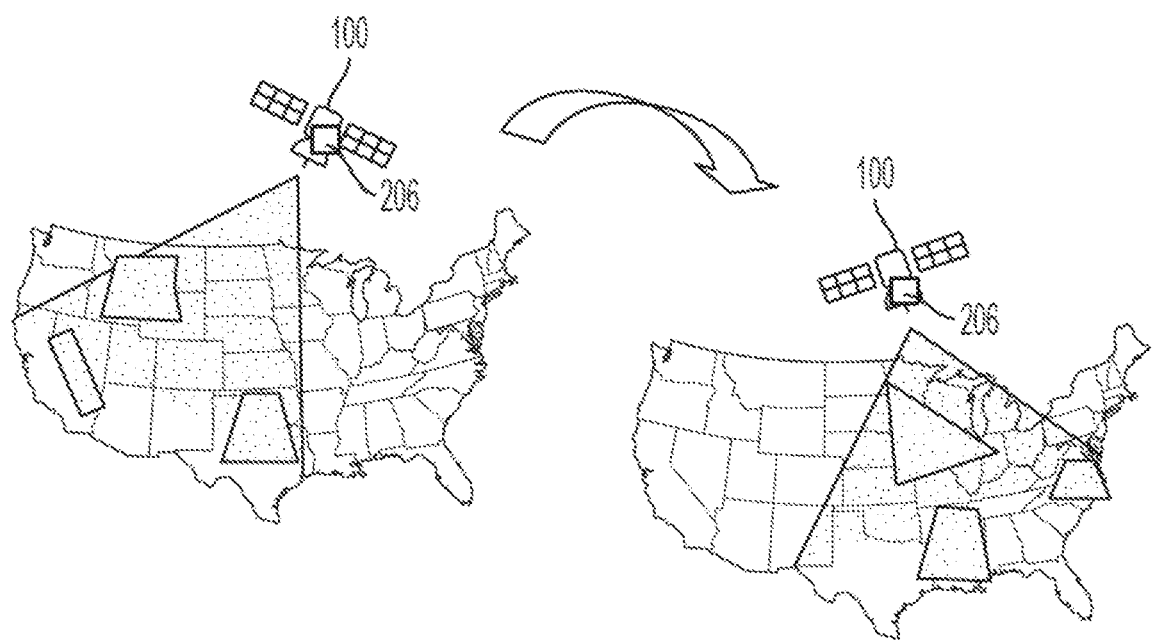

FIG. 57 shows a diagram related to using the GEO communications satellite 100 for providing rapid response to new and changing markets. It should be appreciated that conditions on the ground are constantly changing. For example, urbanization, commercialization, immigration, new technologies, and other socioeconomic factors change market needs and can accordingly shift coverage needs to new or different geographic areas. Traditional known satellites cover large areas ranging from tens to thousands of customers. The dynamics of these large areas can change over time, thereby rendering satellite coverage unnecessary in some covered areas. While this occurs, the satellite misses out on opportunities for coverage elsewhere and is inflexible to adapt to new markets. In addition, larger satellites are more difficult to steer or relocate, making any coverage changes extremely difficult.

In contrast to known satellites, the example GEO communications satellite 100 can be quickly deployed based on demand. For example, FIG. 57 shows the GEO communications satellite 100 providing coverage for the Western United States and Texas in 2018. However, based on changes, in 2020 the GEO communications satellite 100 is deployed to eastern parts of the United States. Flexible carrier frequency, flexible bandwidth, flexible beam shapes, beam hopping, flexible network topology frequent body repointing, frequent orbital relocation, and fast build and delivery to orbit individually or in any combination enable the satellite 100 to provide a rapid response to new and changing markets.

D. Bridging Traditional GEO Capacity

Figure 58:
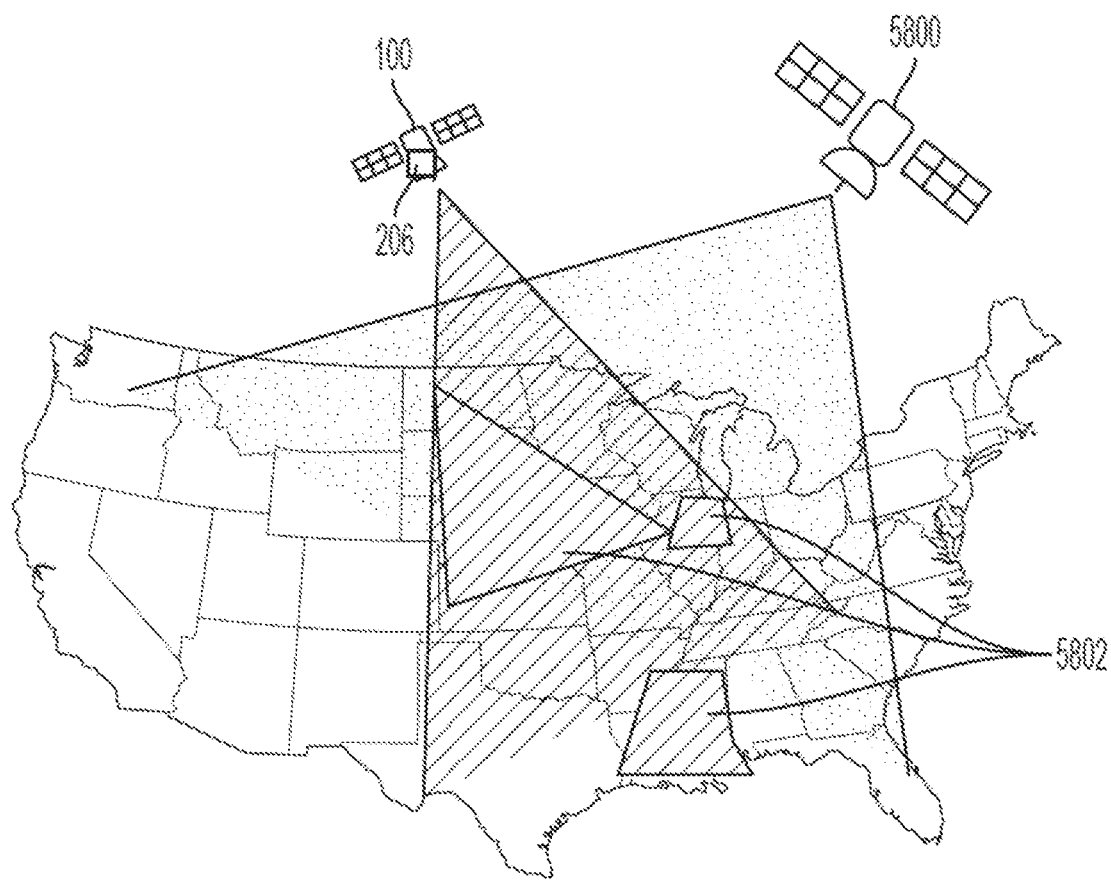

FIG. 58 shows a diagram related to using the GEO communications satellite 100 for bridging traditional GEO capacity. In some instances, a plan may be in place to provide satellite coverage to a large geographic area, as shown by the coverage area planned for satellite 5800. However, as described above, traditional satellites usually require at least three years of lead time. In the meantime, a subset of higher-priority customers with the geographic area may require coverage sooner. Rather than go without coverage, the example satellite 100 may be quickly deployed to provide coverage for critical areas 5802. After the satellite 5800 comes online a few years later, the satellite 100 may be redeployed for another use. Flexible carrier frequency, flexible bandwidth, flexible beam shapes, beam hopping, flexible network topology, frequent body repointing, frequent orbital relocation, fast build and delivery to orbit, and small capacity for low cost individually or in any combination enable the satellite 100 to bridge traditional GEO capacity.

E. On-Orbit Redundancy and Response to Failures

Figure 59:
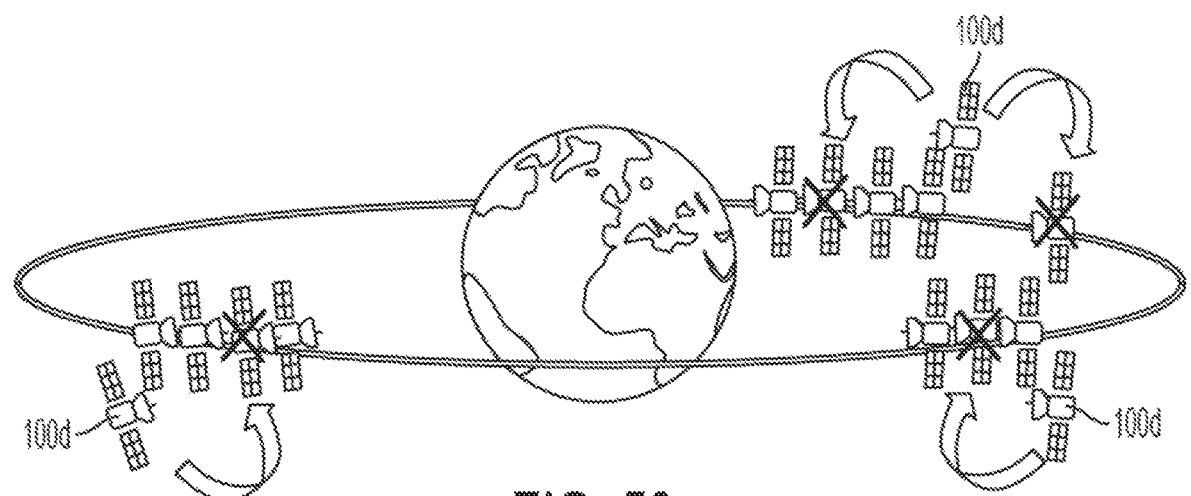

FIG. 59 shows a diagram related to using the GEO communications satellite 100 for providing on-orbit redundancy and rapid response to failures. In the illustrated example, satellites 100 are provisioned initially as spare or redundant satellites. If a satellite experiences a failure, the redundant satellite can quickly come online and take the place of the failed satellite. The lower cost of the satellites means less capital is expended to provide satellites with redundancy or backup. Flexible carrier frequency, flexible bandwidth, flexible beam shapes, beam hopping, flexible network topology, frequent body repointing, frequent orbital relocation, fast build and delivery to orbit, and small capacity for low cost individually or in any combination enable the satellite 100 to provide on-orbit redundancy and response.

In contrast, known commercial satellites are not deployed solely for redundancy based on their cost. Some known satellites may have redundant transponders for backup. However, this is not sufficient backup for system-level failures or in the event the satellite goes completely offline.

F. Bring-Into-Use ("BIU")

Figure 60:
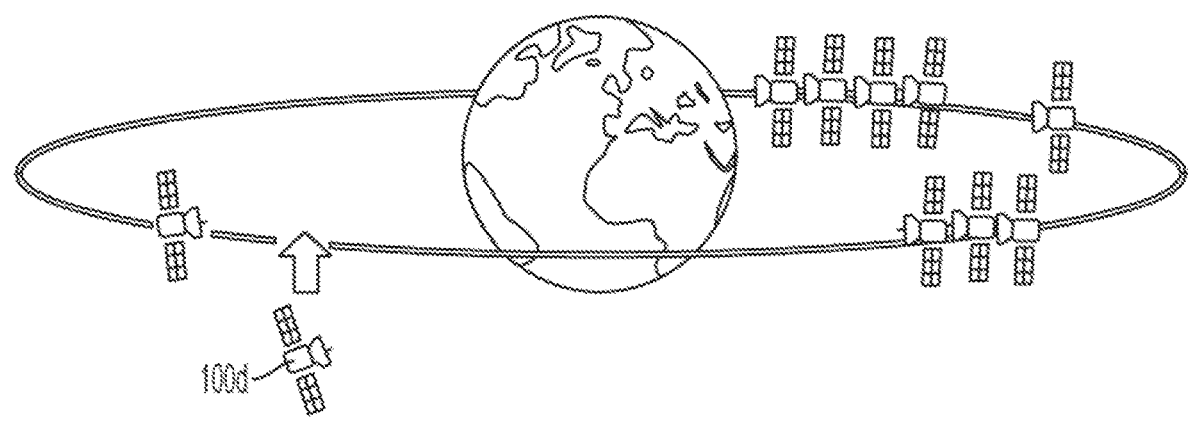

FIG. 60 shows a diagram related to using the GEO communications satellite 100 for providing BIU services. On occasion, the FCC or other government bodies make spectrum (e.g., a specific set of frequencies) available to the public or for specified commercial purposes. Generally, satellite operators are given priority access if they can deploy a satellite for the newly available slot within three years. As discussed above, traditional satellite programs can require at least 3 to 4 years to place a new satellite into orbit, which makes meeting a BIU deadline difficult. Further, customer requirements cannot be easily repurposed for a BIU application, especially if the customer requirements are not yet known or developed.

In contrast, the example satellite 100 may quickly be brought into use. For example, a satellite may be developed and launched in as soon as 18 months, meeting the BIU launch requirements. In other instances, a customer may request access to a redundant or spare satellite 100 already in orbit to provide almost instantaneous BIU. In yet other instances, the satellite may use beam hopping to test a new BIU spectrum/location before a license expires to determine if renewal is justified. In addition, flexible carrier frequency, frequent body repointing, frequent orbital relocation, fast build and delivery to orbit, and small capacity for low cost individually or in any combination enable the satellite 100 to provide relatively fast BIU services.

G. Lower Cost Per Mb/s Coverage

FIG. 61 shows a size comparison between a conventional satellite and the example GEO communications satellite 100 disclosed herein. The conventional satellite costs between 300 to 500 million to develop and launch based on lead time. For example, a satellite that requires a lead time of over five years can cost over $300 million to develop in addition to $100+ million to launch, while a satellite that requires between three to five years of lead time can cost between $150 to $400 million to develop and launch. By comparison, the example GEO communications satellite 100 costs $10 to $20 million, approximately, and can be developed in as short as 18 months. The example GEO communications satellite 100 has lower power consumption from use of fewer antennas, less system hardware, smaller system busses, and smaller overall platform. The lower power consumption enables the example GEO communications satellite 100 to have smaller solar arrays. Further, the smaller size makes it much easier to repoint and reposition the example GEO communications satellite 100.

The example SDR 206 provides flexibility, as described above, which when combined with the small size and unique large antenna enables a high throughput, which lowers the cost per MB/s. The lower cost makes it more attractive to deploy the example GEO communications satellite 100 for most cost-sensitive markets. All of the features described above individually or in any combination enable the satellite 100 to provide lower cost per MB/s coverage, and in particular, the features of flexible carrier frequency, beam hopping, large flexible aperture antenna, noise removal, compressed gateway spectrum, equalization, flexible network topology, frequent body repointing, frequent orbital relocation, fast build and delivery to orbit, and small capacity for low cost enable the satellite 100 to provide this use.

H. Phased-In Capacity

FIG. 62 shows a diagram related to using the GEO communications satellite 100 for phasing-in capacity. Graph 6202 shows how much bandwidth is wasted when a traditional satellite is initially deployed. As described above, traditional satellites have significant amount of capacity. However, it may take up to a decade for all of the capacity to be leased. The idle capacity over this decade leads to a high cost per unit.

In contrast, graph 6204 shows how the satellites 100 may be incrementally deployed to scale with capacity. This enables a satellite operator to efficiently increase capacity over time to match demand without having excess unused capacity. After ten years in the illustrated example, the five satellites serve the same market at the same time and may be configured to provide interlaced beams. Flexible carrier frequency, flexible bandwidth, flexible beam shapes, beam hopping, interlaced beams, flexible network topology, fast build and delivery to orbit, and small capacity for low cost individually or in any combination accordingly enable the satellites 100 to provide phased-in capacity.

I. Augmenting Existing Capacity

Figure 63:
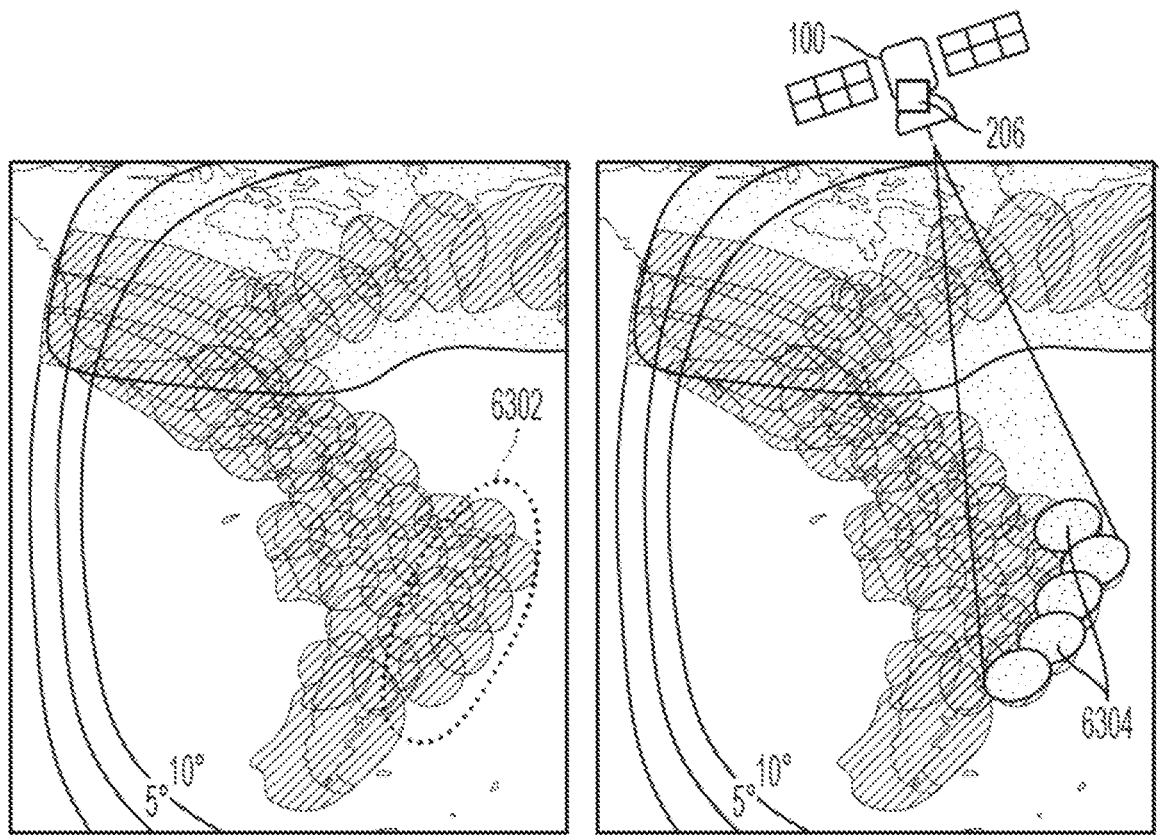

FIG. 63 shows a diagram related to using the GEO communications satellite 100 for augmenting existing capacity. In many cases, a single known, conventional satellite is close but not sufficient to meet the demands of a region. Deploying a second traditional satellite to completely meet the demands may not be cost efficient. Coverage areas in growth zones are especially prone to running out of satellite capacity.

In the illustrated example, the shaded regions show satellite ground coverage. Region 6302 corresponds to a location where existing satellite capacity has been exhausted. It is usually cost prohibitive to deploy a $300 million satellite to accommodate the growth. Instead, the example GEO communications satellite 100 may be configured to provide beams 6304 to address the capacity issue, thereby providing capacity for growth. In this manner, the example GEO communications satellite 100 may augment capacity provided by traditional satellites. Flexible beam shapes, beam hopping, large flexible aperture antenna, noise removal, compressed gateway spectrum, equalization, flexible network topology, fast build and delivery to orbit, and small capacity for low cost individually or in any combination accordingly enable the satellites 100 to provide augmented capacity.

J. Serving Time-Varying Coverage

Figure 64:
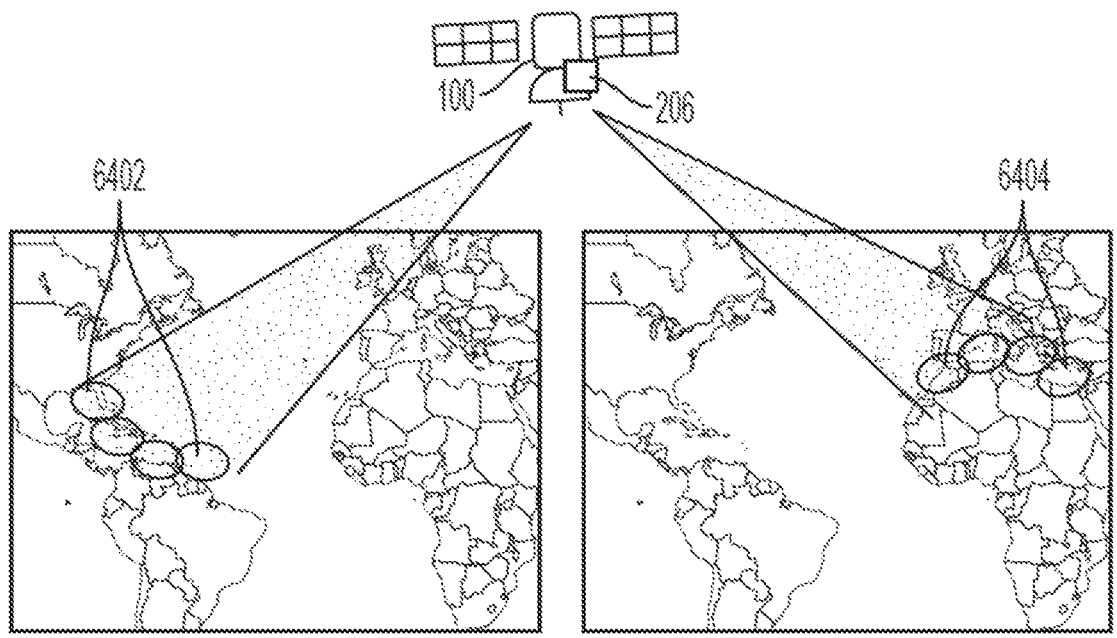

FIG. 64 shows a diagram related to using the GEO communications satellite 100 for serving time-varying coverage. Mobility markets, such as aero and land mobile, as well as traditional markets can have shifting coverage needs that vary over time, such as seasonally, weekly, daily, hourly, etc. Traditional satellites are inflexible and provide service to a mix of mobility and non-mobility-based customers that have different needs. As a result, the satellite is prevented from serving time-varying needs in a cost-effective manner without sacrificing coverage or high capacity utilization for at least some customers. In other words, large satellites typically cannot move one beam without affecting the other 50 to 100 beams.

In contrast the example GEO communications satellite 100 is configured to provide real-time adjustments to coverage for meeting customer demand. In the illustrated example, the satellite 100 initially provides beams 6402 for providing capacity to cruise lines in the Caribbean from October to May. Then, from June to September, the satellite 100 provides beams 6404 for providing capacity to cruise lines in the Mediterranean. The satellite 100 accordingly provides coverage where cruise lines are located during peak seasons. Flexible carrier frequency, flexible bandwidth, flexible beam shapes, beam hopping, flexible network topology, frequent body repointing, frequent orbital relocation, and small capacity for low cost individually or in any combination accordingly enable the satellites 100 to provide time-varying coverage.

K. Dedicated Satellite to an End Customer

Figure 65:
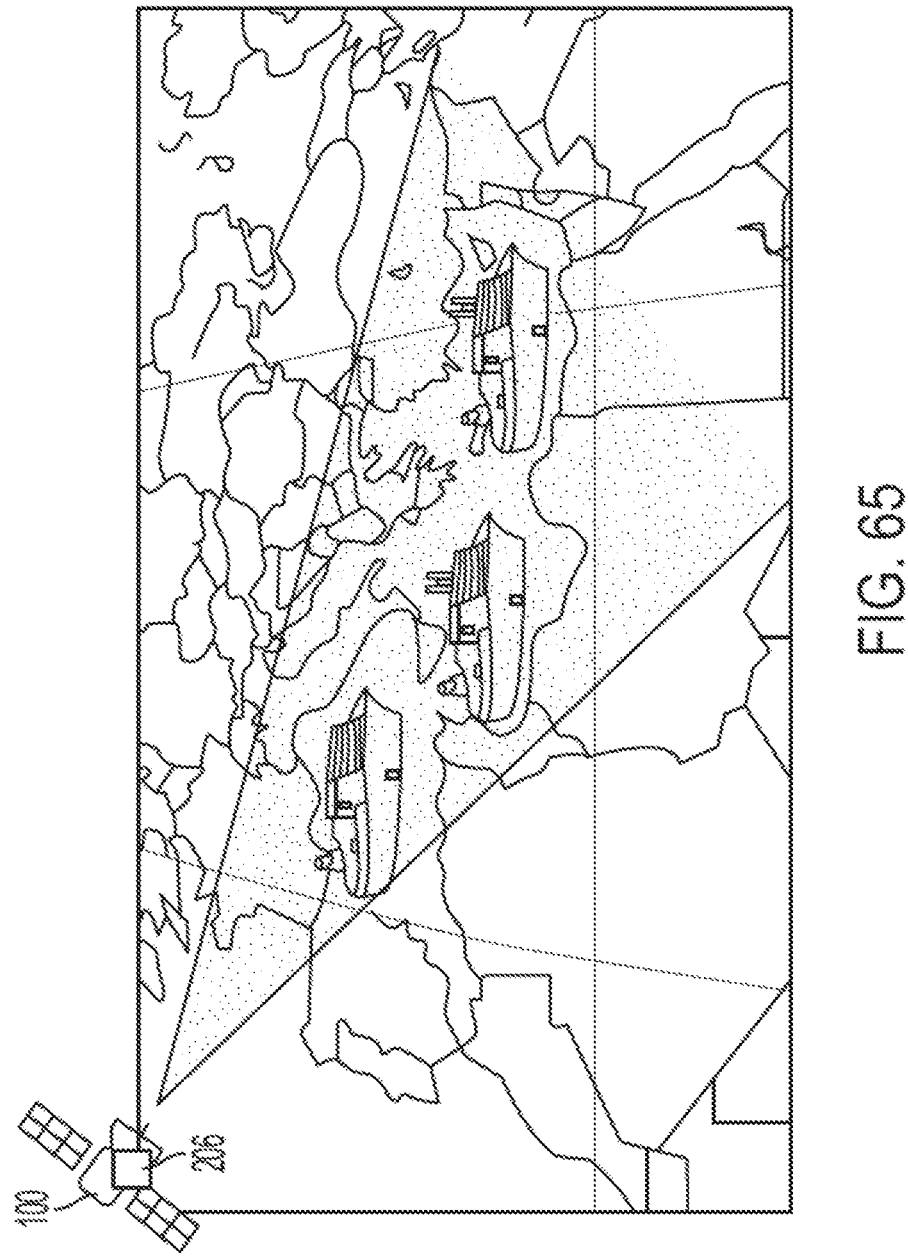

FIG. 65 shows a diagram related to using the GEO communications satellite 100 for providing dedicated services for a customer. With conventional satellites, customers lease a portion of available capacity. Since the satellite has a uniform platform and network topology, customers that lease the same satellite have to share the platform and network among each other, thereby limiting their individual flexibility and leading to burdensome costs. For example, when a customer wishes to change a market they serve, they cannot relocate the satellite because it is shared with other customers. Instead, the customer needs to find a new satellite.

In contrast the example GEO communications satellite 100 of FIG. 65 may be dedicated to a sole customer. In this embodiment, the customer may be a cruise ship operator. The configurability of the satellite 100 in conjunction to the customer being the only user gives the customer a higher degree of freedom, adaptability, and control over coverage. The low cost of the satellite makes it economically viable for a customer to own or lease a complete satellite for themselves. In addition, Flexible carrier frequency, flexible bandwidth, flexible beam shapes, beam hopping, flexible network topology, frequent body repointing, frequent orbital relocation, and small capacity for low cost individually or in any combination accordingly provide unique features that make it attractive to dedicate the satellite 100 completely for an end customer.

Beam Super Surge Embodiments

In some embodiments, the example GEO communications satellite 100 disclosed herein is configured to provide a select number of beams to be activated in a certain area based on throughput and/or usage needs or requirements.

In one example, a geostationary GEO satellite, such as GEO satellite 100 shown in FIG. 1, includes an antenna system including multiple antennas, each configured to provide a spot beam having an adjustable bandwidth for a terrestrial coverage area while the antenna is in an active state and the satellite is in orbit above the Earth. The GEO satellite can include a software defined radio ("SDR") communicatively coupled to the antenna system via a front-end subsystem. The front-end subsystem has an input side including an input filter and an analog-to-digital converter, and an output side including an output filter and a digital-to-analog converter.

The SDR, in response to a surge modification request, modifies a bandwidth of each active antenna by increasing or decreasing a share of a satellite power budget allotted to the antenna by deactivating or activating a previously active or previously inactive antenna, respectively. The surge modification request can include a predetermined routine, instructions received from a ground station, or an indication of a coverage area.

In one example, the SDR implements a super-surge by dynamically increasing forward throughput to a target region requiring higher bandwidth. For example, in some embodiments, the SDR increases power provided to a first antenna illuminating the target region by deactivating a second, previously active antenna immediately adjacent to the first antenna. The first antenna thus becomes a sole recipient of a power amplifier that previously also provided an input to the second antenna.

The ground station, sometimes referred to as an earth station, or earth terminal, is a terrestrial radio station designed for extraplanetary telecommunication with spacecraft. Ground stations may be located either on the surface of the Earth, or in its atmosphere. In some embodiments, the ground station is a teleport that communicates with the satellite according to International Telecommunication Union Radiocommunication Sector (ITU-R) standards. Some teleports are satellite ground stations that connect a satellite with a terrestrial telecommunications network, such as the Internet.

Figure 66A:
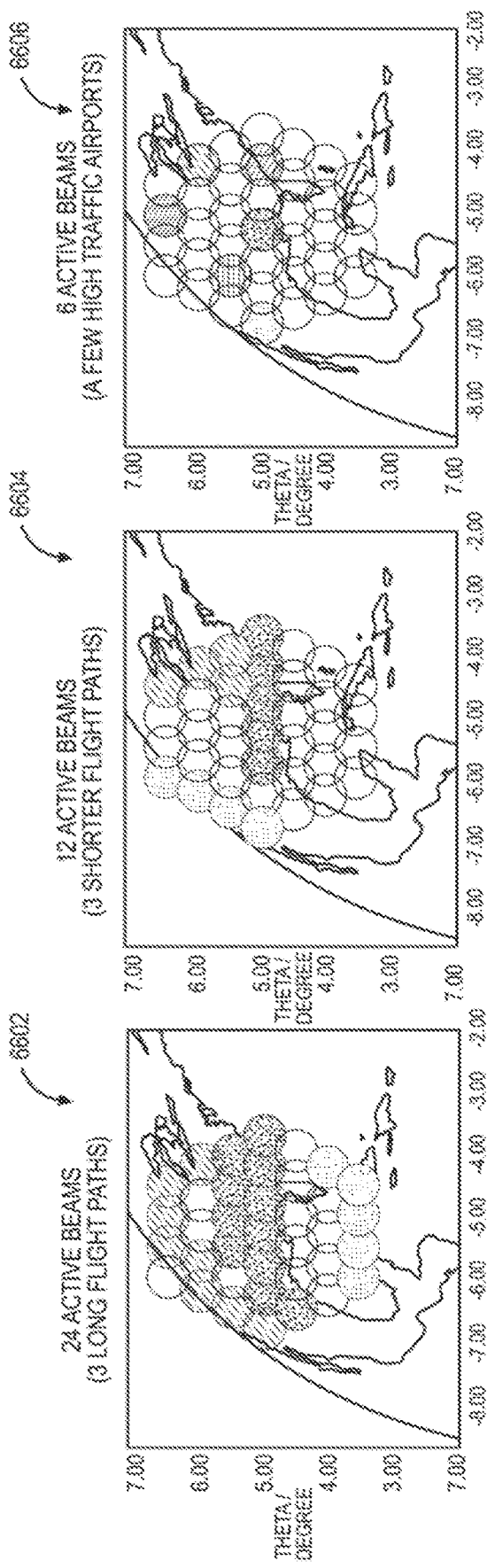

Teleports may provide various broadcasting services among other telecommunications functions, such as uploading computer programs or issuing commands over an uplink to a satellite FIG. 66A shows a diagram of three scenarios 6602, 6604, and 6606 in which certain beams may be activated to provide communication coverage for three different flight paths over the continental United States. Scenario 6602 shows an instance where twenty-four beams are active to provide generally uniform coverage to each cell and the flight paths. The circles without interior shading correspond to beams that are not active. As shown in the chart below, the forward throughput per beam is 520 Mbps. In contrast, scenario 6604 shows an instance where only 12 beams are activated for three different flight paths. In this instance, the forward throughput is doubled to 1040 Mbps per beam. Further, scenario 6606 shows an instance where only 6 beams are activated to provide converge for a few high-traffic airports. Here, the forward throughput is 2080 Mbps. This illustrates a super surge concept where the forward throughput increases as less beams are used.

As illustrated in FIG. 66A, the satellite may provide spot beam coverage where the bandwidth for different terrestrial coverage have different forward throughput or have no throughput for inactivated beams. This allows the satellite to increase or decrease throughput for particular geographic areas. Additionally, the satellite may be configured or instructed to modify the throughput over a path of multiple areas. For example, the satellite may provide a higher throughput from an Eastern to Western direction while tracking a moving ground station. Also, the satellite may be configured to increase throughput for areas terrestrial areas, such as for cities, or other areas where high throughput is needed. The satellite may reduce throughput for other areas, or completely inactivate a beam where terrestrial coverage is not needed.

Figure 66B:
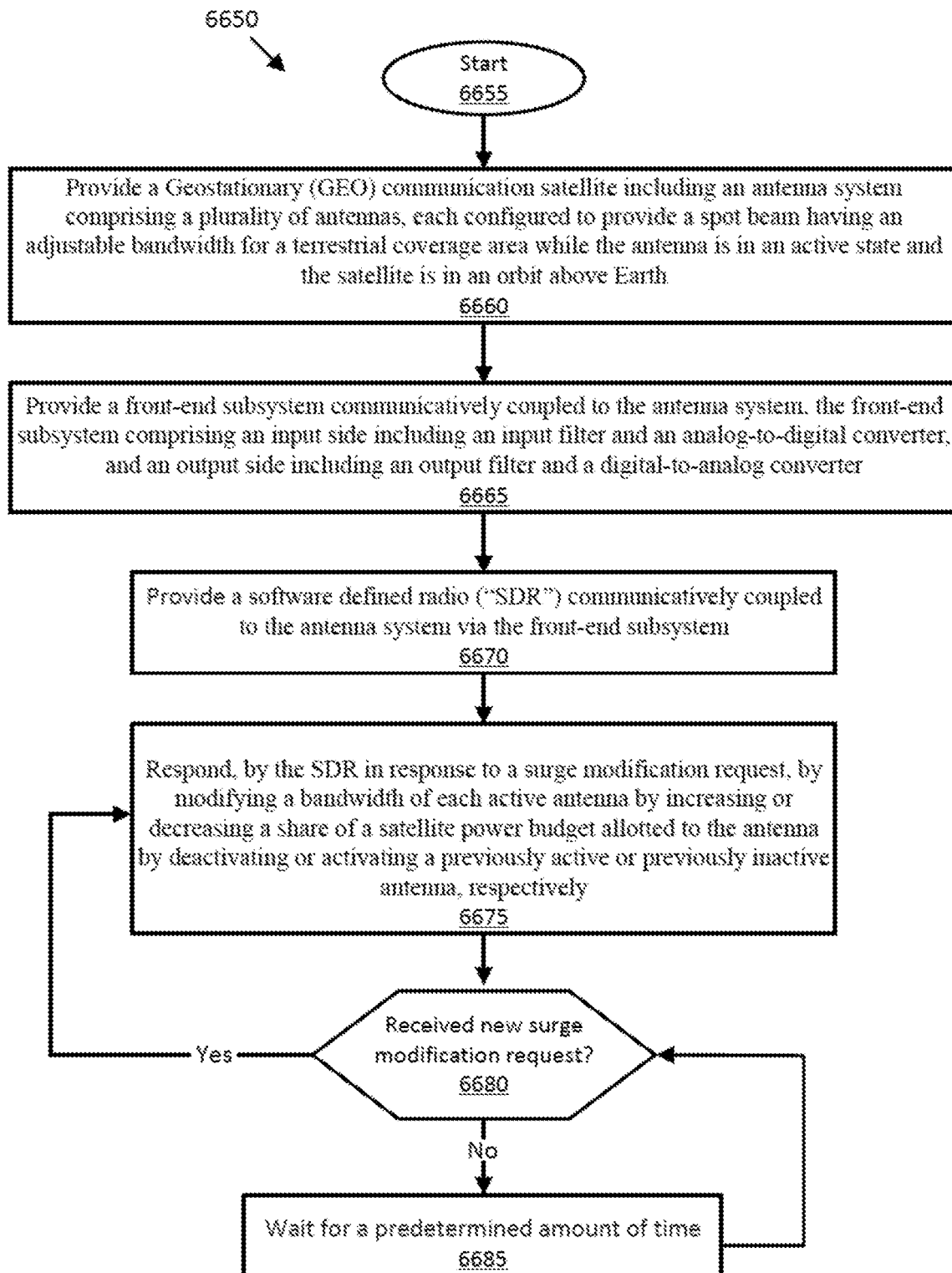

FIG. 66B illustrates a method of provisioning spot beams for a terrestrial coverage area, according to some embodiments. As shown, method 6650 starts at 6655. At 6660, the method calls for providing a GEO communication satellite including an antenna system comprising a plurality of antennas, each configured to provide a spot beam having an adjustable bandwidth for a terrestrial coverage area while the antenna is in an active state and the satellite is in orbit above the Earth. At 6665, the method calls for providing a front-end subsystem communicatively coupled to the antenna system, the front-end subsystem comprising an input side including an input filter and an analog-to-digital converter, and an output side including an output filter and a digital-to-analog converter. At 6670, the method calls for providing a software-defined radio ("SDR") communicatively coupled to the antenna system via the front-end subsystem. At 6675, the SDR is to respond to a surge modification request, by modifying a bandwidth of each active antenna by increasing or decreasing a share of a satellite power budget allotted to the antenna by deactivating or activating a previously active or previously inactive antenna, respectively. At 6680, the SDR is to check whether a new surge modification request has been received. If not, at 6685, the SDR is to wait for a predetermined amount of time before checking again. The predetermined amount of time could be a few seconds, a few minutes, a few hours, a few days, and so on. But, if the SDR determines at 6680 that a new surge modification request was received, the SDR returns to 6675 to respond to the new request.

The satellite power budget can vary according to the size of the GEO communications satellite 100, and will depend on the size and efficiency of the solar panels 110 and 112, as well as the capacity of the on-board battery in the payload communications system 120, which is recharged by the solar panels. To calculate the satellite budget, the power consumed by the major components of the satellite can be estimated and tabulated. Recommendations and method for calculating and optimizing satellite power budgets are promulgated by the International Telecommunication Union Radiocommunication Sector ("ITU-R") and are available as an ITU-R publication at http://www.itu.int/en/ITU-R/Pages/default.aspx.

To cite an example, the tiny, 1,000 cm^3 CubeSat satellite developed in part by the California Polytechnic State University and Stanford University, became a catalyst for NASA's CubeSat program. Typically, the 1U, 2U, and 3U CubeSats' maximum satellite power budgets range from 1 to 2.5 Watts, 2 to 5 Watts, and 7 to 20 Watts, respectively, as published at http://www.ann.ece.ufl.edu/pubs_and_talks/Aero12_arnold_ERB.pdf.

To cite an example of a larger satellite, the Pratham spacecraft, operated by the Indian Institute of Technology Bombay, is a cube having approximately 12-inch sides and weighing around 22 pounds. The Pratham satellite power budget is around 11 Watts. as published at https://www.aero.iitb.ac.in/satelliteWiki/index.php/Main_Page.

Figure 67:
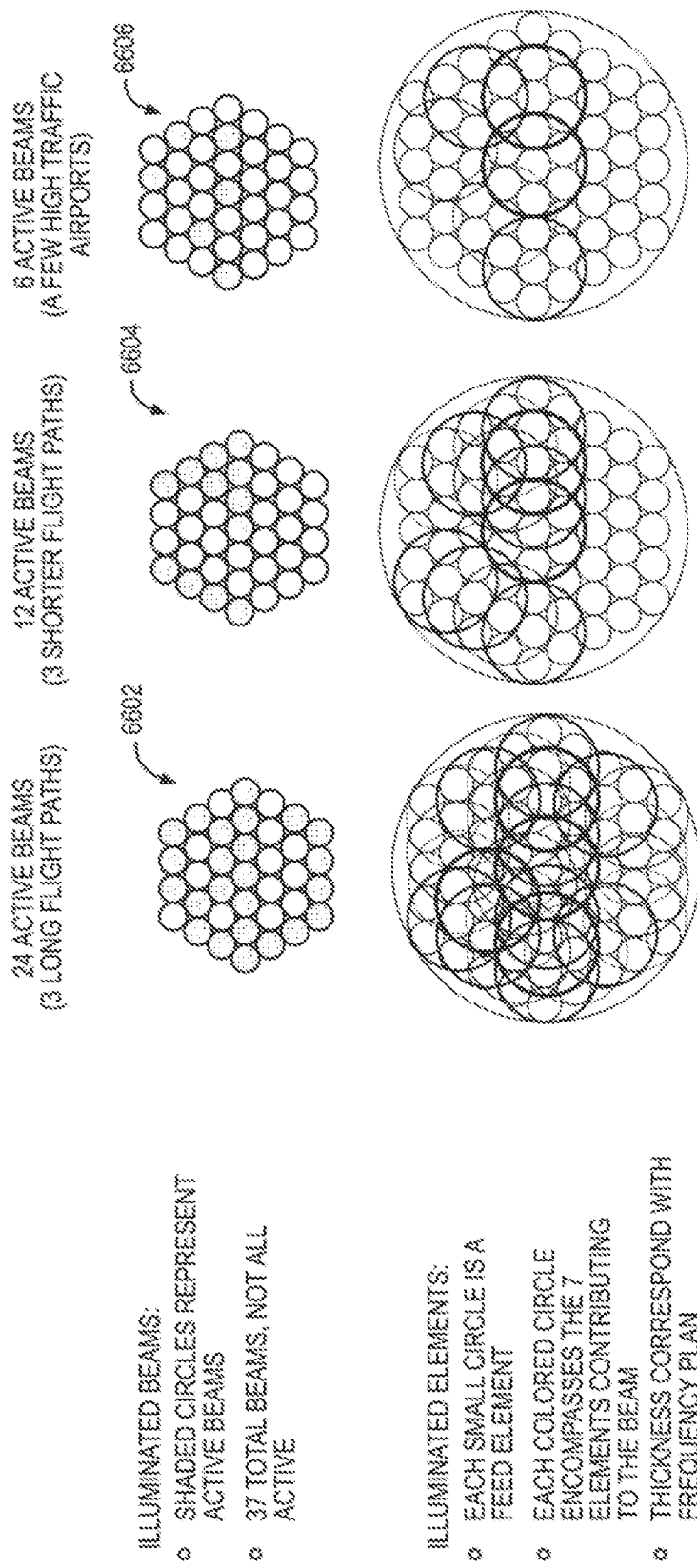
Figure 68A:
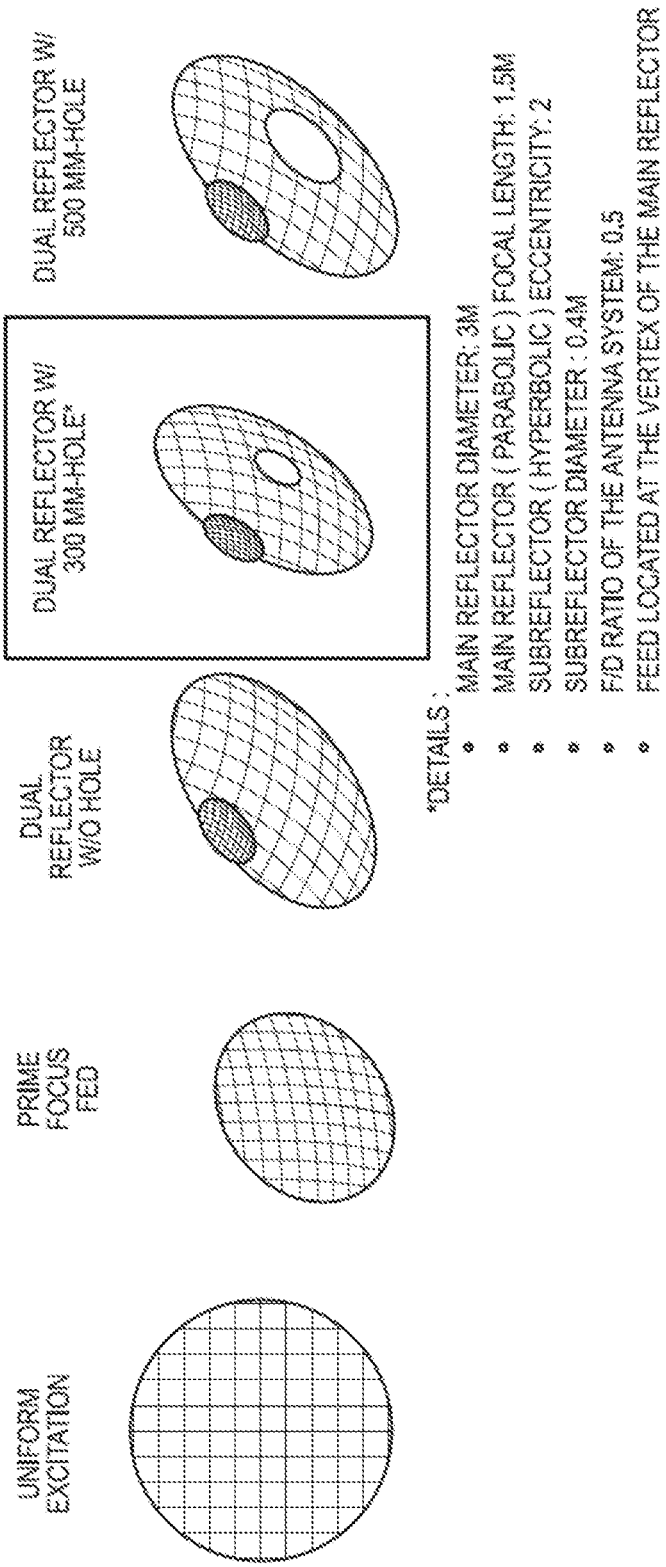
Figure 68C:
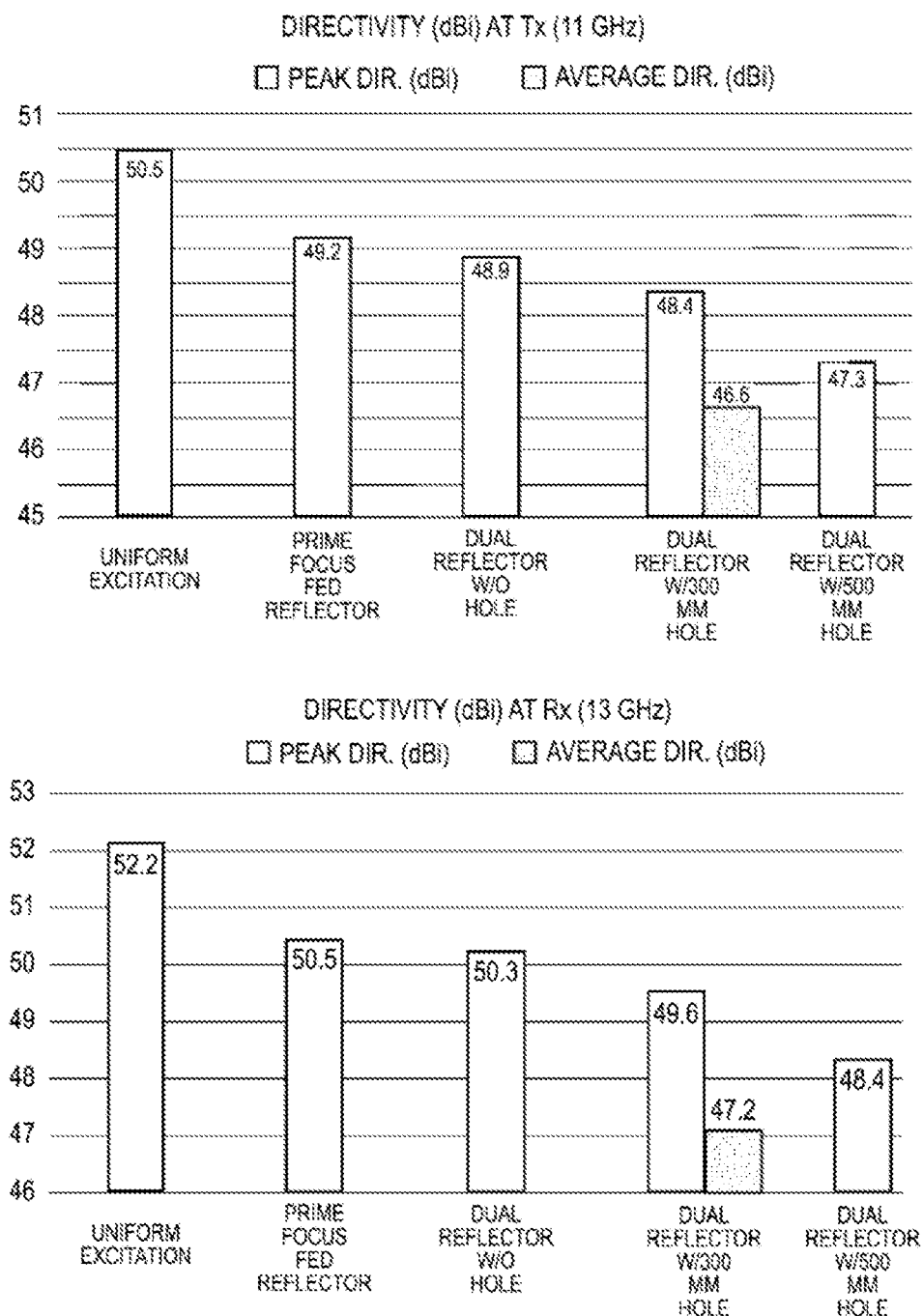

FIG. 67 shows a relationship between the active beams shown in FIG. 66 and which feed elements of an antenna array are activated that contribute to the formation of the beam. In the illustrated example, the GEO communications satellite 100 disclosed herein may be capable of providing 37 different beams, with, for example, as many as 24 beams being active at the same time. It should be appreciated that fewer than 24 beams may be active at the same time and still make use of a significant portion of the satellite's capacity.

In other embodiments, the GEO communications satellite 100 may have power capabilities to activate all 37 beams at the same time.

To provide for the 37 different beams, 61 different feed elements are used. As shown seven feed elements (sometimes referred to herein as "feed horns") are provided to contribute to the formation of each beam. Overlap between circles indicates that the same feed element included in both circles contributes to the formation of both beams.

FIGS. 68 to 71 show diagrams illustrative of a reflector and feed elements of the example GEO communications satellite 100 disclosed herein. FIG. 68A shows different reflector designs, including a uniform design, a prime focus feed, a dual reflector without a hole, a dual reflector with a 300 mm hole, and a duel reflector with a 500 mm hole. The graphs in FIG. 68B show average and peak directivity in dB for each of the different designs. The graphs also show sidelobe level ("SLL") in dB for Ku-band transmission at 11 GHz and reception at 13 GHz. On these graphs, side lobe level is defined as a side lobe level below a main beam, and thus a higher number means a lower sidelobe (e.g., dB down from a peak value). As shown, the uniform design has the best directivity and expected peak sidelobes 17 dB below peak directivity. In comparison, the prime focus feed and dual reflector without a hole have relatively lower directivity but lower sidelobe levels. The dual reflector with the 500 mm hole has higher sidelobe levels and lower directivity. The dual reflector with a 300 mm hole provides potentially adequate sidelobe levels while also providing relatively robust directivity compared to the prime focus feed and has the advantage of reduced overall size due to the folded or compressed optics of the dual reflector system. As such, the example GEO communications satellite 100 disclosed herein may include a dual reflector with a 300 mm hole to provide for the beams shown on FIGS. 66 and 67.

Figure 69B:
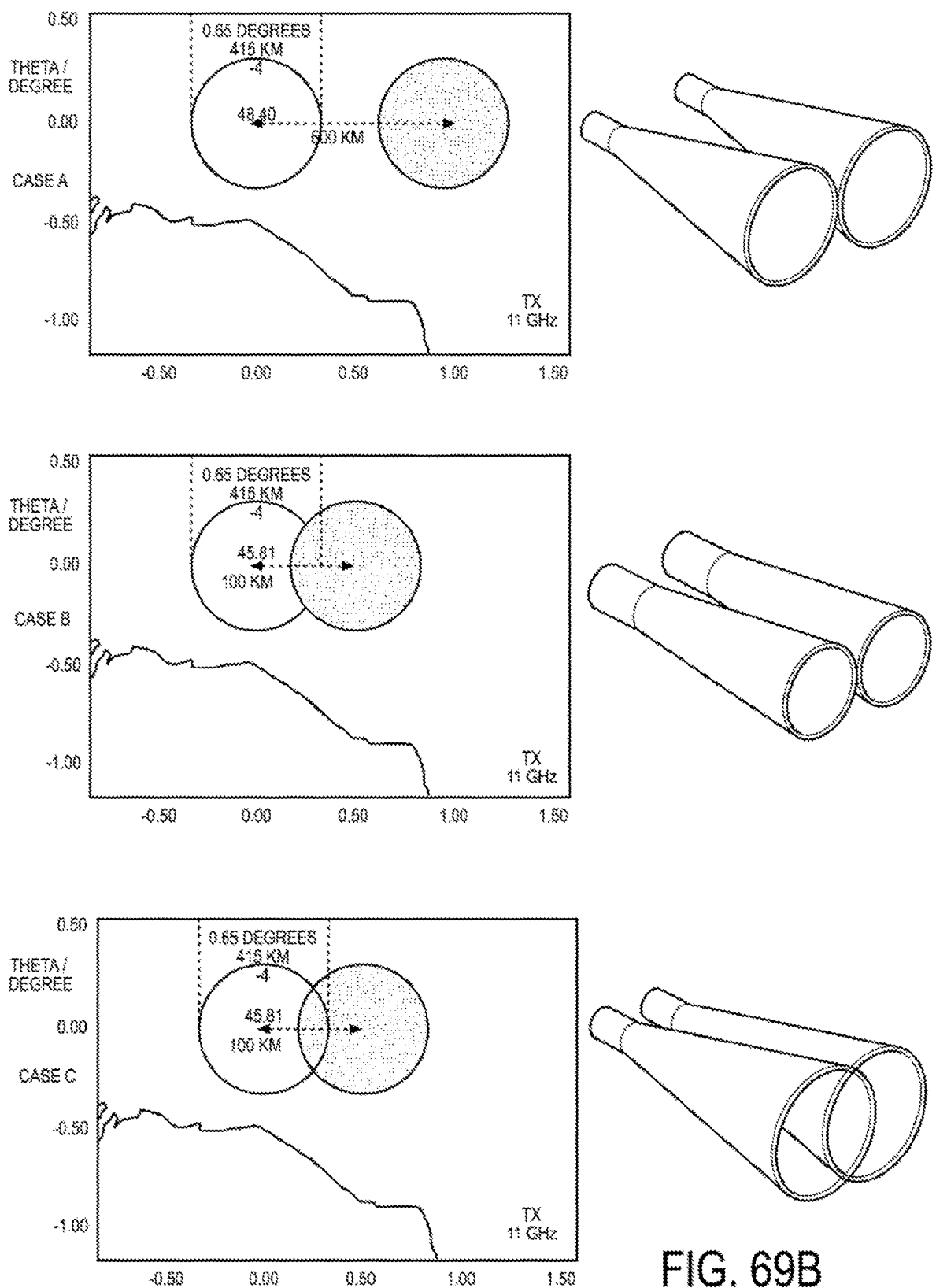

FIGS. 69A to 71B show how a reflector feed size was selected for the dual reflector with the 300 mm hole. FIG. 69A shows a graph 6900 that relates peak directivity to feed horn diameter, where optimal directivity for the Ku-band case studied is around 80 mm for the conical horn case studied at Ku band. It should be noted that the optimal feed aperture size may differ based on the main reflector diameter and the satellite communication band being used, be it any of L, S, C, X, Ku, K, or Ka bands. For example, the optimal feed aperture size may be larger for C-band communication and may be smaller for Ka-band communication. FIG. 69B illustrates pictorially the three cases described at the bottom of FIG. 69A. As shown in Case A, feed horns with 80 mm diameters provide beams with 415 km diameters, defined as half-power beam width ("HPBW"). However, the centers of the beams are separated by 600 km, which leaves about 185 km of space between the beams where insufficient coverage is provided. In Case B, the diameters of the horn antennas are decreased to 40 mm, which causes the beams to overlap. However, the use of the smaller diameter feed horn results in a 2 dB loss in directivity. In ideal Case C, 80 mm diameter feed horns are used where they physically intersect to produce overlapping beams. However, this configuration is not physically possible.

Figure 70A:
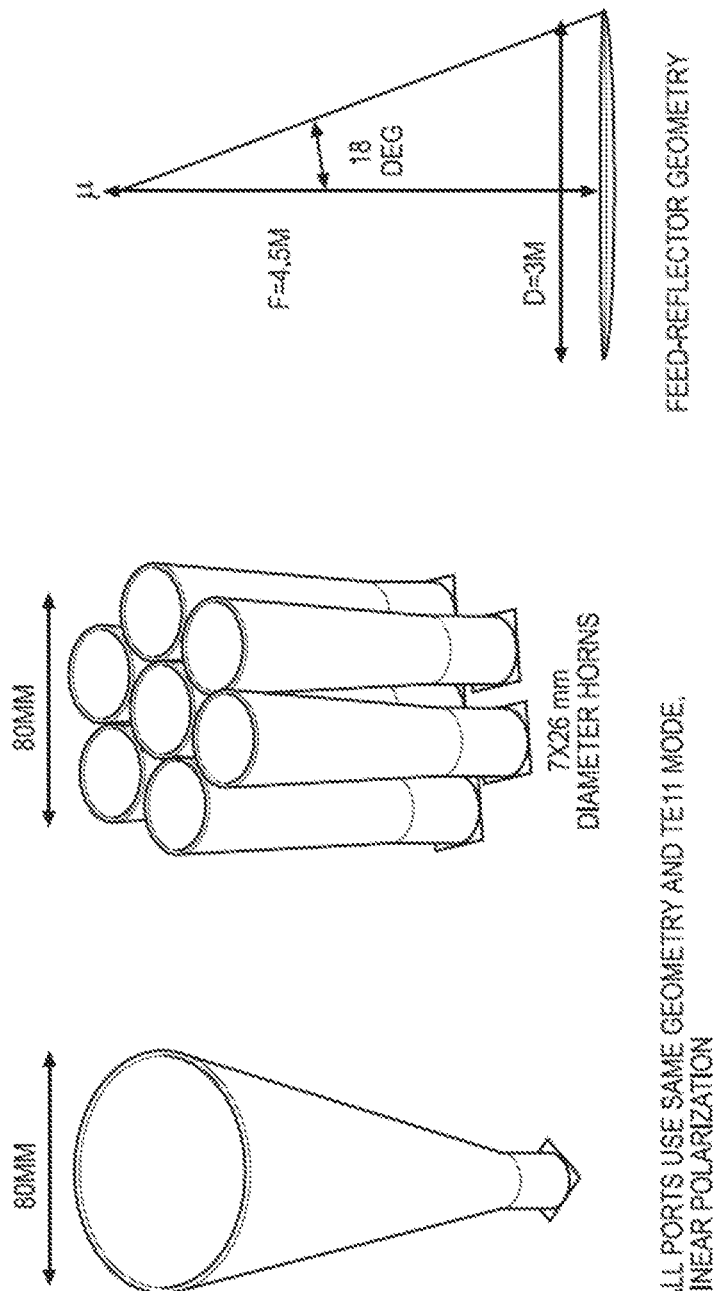
Figure 70B:
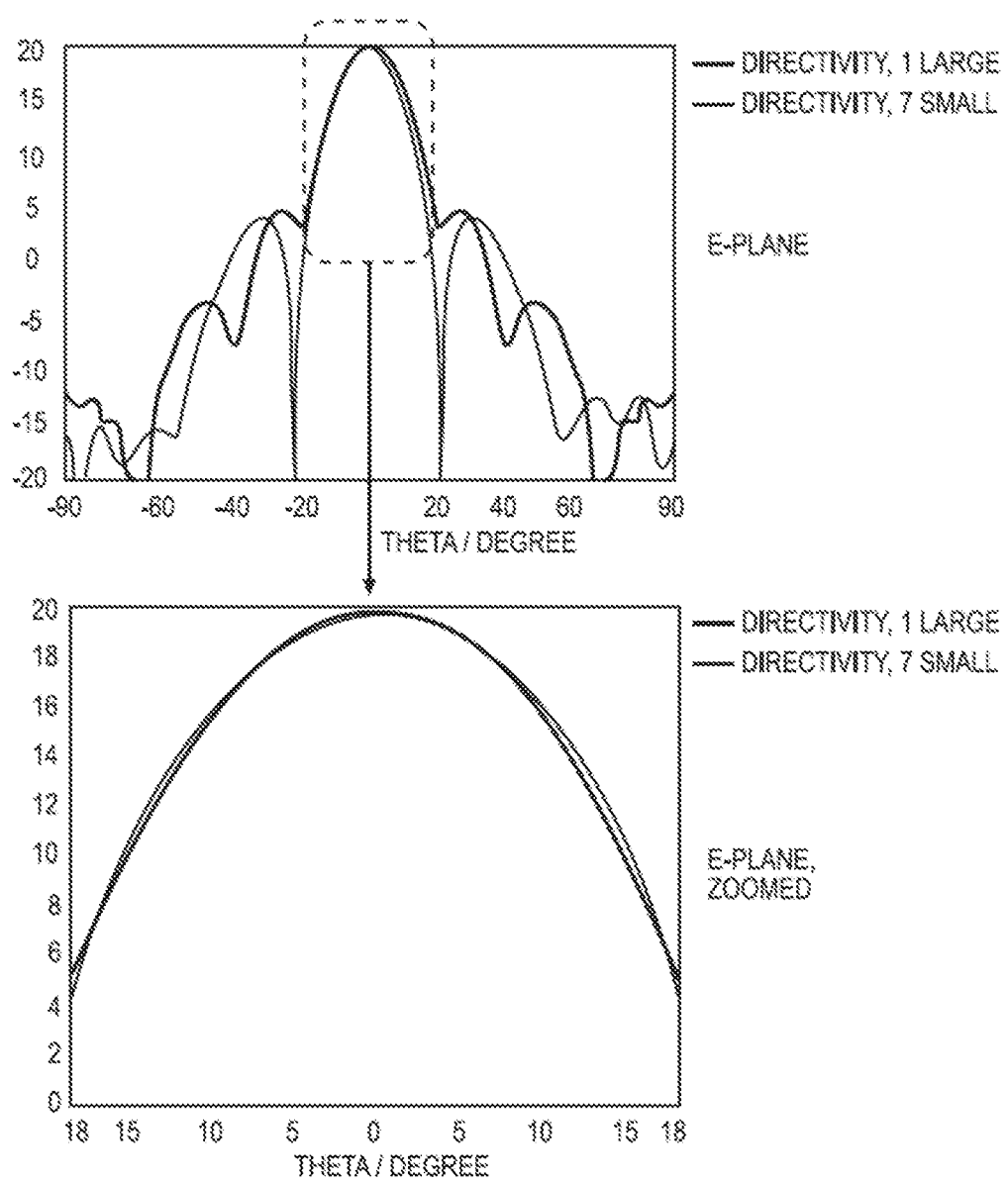

FIGS. 70A-B show that the optimal horn size may be used if the horn is created by combining seven conically shaped horns having circular cross sections. It will be appreciated that numbers either larger or smaller than 7 feed horns can also be used to approximate a single larger feed horn. As shown in FIG. 70A, the seven antennas are grouped together to have a diameter of 80 mm to replicate the directivity of a single feed horn antenna having a diameter of 80 mm. Each cylinder may have a diameter of 26 mm. The graphs of FIG. 70B show that between +/−18 degrees, the directivity of the seven horns is almost identical to the directivity of the single feed horn with a 80 mm diameter, where 18 degrees is the angle from boresight of feed horn to edge of reflector in the example case, and therefore any differences between single optimal 80 mm feed horn and aggregate feed pattern of the 7 feed horns beyond 18 degrees does not cause a difference in overall system performance. It should be appreciated that the diameter of the seven feed horns may change based on requirements, frequencies, and/or implementations. For example, smaller feed horns may approximate a larger feed horn with a diameter between 10 mm to 250 mm.

Figure 71A:
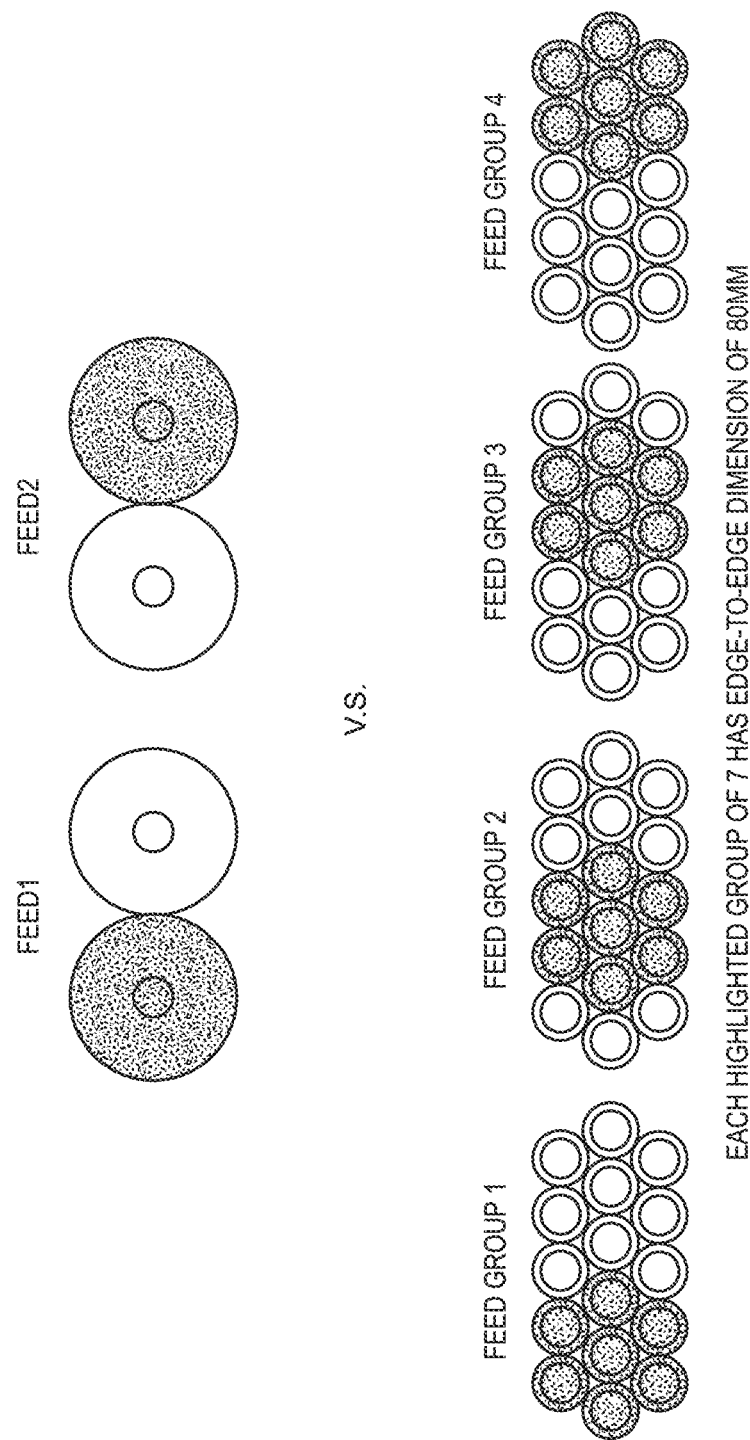

FIGS. 71A-71B show diagrams that compare a scanning performance of a 3 meter reflector with two large feed horn antennas with 80 mm diameters (i.e., Feed 1 and Feed 2) and groups of seven cylindrical fed horn antennas (i.e., Feed groups 1 to 4). As shown, there is close to a 1-degree shift when switching between the larger 80 mm diameter antennas when they are placed immediately next to each other with their edges touching. In contrast, since any seven of the small feed horns may be selected, so long as a 2-3-2 arrangement is activated to approximate the larger 80 mm antenna, small theta shifts can be realized, enabling scanning with 0.33 degree shifts between selection of different feed groups since there is a 26 mm separation of beam centers compared to an 80 mm separation for the larger feed horn antennas.

In one example of exploiting this improved resolution, the SDR activates first, second, and third feed groups in sequence and over time, wherein each feed group comprises seven feed horns arranged in 2-3-2 order, and each activated feed group is displaced from a previously activated feed group by the width of one feed horn. Such a scenario can be used, for example, to continuously illuminate a spot beam tracking the progress of a cruise ship, or an airplane.

Figure 72:
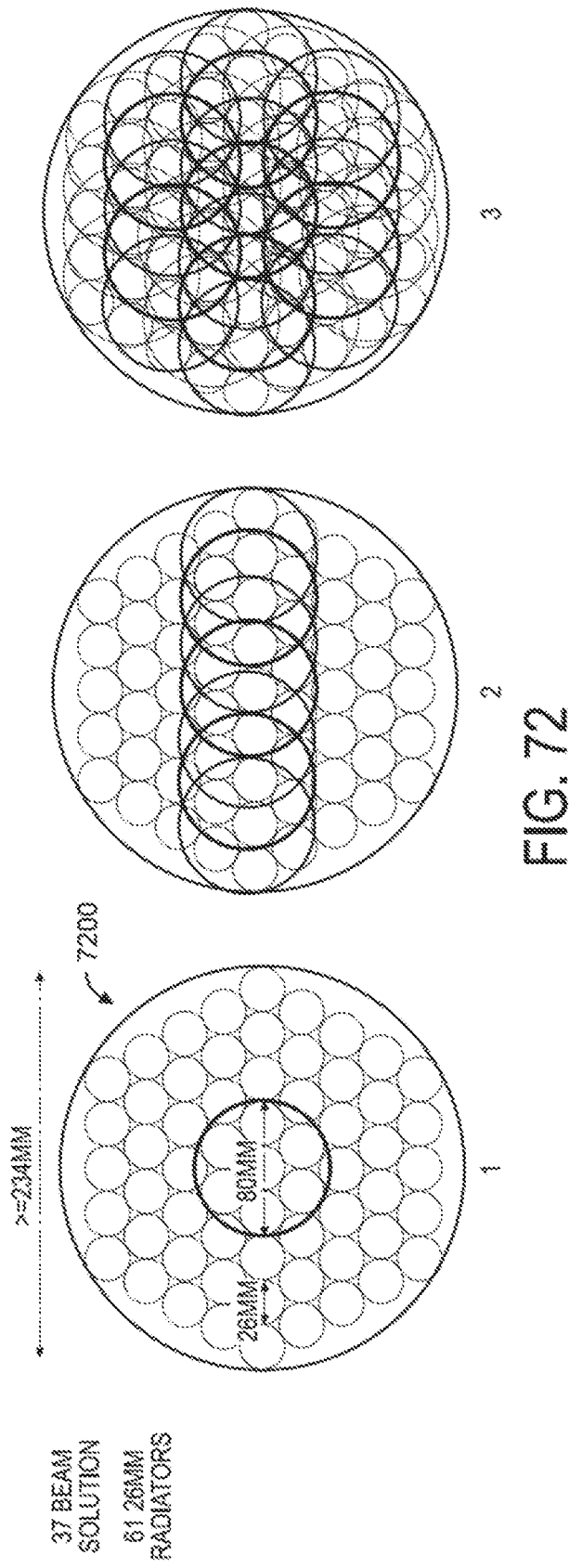

FIG. 72 shows a diagram of an array 7200 of 61 feed horn antennas. In the first image, a single beam is created by activating seven of the 61 feed horn antennas. In the second image, seven beams are created by activating 25 of the feed horn antennas. As shown, some of the feed horn antennas form more than one beam. In other words, different feed groups can include the same feed horn antenna to produce respective beams. A third image shows the 37 possible beams that may be created from the 61 different feed horn antennas.

Several observations about disclosed embodiments can be gleaned from FIGS. 67-72, and elsewhere. Each of the antennas in the antenna system of the disclosed communication satellite includes one or more feed horns, and the terrestrial coverage area is provided by a spot beam provided by each group of one or more active feed horns. The terrestrial coverage area of each of the spot beams increases as more power is provided to the antenna and decreases as less power is provided to the antenna. In some embodiments, the SDR is configured to maximize directivity of the spot beam and the terrestrial coverage area by exciting each of the feed horns with maximum, equal amplitude inputs. In some embodiments, the SDR is configured to produce a narrower spot beam by increasing an offset distance between its feed horns. In some other embodiments, the SDR is configured to successively alter a phase of each feed horn input, thereby steering the spot beam to a desired direction.

FIG. 73 shows a diagram of possible hardware configurations for selecting the different feed horn groups, according to example embodiments of the present disclosure. In a digital configuration 7302, the SDR 206 described above is configured to use digital internal routing to select 24 of 37 possible converters for selection of the feed horn groups. The SDR 206 is communicatively coupled to 37 Ku-band converters and a beam forming network. For the digital configuration 7302, RF switches and associated control components are not needed. In some examples, the SDR 206 may provide for full flexibility so that any input can be provided to any of the 37 beams.

It should be appreciated that a power amplifier is provided for each feed horn antenna. In some embodiments, the power amplifier is a solid-state power amplifier ("SSPA"). In other embodiments, the power amplifier is a traveling-wave tube amplifier ("TWTA"), or a Klystron power amplifier ("KPA"). A failure of an amplifier will not take down an entire beam since other antennas would still be operational. A single amplifier failure would only reduce performance of the beam. An entire beam could only be taken down with the failure of seven adjacent antennas or amplifiers, which is not likely. As such, the use of the feed array provides for graceful degradation in performance in the event of one or more failures, thereby increasing the robustness of the satellite system disclosed herein.

In contrast an analog configuration provides a switching network connected to the SDR 206 via 24 Ku-band converters. The switching network maps the 24 inputs from the converters (corresponding to the maximum number of beams that may be activated due to power considerations) to the 37 possible beams of the antenna array. In this configuration, less overhead is needed for the SDR 206 for internal routing.

Figure 74:
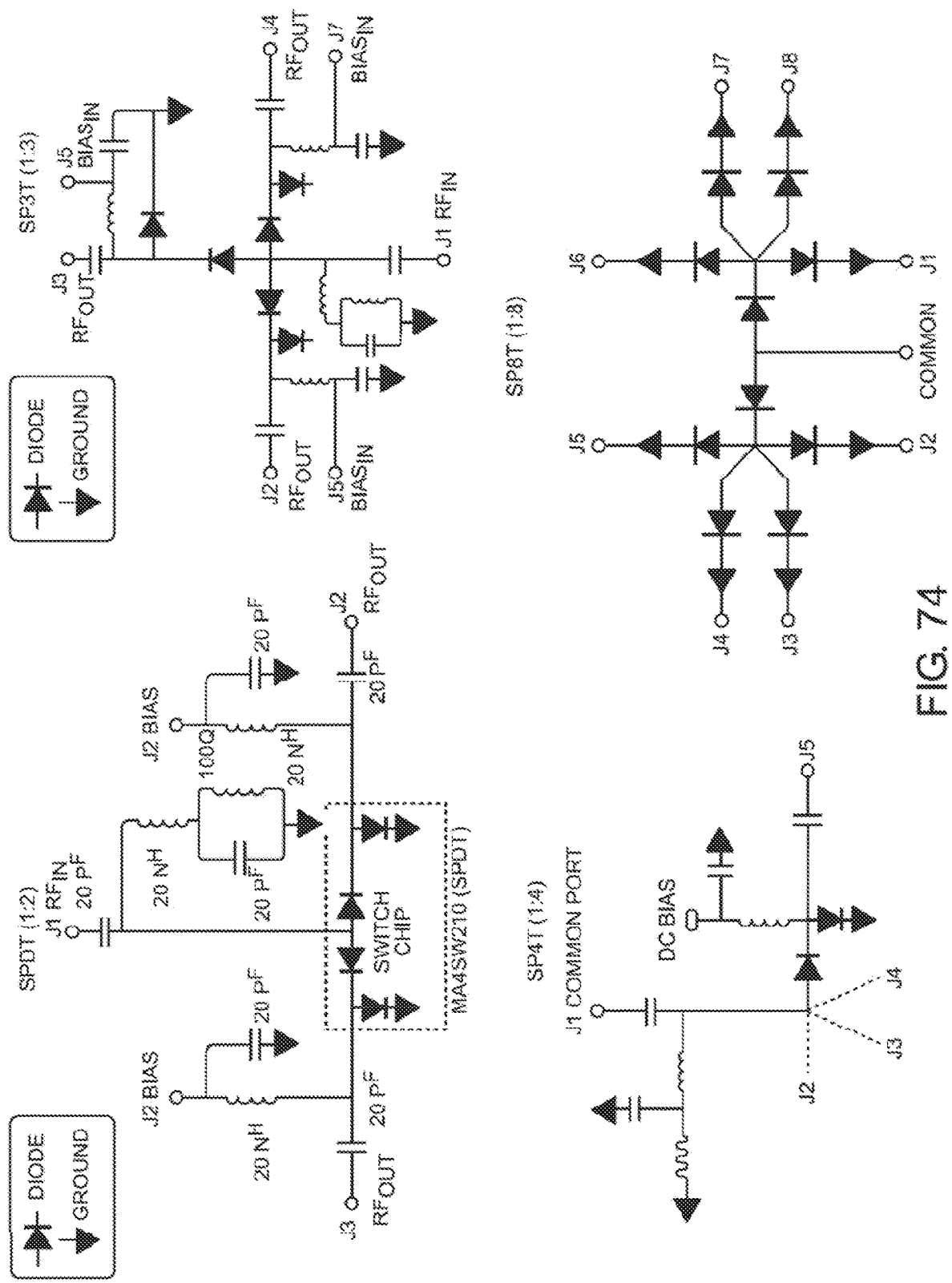

FIG. 74 shows a diagram of possible RF switches. As illustrated, an SPDT switch can route an input from one of two outputs, while an SP3T can route an input to one of three outputs, a SP4T routes an input to one of four outputs, and SP8T routes an input to one of eight outputs. The example switching network of FIG. 73 may include any number of combinations of RF switches to enable selection of the 37 beams for transmission or reception of data. The use of high-order switches provides additional flexibility in beam illumination at the expense of an increased circuit area.

Figure 75:
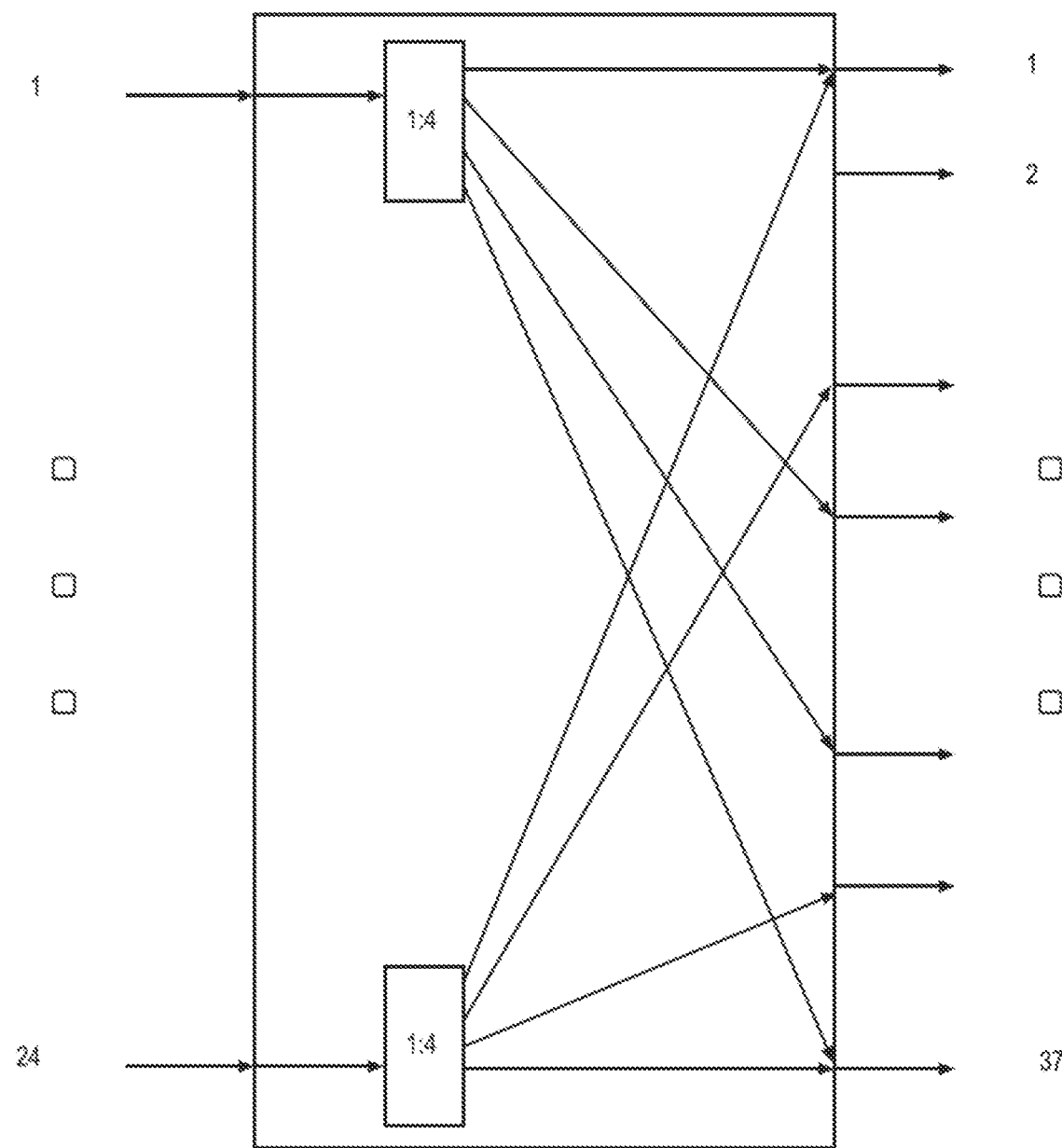

FIG. 75 shows a diagram of a switching network of FIG. 73 using SP4T switches, according to an example embodiment of the present disclosure. While the switching network shows a single layer of SP4T switches, in another example, the switching network may include additional layers and/or different types of switches, such as those shown in FIG. 73. As illustrated in FIG. 75, each of the four outputs from each switch is connected to four over the 37 switching network outputs. As such, each of the 37 outputs are connected to many outputs of the SP4T switches. Such a configuration provides enough degrees of freedom to illuminate the vast majority of the possible combinations of beams, thereby providing system flexibility.

Figure 76:
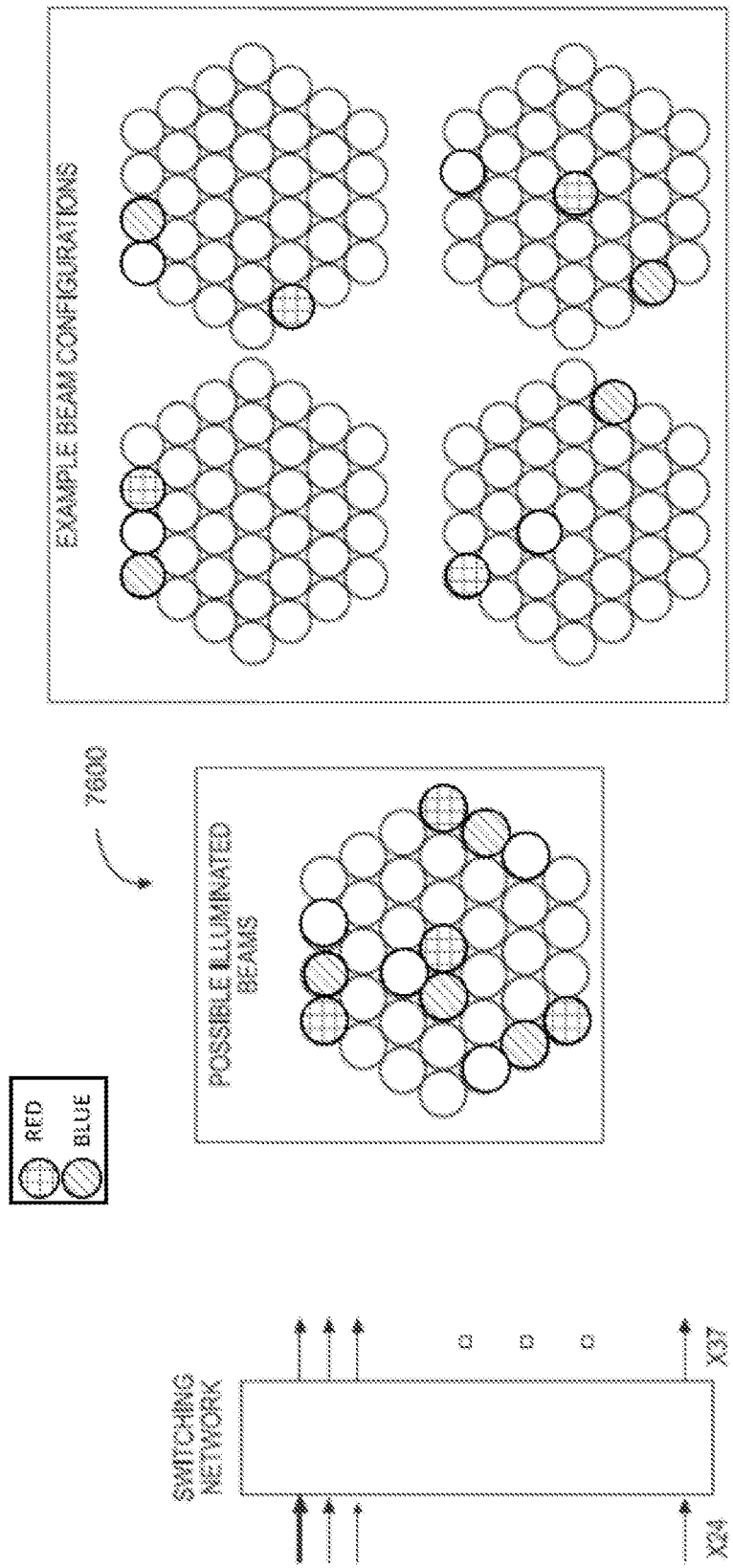

FIG. 76 shows a diagram of an example use-case of the switching network, according to an example embodiment of the present disclosure. In the example, three of 24 inputs are shown, where the switching network is capable of routing each input to one of four possible outputs, shown in beam area 7600. Thus, the blue (diagonal-hatched) input may be provided to any one of the four blue (diagonal-hatched) circles shown in beam area 7600 while the red (cross-hatched) input may be provided to any one of the red (cross-hatched) circles. It should be noted that the switching network provides for an input to be provided at different parts of the array area 7600 rather than concentrating a single beam to one location of the area. Example possible beam configurations are shown to the left in FIG. 76. It should be noted that the beam forming network provides for the selection of the seven individual feed horn antennas that are configured to form the respective beam.

Figure 77:
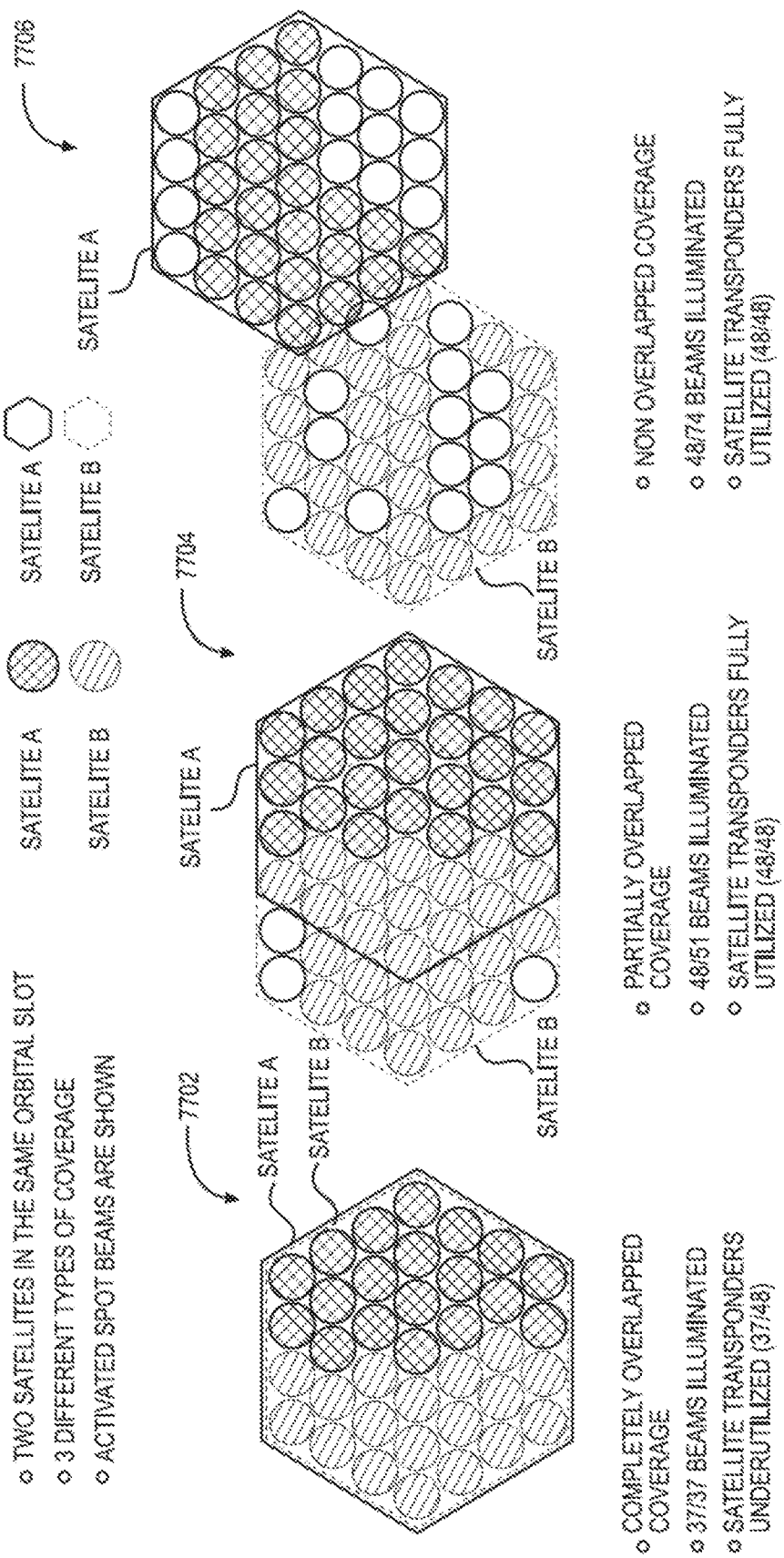

FIG. 77 shows a diagram of different satellite configurations using the antenna configuration described above. In this example the satellites are in the same orbital slot. The figure shows activated spot beams as solid circles, where satellite A is shown as cross-hatched circles with solid borders, and satellite B is shown as diagonal-hatched circles with dashed borders. In a first configuration 7702, the satellites provide overlapping coverage to illuminate 37 beams. However, this configuration provides for 11 unutilized transponders. In a second configuration 7704, the coverage is partially overlapped between the two satellites. Here, 48 of the 51 beams are illuminated in the coverage area and the satellite transponders are fully utilized. In a third configuration 7706, the coverage area is non-overlapping. As such, only 48 of the 74 beams are illuminated but the transponders are fully utilized.

Further Examples

The following examples describe various examples of configurations and embodiments of the disclosed invention, as described above.

Example 1 provides an exemplary Geostationary (GEO) communication satellite including: an antenna system including a plurality of antennas, each of the antennas configured to provide a communication coverage region having an adjustable bandwidth for a terrestrial coverage area while the antenna is in an active state and the satellite is in an orbit above Earth, a front-end subsystem communicatively coupled to the antenna system, the front-end subsystem including an input side including an input filter and an analog-to-digital converter, and an output side including an output filter and a digital-to-analog converter and a software defined radio ("SDR") communicatively coupled to the antenna system via the front-end subsystem, and wherein the SDR, in response to a surge modification request, modifies a bandwidth of each active antenna by increasing or decreasing a share of a satellite power budget allotted to the antenna. The share of satellite power budget allotted to the antenna can be increased by deactivating another, previously active antenna. Or, the share can be decreased by activating another, previously inactive antenna. In some embodiments, the communication coverage area is a spot beam.

Example 2 includes the substance of the exemplary GEO communication satellite of Example 1, wherein the surge modification request includes a predetermined routine, instructions received from a ground station, or an indication of a coverage area, and the SDR is configured to implement a super-surge by dynamically increasing forward throughput to a target region requiring higher bandwidth.

Example 3 includes the substance of the exemplary GEO communication satellite of Example 2, wherein the ground station includes a teleport that communicates with the satellite according to codified International Telecommunication Union Radiocommunication Sector (ITU-R) standards.

Example 3.1 includes the substance of the exemplary GEO communication satellite of Example 2, wherein the SDR is further configured to implement the super surge by either dynamically increasing forward throughput of a first antenna and dynamically increasing return throughput of a second antenna, or dynamincally increasing both forward and return throughput of the first antenna simultaneously.

Example 4 includes the substance of the exemplary GEO communication satellite of Example 2, wherein the SDR is further configured to increase power provided to a first antenna illuminating the target region by deactivating a second, previously active antenna immediately adjacent to the first antenna, wherein the first antenna becomes a sole recipient of a solid state power amplifier that previously also provided an input to the second antenna.

Example 5 includes the substance of the exemplary GEO communication satellite of Example 1, wherein the terrestrial coverage area is provided by the spot beam provided by each active antenna wherein the terrestrial coverage area of each of the spot beams increases as more power is provided to the antenna, and decreases as less power is provided to the antenna.

Example 6 includes the substance of the exemplary GEO communication satellite of Example 1, wherein each of the plurality of antennas includes a plurality of feed horns configured to produce the spot beam off of a reflector, wherein the antenna is configured to maximize directivity of the spot beam and the terrestrial coverage area by exciting each of the feed horns with maximum, equal amplitude inputs.

Example 7 includes the substance of the exemplary GEO communication satellite of Example 1, wherein each of the plurality of antennas includes a plurality of feed horns configured to produce the spot beam off of a reflector, wherein a first antenna is configured to produce a narrower spot beam by increasing an offset distance between its feed horns.

Example 8 includes the substance of the exemplary GEO communication satellite of Example 1, wherein each of the plurality of antennas includes a plurality of feed horns configured to produce the spot beam off of a reflector, and wherein a first antenna is configured to alter a phase of each feed horn input, thereby steering the spot beam to a desired direction.

Example 9 includes the substance of the exemplary GEO communication satellite of Example 1, wherein each of the plurality of antennas includes one or more feed horns.

Example 10.1 includes the substance of the exemplary GEO communication satellite of Example 1, wherein the SDR further activates first, second, and third feed groups in sequence and over time, wherein each feed group includes seven feed horns arranged in 2-3-2 order, and each activated feed group is displaced from a previously activated feed group by one antenna width.

Example 10.2 includes the substance of the exemplary GEO communication satellite of Example 1, wherein the SDR further activates first, second, and third feed groups in sequence and over time, wherein each feed group comprises three, four, five, six, seven, eight, or nine feed horns arranged in polygonal order, and each activated feed group is displaced from a previously activated feed group by a width of one feed horn.

Example 11 provides an exemplary method including: providing a Geostationary (GEO) communication satellite comprising an antenna system including a plurality of antennas, each of the antennas configured to provide a communication radiation pattern having an adjustable bandwidth for a terrestrial coverage area while the antenna is in an active state and the satellite is in an orbit above Earth, a front-end subsystem communicatively coupled to the antenna system, the front-end subsystem including an input side including an input filter and an analog-to-digital converter, and an output side including an output filter and a digital-to-analog converter, and a software defined radio ("SDR") communicatively coupled to the antenna system via the front-end subsystem, and responding, by the SDR in response to a surge modification request, by modifying a bandwidth of each active antenna by increasing or decreasing a share of a satellite power budget allotted to the antenna by deactivating or activating a previously active or previously inactive antenna, respectively. In some embodiments, the communication radiation pattern is a spot beam.

Example 12 includes the substance of the exemplary method of Example 11, wherein the surge modification request includes a predetermined routine, instructions received from a ground station, or an indication of a coverage area, and the SDR is configured to implement a super-surge by dynamically increasing forward throughput to a target region requiring higher bandwidth.

Example 13 includes the substance of the exemplary method of Example 12, wherein the ground station includes a teleport that communicates with the satellite according to codified International Telecommunication Union Radiocommunication Sector (ITU-R) standards.

Example 14 includes the substance of the exemplary method of Example 12, further including the SDR increasing power provided to a first antenna illuminating the target region by deactivating a second, previously active antenna immediately adjacent to the first antenna, wherein the first antenna becomes a sole recipient of a solid state power amplifier that previously also provided an input to the second antenna.

Example 15 includes the substance of the exemplary method of Example 11, wherein the terrestrial coverage area is provided by the spot beam provided by each active antenna wherein the terrestrial coverage area of each of the spot beams increases as more power is provided to the antenna, and decreases as less power is provided to the antenna.

Example 16 includes the substance of the exemplary method of Example 11, wherein each of the plurality of antennas includes a plurality of feed horns configured to produce the spot beam off of a reflector, wherein the antenna is configured to maximize directivity of the spot beam and the terrestrial coverage area by exciting each of the feed horns with maximum, equal amplitude inputs.

Example 17 includes the substance of the exemplary method of Example 11, wherein each of the plurality of antennas includes a plurality of feed horns configured to produce the spot beam off of a reflector, wherein a first antenna is configured to produce a narrower spot beam by increasing an offset distance between its feed horns.

Example 18 includes the substance of the exemplary method of Example 11, wherein each of the plurality of antennas includes a plurality of feed horns configured to produce the spot beam off of a reflector, and wherein a first antenna is configured to alter a phase of each feed horn input, thereby steering the spot beam to a desired direction.

Example 19 includes the substance of the exemplary method of Example 11, wherein each of the plurality of antennas includes one or more feed horns.

Example 20 includes the substance of the exemplary method of Example 11, further including the SDR activating first, second, and third feed groups in sequence and over time, wherein each feed group includes seven feed horns arranged in 2-3-2 order, and each activated feed group is displaced from a previously activated feed group by one antenna width.

CONCLUSION

It will be appreciated that each of the systems, structures, methods, and procedures described herein may be implemented using one or more computer program or component. These programs and components may be provided as a series of computer instructions on any conventional computer-readable medium, including read only memory ("ROM"), flash memory, magnetic or optical disks, optical memory, or other storage media, and combinations and derivatives thereof. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims. Moreover, consistent with current U.S. law, it should be appreciated that 35 U.S.C. 112(f) or pre-AIA 35 U.S.C. 112, paragraph 6 is not intended to be invoked unless the terms "means", or "step" are explicitly recited in the claims. Accordingly, the claims are not meant to be limited to the corresponding structure, material, or actions described in the specification or equivalents thereof

What is claimed is:

1. A Geostationary (GEO) communication satellite comprising:
   an antenna system comprising a plurality of antennas, each of the antennas configured to provide a communication coverage region having an adjustable bandwidth for a terrestrial coverage area while the antenna is in an active state and the satellite is in an orbit above Earth;
   a front-end subsystem communicatively coupled to the antenna system, the front-end subsystem comprising an input side including an input filter and an analog-to-digital converter, and an output side including an output filter and a digital-to-analog converter; and
   a software defined radio ("SDR"), communicatively coupled to the antenna system via one or more user slices combined or split with the input side or the output side of the front-end subsystem, wherein each of one or more user slices are configured to communicate with one or more distinct gateway slices, wherein the SDR is configured to selectively increase or decrease the throughput of each of the active antennas.

2. The GEO communication satellite of claim 1, wherein the one or more user slices are configured to provide beams for user terminals, and the one or more distinct gateway slice are configured to communication with a gateway station.

3. The GEO communication satellite of claim 1, wherein the SDR determines whether a surge modification request has been received, and if a surge modification request has not been received, waiting for a predetermined amount of time before determining whether another surge modification request has been received.

4. The GEO communication satellite of claim 1, wherein the SDR, provides a first throughput of one more of the active antennas for a first terrestrial area and a second throughput for of the one or more the active antennas for a second terrestrial area, wherein the first throughput is greater than the second throughput.

5. The GEO communication satellite of claim 1, wherein the SDR, in response to a surge modification request, modifies a throughput of each active antenna by increasing or decreasing a share of a satellite power budget allotted to the antenna by deactivating or activating a previously active or previously inactive antenna, respectively.

6. The GEO communication satellite of claim 5, wherein the surge modification request comprises a predetermined routine, instructions received from a ground station, or an indication of a coverage area, and the SDR is configured to implement a super-surge by dynamically increasing one or both of forward and return throughput to a target region requiring higher bandwidth.

7. The GEO communication satellite of claim 5, wherein the terrestrial coverage area is provided by the communication coverage region provided by each active antenna wherein the terrestrial coverage area of each of the communication coverage regions increases as more power is provided to the antenna, and decreases as less power is provided to the antenna.

8. The GEO communication satellite of claim 5, wherein each of the plurality of antennas comprises a plurality of feed horns configured to produce the communication coverage region off of a reflector, wherein the antenna is configured to maximize directivity of the communication coverage region by exciting each of the feed horns with maximum, equal amplitude inputs.

9. The GEO communication satellite of claim 5, wherein each of the plurality of antennas comprises a plurality of feed horns configured to produce the communication coverage region off of a reflector, wherein a first antenna is configured to produce a narrower spot beam by increasing an offset distance between its feed horns.

10. The GEO communication satellite of claim 5, wherein each of the plurality of antennas comprises a plurality of radiating antenna elements configured to produce the communication coverage region off of a reflector, and wherein a first antenna is configured to alter a phase of each radiating antenna element input, thereby steering the communication coverage region to a desired direction.

11. A method comprising:
    providing a Geostationary (GEO) communication satellite comprising:
    an antenna system comprising a plurality of antennas, each of the antennas configured to provide a communication coverage region having an adjustable bandwidth for a terrestrial coverage area while the antenna is in an active state and the satellite is in an orbit above Earth;
    a front-end subsystem communicatively coupled to the antenna system, the front-end subsystem comprising an input side including an input filter and an analog-to-digital converter, and an output side including an output filter and a digital-to-analog converter; and
    a software defined radio ("SDR"), communicatively coupled to the antenna system via one or more user slices combined or split with the input side or the output side of the front-end subsystem, wherein each of one or more user slices are configured to communicate with one or more distinct gateway slices, wherein the SDR is configured to selectively increase or decrease the throughput of each of the active antennas.

12. The method of claim 11, further comprising:
    providing by one or more user slices beams for user terminals, and
    communicating by one or more distinct gateway slice with a gateway station.

13. The method of claim 11, further comprising:
    determining whether a surge modification request has been received, and if a surge modification request has not been received, waiting for a predetermined amount of time before determining whether another surge modification request has been received.

14. The method of claim 11, further comprising:
providing a first throughput of one more of the active antennas for a first terrestrial area and a second throughput for of the one or more the active antennas for a second terrestrial area, wherein the first throughput is greater than the second throughput.

15. The method of 11, further comprising:
in response to a surge modification request, modifying a throughput of each active antenna by increasing or decreasing a share of a satellite power budget allotted to the antenna by deactivating or activating a previously active or previously inactive antenna, respectively.

16. The method of claim 15, wherein the surge modification request comprises a predetermined routine, instructions received from a ground station, or an indication of a coverage area, and the SDR is configured to implement a super-surge by dynamically increasing one or both of forward and return throughput to a target region requiring higher bandwidth.

17. The method of claim 15, wherein the terrestrial coverage area is provided by the communication coverage region provided by each active antenna wherein the terrestrial coverage area of each of the communication coverage regions increases as more power is provided to the antenna, and decreases as less power is provided to the antenna.

18. The method of claim 15, wherein each of the plurality of antennas comprises a plurality of feed horns configured to produce the communication coverage region off of a reflector, wherein the antenna is configured to maximize directivity of the communication coverage region by exciting each of the feed horns with maximum, equal amplitude inputs.

19. The method of claim 15, wherein each of the plurality of antennas comprises a plurality of feed horns configured to produce the communication coverage region off of a reflector, wherein a first antenna is configured to produce a narrower spot beam by increasing an offset distance between its feed horns.

20. The method of claim 15, wherein each of the plurality of antennas comprises a plurality of radiating antenna elements configured to produce the communication coverage region off of a reflector, and wherein a first antenna is configured to alter a phase of each radiating antenna element input, thereby steering the communication coverage region to a desired direction.

* * * * *